US011919002B2

(12) United States Patent
Rahimi Lenji et al.

(10) Patent No.: US 11,919,002 B2
(45) Date of Patent: Mar. 5, 2024

(54) DEVICES AND METHODS FOR GENERATING AND RECOVERING DROPLETS

(71) Applicant: 10x Genomics, Inc., Pleasanton, CA (US)

(72) Inventors: Mohammad Rahimi Lenji, Livermore, CA (US); Rajiv Bharadwaj, Pleasanton, CA (US)

(73) Assignee: 10x Genomics, Inc., Pleasanton, CA (US)

(*) Notice: Subject to any disclaimer, the term of this patent is extended or adjusted under 35 U.S.C. 154(b) by 475 days.

(21) Appl. No.: 16/998,648

(22) Filed: Aug. 20, 2020

(65) Prior Publication Data

US 2021/0053063 A1 Feb. 25, 2021

Related U.S. Application Data

(60) Provisional application No. 62/889,273, filed on Aug. 20, 2019.

(51) Int. Cl.

*B01L 3/00* (2006.01)
*B01F 23/411* (2022.01)
*B01L 3/02* (2006.01)

(52) U.S. Cl.

CPC ......... *B01L 3/502784* (2013.01); *B01L 3/021* (2013.01); *B01F 23/411* (2022.01);

(Continued)

(58) Field of Classification Search

CPC .. B01F 23/41; B01F 23/411; B01F 25/31422; B01F 25/31423; B01F 33/3011;

(Continued)

(56) References Cited

U.S. PATENT DOCUMENTS 9,012,390 B2 4/2015 Holtze et al.
9,839,911 B2 12/2017 Weitz et al.

(Continued)

FOREIGN PATENT DOCUMENTS

WO WO-2009/005680 A1 1/2009
WO WO-2010/128858 A1 11/2010

(Continued)

OTHER PUBLICATIONS

Y. Hong et al "Flow rate effect on droplet control in a co-flowing microfluidic device," Microfluidics and Nanofluidics, vol. 3, pp. 341-3462007 (Year: 2007).*

(Continued)

*Primary Examiner* — Jennifer Wecker
*Assistant Examiner* — Jonathan Bortoli
(74) *Attorney, Agent, or Firm* — Clark & Elbing LLP

(57) ABSTRACT

The invention provides kits, devices, methods, and systems for forming droplets or particles and methods of their use. The devices may be used to form droplets of a size suitable for utilization as microscale chemical reactors, e.g., for genetic sequencing. In general, droplets are formed in a device by flowing a first liquid through a channel and into a droplet formation region including a second liquid, i.e., the continuous phase. The invention allows for more efficient recovery of droplets or processed droplets.

15 Claims, 26 Drawing Sheets

(52) U.S. Cl.
CPC .................. *B01L 2200/0673* (2013.01); *B01L 2300/0867* (2013.01)

(58) Field of Classification Search
CPC ..... B01L 2200/0673; B01L 2300/0816; B01L 2300/0867; B01L 3/021; B01L 3/0275; B01L 3/502761; B01L 3/502784
See application file for complete search history.

(56) References Cited

U.S. PATENT DOCUMENTS

| | | | |
|---|---|---|---|
| 10,011,872 B1 | 7/2018 | Belgrader et al. | |
| 10,323,278 B2 | 6/2019 | Belgrader et al. | |
| 10,357,771 B2 | 7/2019 | Bharadwaj et al. | |
| 10,549,279 B2 | 2/2020 | Bharadwaj et al. | |
| 10,583,440 B2 | 3/2020 | Bharadwaj et al. | |
| 10,610,865 B2 | 4/2020 | Bharadwaj et al. | |
| 10,766,032 B2 | 9/2020 | Bharadwaj et al. | |
| 10,821,442 B2 | 11/2020 | Bharadwaj et al. | |
| 10,898,900 B2 | 1/2021 | Bharadwaj et al. | |
| 2005/0172476 A1 | 8/2005 | Stone et al. | |
| 2006/0097155 A1 | 5/2006 | Adachi et al. | |
| 2006/0163385 A1 | 7/2006 | Link et al. | |
| 2007/0003442 A1 | 1/2007 | Link et al. | |
| 2008/0074449 A1* | 3/2008 | Lee | B01F 33/3011 347/75 |
| 2010/0163109 A1* | 7/2010 | Fraden | B01L 3/502715 137/1 |
| 2011/0045577 A1 | 2/2011 | Bruzewicz et al. | |
| 2011/0053798 A1 | 3/2011 | Hindson et al. | |
| 2013/0018970 A1 | 1/2013 | Woundy et al. | |
| 2013/0078164 A1 | 3/2013 | Baroud et al. | |
| 2014/0024023 A1 | 1/2014 | Cauley et al. | |
| 2014/0155295 A1 | 6/2014 | Hindson et al. | |
| 2014/0312534 A1 | 10/2014 | Cauley, III | |
| 2015/0224466 A1 | 8/2015 | Hindson et al. | |
| 2015/0292988 A1 | 10/2015 | Bharadwaj et al. | |
| 2015/0352544 A1* | 12/2015 | Buermann | B01L 3/502715 435/6.12 |
| 2016/0123858 A1 | 5/2016 | Kapur et al. | |
| 2016/0244809 A1 | 8/2016 | Belgrader et al. | |
| 2016/0271576 A1 | 9/2016 | Arab et al. | |
| 2017/0151536 A1 | 6/2017 | Weitz et al. | |
| 2018/0104693 A1 | 4/2018 | Merten et al. | |
| 2018/0133715 A1* | 5/2018 | Craig | G01N 35/08 |
| 2019/0060890 A1* | 2/2019 | Bharadwaj | B01F 23/4105 |
| 2020/0230606 A1 | 7/2020 | Bharadwaj et al. | |
| 2020/0290048 A1 | 9/2020 | Bharadwaj et al. | |

FOREIGN PATENT DOCUMENTS

| | | |
|---|---|---|
| WO | WO-2018/009766 A1 | 1/2018 |
| WO | WO-2019/040637 A1 | 2/2019 |
| WO | WO-2019/157529 A1 | 8/2019 |

OTHER PUBLICATIONS

Pfreundt et a "An easy-to-use microfluidic interconnection system to create quick and reversibly interfaced simple microfluidic devices" 2015 J. Micromech. Microeng. 25 115010 (Year: 2015).*

Kim Analyst, "A smart multi-pipette for hand-held operation of microfluidic devices" 2016, 141, 5753 (Year: 2016).*

Vladisavljević et al ("Microfluidic Production of Multiple Emulsions") Micromachines 8,15 doi:10.3390/mi8030075 (Year: 2017).*

Wang "Driving and sorting of the fluorescent droplets on digital microfluidic platform" Microfluidics and Nanofluidics (2018) 22:129 (Year: 2018).*

Lauren "How emulsions form and break?" Biolin Scientific (Year: 2023).*

Postek et al "A passive microfluidic system based on step emulsification allows the generation of libraries of nanoliter-sized droplets from microliter droplets of varying and known concentrations of a sample" Lab Chip, 2017, 17, 1323 (Year: 2017).*

U.S. Appl. No. 17/323,438, Zhang et al.

Mazutis et al., "Single-cell analysis and sorting using droplet-based microfluidics," available in PMC Aug. 11, 2014. Published in final edited form as Nat Protoc. 8(5): 870-891 (2013) (48 pages).

Song et al., "Reactions in droplets in microfluidic channels," Angew Chem Int Ed Engl. 45(44):7336-56 (2006).

Schaerli et al., "The potential of microfluidic water-in-oil droplets in experimental biology," Mol Biosyst. 5(12):1392-404 (Oct. 12, 2009).

* cited by examiner

400

700

700

FIG. 16A
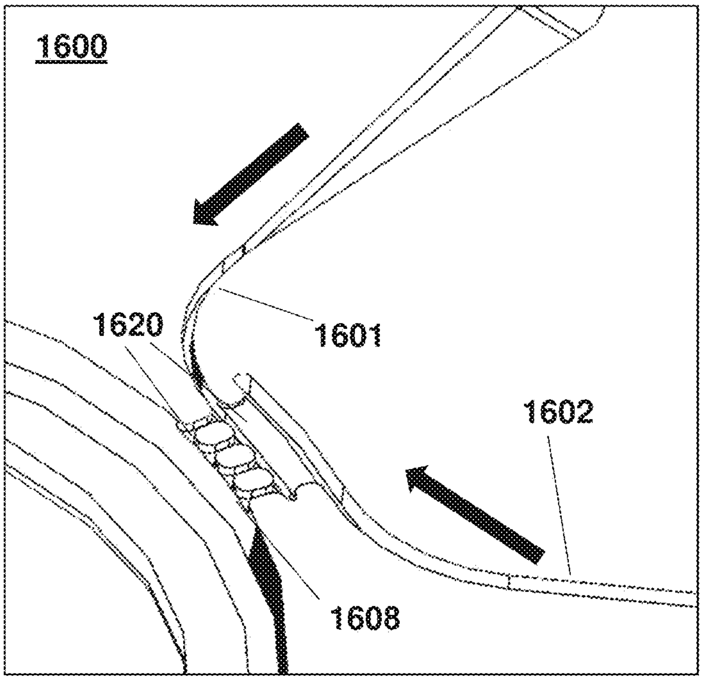
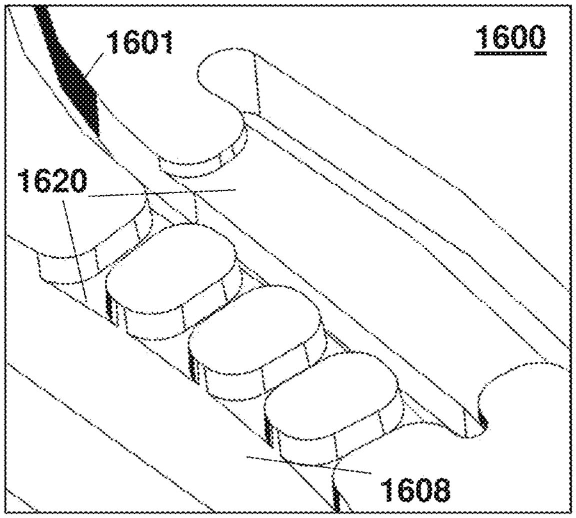
FIG. 16B

FIG. 23A
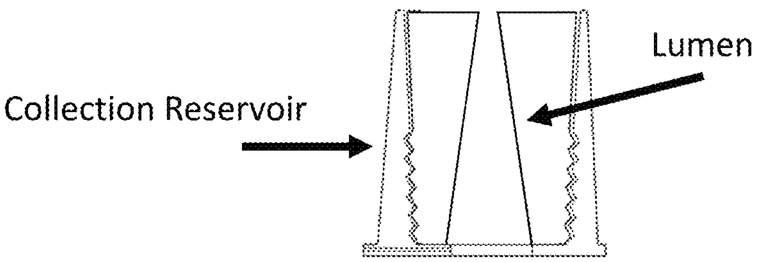
FIG. 23B
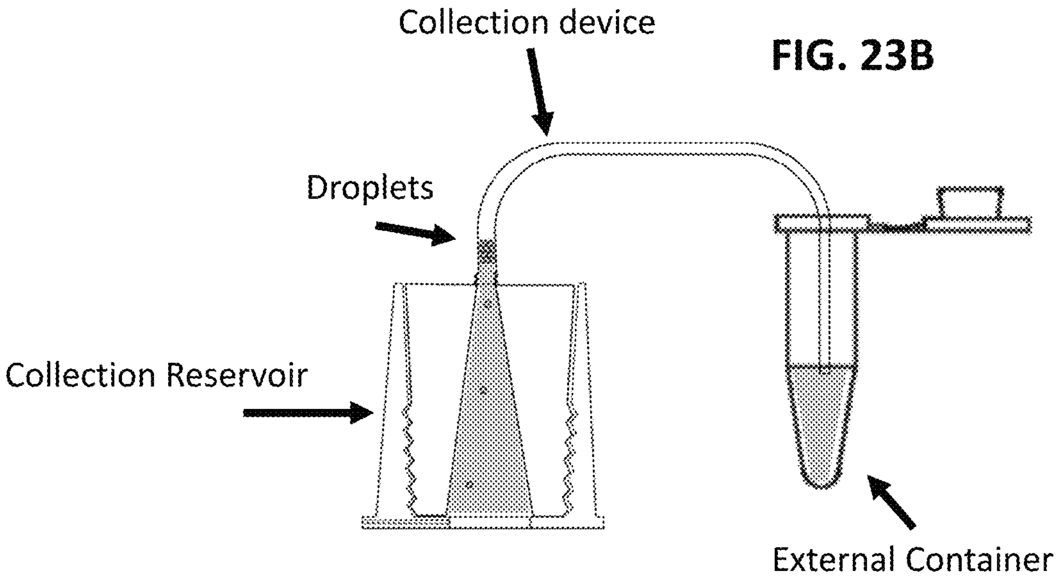
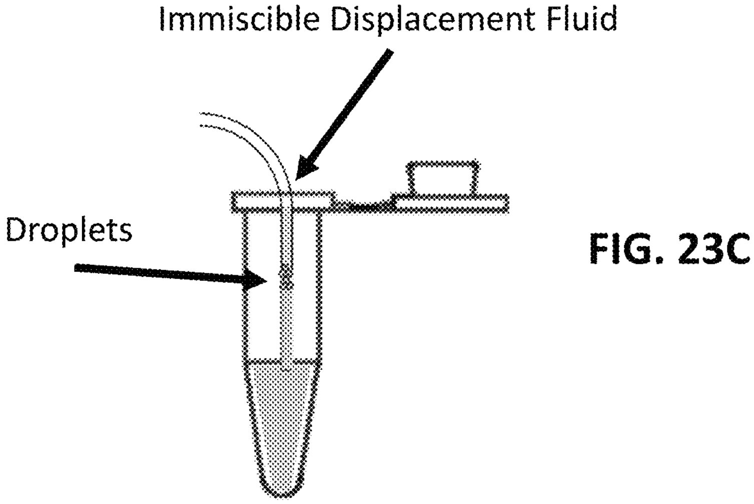
FIG. 23C

FIG. 24A
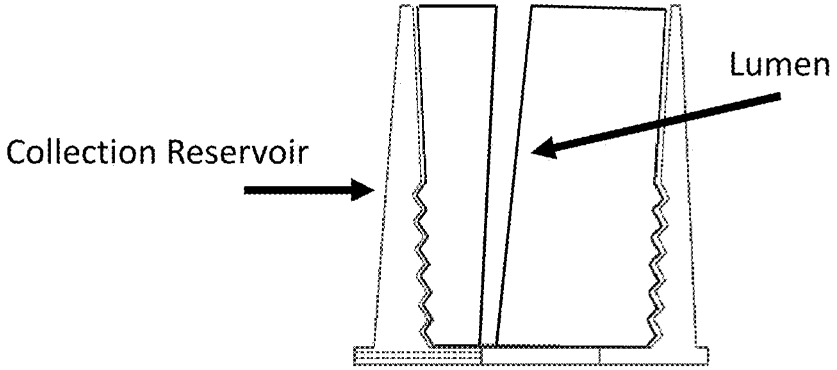
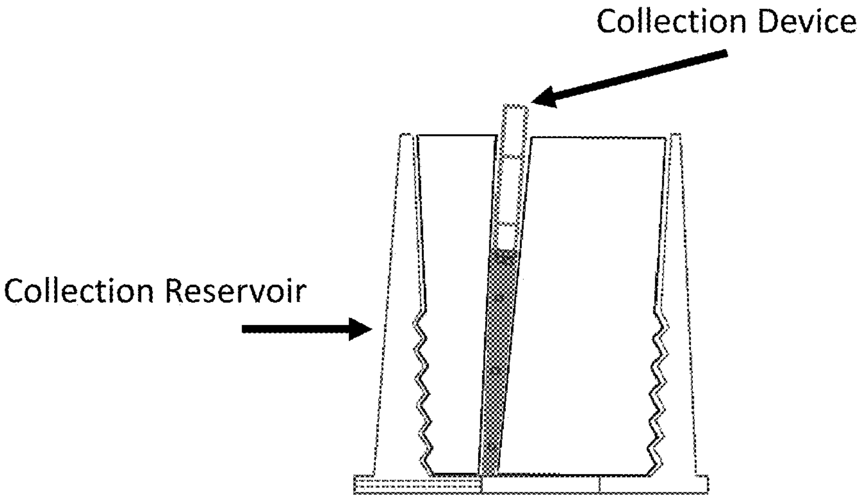
FIG. 24B

DEVICES AND METHODS FOR GENERATING AND RECOVERING DROPLETS

BACKGROUND OF THE INVENTION

Many biomedical applications rely on high-throughput assays of samples combined with one or more reagents in droplets. For example, in both research and clinical applications, high-throughput genetic tests using target-specific reagents are able to provide information about samples in drug discovery, biomarker discovery, and clinical diagnostics, among others. Maximizing the efficiency of droplet formation and droplet recovery while minimizing device downtime is beneficial. Accordingly, there is a need for such devices.

SUMMARY OF THE INVENTION

In one aspect, the invention features a kit including a device for producing droplets of a first liquid in a second liquid. The device includes a first channel having a first depth, a first width, a first proximal end, and a first distal end, a droplet formation region in fluid communication with the first channel, and a collection reservoir in fluid communication with the droplet formation region and configured to collect droplets formed in the droplet formation region. The collection reservoir may include a lumen configured to accept a collection device. The first channel and droplet formation region are configured to produce droplets of the first liquid in the second liquid. The kit also includes the collection device.

In some embodiments, the lumen has an angle of between ±45 degrees (e.g., about −45°, about −44.5°, about −44°, about −43.5°, about −43°, about −42.5°, about −42°, about −41.5°, about −41°, about −40.5°, about −40°, about −39.5°, about −39°, about −38.5°, about −38°, about −37.5°, about −37°, about −36.5°, about −36°, about −35.5°, about −35°, about −34.5°, about −34°, about −33.5°, about −33°, about −32.5°, about −32°, about −31.5°, about −31°, about −30.5°, about −30°, about −29.5°, about −29°, about −28.5°, about −28°, about −27.5°, about −27°, about −26.5°, about −26°, about −25.5°, about −25°, about −24.5°, about −24°, about −23.5°, about −23°, about −22.5°, about −22°, about −21.5°, about −21°, about −20.5°, about −20°, about −19.5°, about −19°, about −18.5°, about −18°, about −17.5°, about −17°, about −16.5°, about −16°, about −15.5°, about −15°, about −14.5°, about −14°, about −13.5°, about −13°, about −12.5°, about −12°, about −11.5°, about −11°, about −10.5°, about −10°, about −9.5°, about −9°, about −8.5°, about −8°, about −7.5°, about −7°, about −6.5°, about −6°, about −5.5°, about −5°, about −4.5°, about −4°, about −3.5°, about −3°, about −2.5°, about −2°, about −1.5°, about −1°, about −0.5°, about 0°, about 0.5°, about 1°, about 1.5°, about 2°, about 2.5°, about 3°, about 3.5°, about 4°, about 4.5°, about 5°, about 5.5°, about 6°, about 6.5°, about 7°, about 7.5°, about 8°, about 8.5°, about 9°, about 9.5°, about 10°, about 10.5°, about 11°, about 11.5°, about 12°, about 12.5°, about 13°, about 13.5°, about 14°, about 14.5°, about 15°, about 15.5°, about 16°, about 16.5°, about 17°, about 17.5°, about 18°, about 18.5°, about 19°, about 19.5°, about 20°, about 20.5°, about 21°, about 21.5°, about 22°, about 22.5°, about 23°, about 23.5°, about 24°, about 24.5°, about 25°, about 25.5°, about 26°, about 26.5°, about 27°, about 27.5°, about 28°, about 28.5°, about 29°, about 29.5°, about 30°, about 30.5°, about 31°, about 31.5°, about 32°, about 32.5°, about 33°, about 33.5°, about 34°, about 34.5°, about 35°, about 35.5°, about 36°, about 36.5°, about 37°, about 37.5°, about 38°, about 38.5°, about 39°, about 39.5°, about 40°, about 40.5°, about 41°, about 41.5°, about 42°, about 42.5°, about 43°, about 43.5°, about 44°, about 44.5°, or about 45°) from surface normal.

In certain embodiments, the collection device includes a pipette tip.

In some embodiments, the collection device includes a tube having a proximal end and a distal end. The proximal end is in fluid communication with the lumen, and the distal end is in fluid communication with an external container.

In another embodiment, the device further includes a second channel having a second depth, a second width, a second proximal end, and a second distal end, wherein the second channel intersects the first channel between the first proximal and first distal ends.

In some embodiments, the droplet formation region includes a shelf having a third depth, a third width, wherein the shelf is configured to allow the first liquid to expand in at least one dimension.

In certain embodiments, the droplet formation region further includes a step having a fourth depth.

In another embodiment, the device further includes a reservoir configured to be controllably in fluid communication with the collection reservoir.

In some embodiments, the reservoir includes an immiscible displacement fluid.

In a related aspect, the invention includes a method of producing droplets of a first liquid in a second liquid. The method includes providing a device for producing droplets of the first liquid in the second liquid, the device includes: i) a first channel having a first depth, a first width, a first proximal end, and a first distal end; ii) a droplet formation region in fluid communication with the first channel; and iii) a collection reservoir in fluid communication with the droplet formation region and configured to collect droplets formed in the droplet formation region, where the collection reservoir includes a lumen configured to accept a collection device; where the first channel and droplet formation region are configured to produce droplets of the first liquid in the second liquid; producing the droplets; and collecting the droplets in the collection device.

In some embodiments, the collection device is a pipette tip, and the droplets flow from the collection reservoir into the pipette tip.

In another embodiment, the collection device includes a tube having a proximal end and a distal end, wherein the proximal end is in fluid communication with the lumen and the distal end is in fluid communication with an external container. Collection includes moving the droplets from the collection reservoir to the external container with a displacement fluid.

In another related aspect, the invention provides a method for producing droplets of a first liquid in a second liquid. The method includes: a) providing a device including: i) a first channel having a first depth, a first width, a first proximal end, and a first distal end; ii) a droplet formation region in fluid communication with the first channel; iii) a collection reservoir in fluid communication with the droplet formation region and configured to collect droplets formed in the droplet formation region, where the first channel and droplet formation region are configured to produce droplets of the first liquid in the second liquid; and iv) a droplet or particle source in fluid communication with the collection reservoir; b) allowing the first liquid to flow from the first channel to the droplet formation region to produce first droplets of the first liquid in the second liquid; c) collecting the first droplets in the collection reservoir; and d) allowing the droplet or particle source to provide second droplets and/or particles to the collection reservoir; where the first droplets include a sample and the second droplets and/or particles do not.

In some embodiments, the droplet formation region and the droplet or particle source are configured to simultaneously provide droplets or particles to the collection reservoir.

In another embodiment, the rate of droplets produced by the droplet formation region is less than the rate of particles or droplets provided by the droplet or particle source to the collection reservoir.

In certain embodiments, the rate of droplets produced by the droplet formation region is between 1 to 10 (e.g., about 1, about 2, about 3, about 4, about 5, about 6, about 7, about 8, about 9, or about 10) times less than the rate of particles or droplets provided by the droplet or particle source to the collection reservoir.

In some embodiments, the removal of droplets does not include pressurization of the collection reservoir.

In another aspect, the invention provides a device for producing droplets of a first liquid in a second liquid, the device including: a) a first channel having a first depth, a first width, a first proximal end, and a first distal end; b) a droplet formation region in fluid communication with the first channel; c) a collection reservoir in fluid communication with the droplet formation region and configured to collect droplets formed in the droplet formation region, the collection reservoir having a top portion and a bottom portion; d) an oil shunt channel in fluid communication with the bottom portion or configured to be controllably in fluid communication with the bottom portion; e) one or more access channels configured to be controllably in fluid communication with the top portion of the collection reservoir; and f) one or more thermal elements disposed to alter the temperature of the collection reservoir, where the first channel and the droplet formation region are configured to produce droplets of the first liquid in the second liquid. In certain embodiments, the device includes two access channels.

In a related embodiment, the invention provides a method for processing a sample, the method including: a) providing a device including: a) a first channel having a first depth, a first width, a first proximal end, and a first distal end; b) a droplet formation region in fluid communication with the first channel; c) a collection reservoir in fluid communication with the droplet formation region and configured to collect droplets formed in the droplet formation region, the collection reservoir having a top portion and a bottom portion; d) an oil shunt channel in fluid communication with the bottom portion or configured to be controllably in fluid communication with the bottom portion; e) one or more access channels configured to be controllably in fluid communication with the top portion of the collection reservoir; and f) one or more thermal elements disposed to alter the temperature of the collection reservoir, where the first channel and the droplet formation region are configured to produce droplets of the first liquid in the second liquid; b) allowing the device to produce droplets of the sample to form an emulsion in the second liquid; c) heating and/or cooling the aqueous layer, thereby processing the sample; and d) breaking the emulsion to produce a liquid layer in the collection reservoir. The method may further include removing the liquid layer from the collection reservoir. In some embodiments, the emulsion is broken by the addition of a reagent. In certain embodiments, the reagent is introduced via a first of the one or more access channels. In another embodiment, the liquid layer is removed via the first access channel. In other embodiments, the liquid layer is removed via a second of the one or more access channels.

Another aspect of the invention features a system for collecting droplets, the system includes: i) a device for producing droplets of a first liquid in a second liquid, the device includes: a) a first channel having a first depth, a first width, a first proximal end, and a first distal end; b) a droplet formation region in fluid communication with the first channel; and c) a collection reservoir in fluid communication with the droplet formation region and configured to collect droplets formed in the droplet formation region, wherein the collection reservoir includes a lumen configured to accept a collection device; where the first channel and droplet formation region are configured to produce droplets of the first liquid in the second liquid; and ii) the collection device in fluid communication with the lumen. In a related embodiment, the lumen has an angle of between ±20 degrees (e.g., about −19.5, about −19.0, about −18.5, about −18.0, about −17.5, about −17.0, about −16.5, about −16.0, about −15.5, about −15.0, about −14.5, about −14.0, about −13.5, about −13.0, about −12.5, about −12.0, about −11.5, about −11.0, about −10.5, about −10.0, about −9.5, about −9.0, about −8.5, about −8.0, about −7.5, about −7.0, about −6.5, about −6.0, about −5.5, about −5.0, about −4.5, about −4.0, about −3.5, about −3.0, about −2.5, about −2.0, about −1.5, about −1.0, about −0.5, about 0.0, about +0.5, about +1.0, about +1.5, about +2.0, about +2.5, about +3.0, about +3.5, about +4.0, about +4.5, about +5.0, about +5.5, about +6.0, about +6.5, about +7.0, about +7.5, about +8.0, about +8.5, about +9.0, about +9.5, about +10.0, about +10.5, about +11.0, about +11.5, about +12.0, about +12.5, about +13.0, about +13.5, about +14.0, about +14.5, about +15.0, about +15.5, about +16.0, about +16.5, about +17.0, about +17.5, about +18.0, about +18.5, about +19.0, or about +19.5 degrees) from surface normal. In another embodiment, the collection device includes a pipette tip. In some embodiments, the collection device includes a tube having a proximal end and a distal end, wherein the proximal end is in fluid communication with the lumen and the distal end is in fluid communication with an external container.

In some embodiments, the device further includes a second channel having a second depth, a second width, a second proximal end, and a second distal end, wherein the second channel intersects the first channel between the first proximal and first distal ends.

In another embodiment, the droplet formation region includes a shelf having a third depth, a third width, wherein the shelf is configured to allow the first liquid to expand in at least one dimension.

In some embodiments, the droplet formation region further includes a step having a fourth depth. In another embodiment, the device further includes a reservoir configured to be controllably in fluid communication with the collection reservoir. In certain embodiments, the reservoir includes an immiscible displacement fluid.

Another aspect of the invention features a system for collecting and/or processing droplets, the system includes: i) a device for producing droplets of a first liquid in a second liquid, the device includes: a) a first channel having a first depth, a first width, a first proximal end, and a first distal end; b) a droplet formation region in fluid communication with the first channel; c) a collection reservoir in fluid communication with the droplet formation region and configured to collect droplets formed in the droplet formation region, the collection reservoir having a top portion and a bottom portion; d) an oil shunt channel in fluid communication with the bottom portion or configured to be controllably in fluid communication with the bottom portion; e) one or more access channels configured to be controllably in fluid communication with the top portion of the collection reservoir; where the first channel and the droplet formation region are configured to produce droplets of the first liquid in the second liquid; and ii) one or more thermal elements disposed to alter the temperature of the collection reservoir.

In a related embodiment, the device of the system includes two access channels, e.g., a reagent delivery channel and a recovery channel.

Definitions

Where values are described as ranges, it will be understood that such disclosure includes the disclosure of all possible sub-ranges within such ranges, as well as specific numerical values that fall within such ranges irrespective of whether a specific numerical value or specific sub-range is expressly stated.

The term "about", as used herein, refers to +/−10% of a recited value.

The terms "adaptor(s)", "adapter(s)" and "tag(s)" may be used synonymously. An adaptor or tag can be coupled to a polynucleotide sequence to be "tagged" by any approach including ligation, hybridization, or other approaches.

The term "barcode," as used herein, generally refers to a label, or identifier, that conveys or is capable of conveying information about an analyte. A barcode can be part of an analyte. A barcode can be a tag attached to an analyte (e.g., nucleic acid molecule) or a combination of the tag in addition to an endogenous characteristic of the analyte (e.g., size of the analyte or end sequence(s)). A barcode may be unique. Barcodes can have a variety of different formats. For example, barcodes can include: polynucleotide barcodes; random nucleic acid and/or amino acid sequences; and synthetic nucleic acid and/or amino acid sequences. A barcode can be attached to an analyte in a reversible or irreversible manner. A barcode can be added to, for example, a fragment of a deoxyribonucleic acid (DNA) or ribonucleic acid (RNA) sample before, during, and/or after sequencing of the sample. Barcodes can allow for identification and/or quantification of individual sequencing-reads in real time.

The term "bead," as used herein, generally refers to a particle. The bead may be a solid or semi-solid particle. The bead may be a gel bead. The gel bead may include a polymer matrix (e.g., matrix formed by polymerization or cross-linking). The polymer matrix may include one or more polymers (e.g., polymers having different functional groups or repeat units). Polymers in the polymer matrix may be randomly arranged, such as in random copolymers, and/or have ordered structures, such as in block copolymers. Cross-linking can be via covalent, ionic, or inductive, interactions, or physical entanglement. The bead may be a macromolecule. The bead may be formed of nucleic acid molecules bound together. The bead may be formed via covalent or non-covalent assembly of molecules (e.g., macromolecules), such as monomers or polymers. Such polymers or monomers may be natural or synthetic. Such polymers or monomers may be or include, for example, nucleic acid molecules (e.g., DNA or RNA). The bead may be formed of a polymeric material. The bead may be magnetic or non-magnetic. The bead may be rigid. The bead may be flexible and/or compressible. The bead may be disruptable or dissolvable. The bead may be a solid particle (e.g., a metal-based particle including but not limited to iron oxide, gold or silver) covered with a coating comprising one or more polymers. Such coating may be disruptable or dissolvable.

The term "biological particle," as used herein, generally refers to a discrete biological system derived from a biological sample. The biological particle may be a virus. The biological particle may be a cell or derivative of a cell. The biological particle may be an organelle from a cell. Examples of an organelle from a cell include, without limitation, a nucleus, endoplasmic reticulum, a ribosome, a Golgi apparatus, an endoplasmic reticulum, a chloroplast, an endocytic vesicle, an exocytic vesicle, a vacuole, and a lysosome. The biological particle may be a rare cell from a population of cells. The biological particle may be any type of cell, including without limitation prokaryotic cells, eukaryotic cells, bacterial, fungal, plant, mammalian, or other animal cell type, mycoplasmas, normal tissue cells, tumor cells, or any other cell type, whether derived from single cell or multicellular organisms. The biological particle may be a constituent of a cell. The biological particle may be or may include DNA, RNA, organelles, proteins, or any combination thereof. The biological particle may be or may include a matrix (e.g., a gel or polymer matrix) comprising a cell or one or more constituents from a cell (e.g., cell bead), such as DNA, RNA, organelles, proteins, or any combination thereof, from the cell. The biological particle may be obtained from a tissue of a subject. The biological particle may be a hardened cell. Such hardened cell may or may not include a cell wall or cell membrane. The biological particle may include one or more constituents of a cell but may not include other constituents of the cell. An example of such constituents is a nucleus or another organelle of a cell. A cell may be a live cell. The live cell may be capable of being cultured, for example, being cultured when enclosed in a gel or polymer matrix or cultured when comprising a gel or polymer matrix.

The term "controllably in fluid communication with", as used herein, refers to a connection between two device elements that can be opened or closed, e.g., by a valve or frangible element. The opening or closing may be able to occur multiple times or only once.

The term "fluidically connected", as used herein, refers to a direct connection between at least two device elements, e.g., a channel, reservoir, etc., that allows for fluid to move between such device elements without passing through an intervening element.

The term "genome," as used herein, generally refers to genomic information from a subject, which may be, for example, at least a portion or an entirety of a subject's hereditary information. A genome can be encoded either in DNA or in RNA. A genome can comprise coding regions that code for proteins as well as non-coding regions. A genome can include the sequence of all chromosomes together in an organism. For example, the human genome has a total of 46 chromosomes. The sequence of all of these together may constitute a human genome.

The term "in fluid communication with", as used herein, refers to a connection between at least two device elements, e.g., a channel, reservoir, etc., that allows for fluid to move between such device elements with or without passing through one or more intervening device elements.

The term "macromolecular constituent," as used herein, generally refers to a macromolecule contained within or from a biological particle. The macromolecular constituent may comprise a nucleic acid. In some cases, the biological particle may be a macromolecule. The macromolecular constituent may comprise DNA or a DNA molecule. The macromolecular constituent may comprise RNA or an RNA molecule. The RNA may be coding or non-coding. The RNA may be messenger RNA (mRNA), ribosomal RNA (rRNA)

or transfer RNA (tRNA), for example. The RNA may be a transcript. The RNA molecule may be (i) a clustered regularly interspaced short palindromic (CRISPR) RNA molecule (crRNA) or (ii) a single guide RNA (sgRNA) molecule. The RNA may be small RNA that are less than 200 nucleic acid bases in length, or large RNA that are greater than 200 nucleic acid bases in length. Small RNAs may include 5.8S ribosomal RNA (rRNA), 5S rRNA, transfer RNA (tRNA), microRNA (miRNA), small interfering RNA (siRNA), small nucleolar RNA (snoRNAs), Piwi-interacting RNA (piRNA), tRNA-derived small RNA (tsRNA) and small rDNA-derived RNA (srRNA). The RNA may be double-stranded RNA or single-stranded RNA. The RNA may be circular RNA. The macromolecular constituent may comprise a protein. The macromolecular constituent may comprise a peptide. The macromolecular constituent may comprise a polypeptide or a protein. The polypeptide or protein may be an extracellular or an intracellular polypeptide or protein. The macromolecular constituent may also comprise a metabolite. These and other suitable macromolecular constituents (also referred to as analytes) will be appreciated by those skilled in the art (see U.S. Pat. Nos. 10,011,872 and 10,323,278, and WO/2019/157529 each of which is incorporated herein by reference in its entirety).

The term "molecular tag," as used herein, generally refers to a molecule capable of binding to a macromolecular constituent. The molecular tag may bind to the macromolecular constituent with high affinity. The molecular tag may bind to the macromolecular constituent with high specificity. The molecular tag may comprise a nucleotide sequence. The molecular tag may comprise an oligonucleotide or polypeptide sequence. The molecular tag may comprise a DNA aptamer. The molecular tag may be or comprise a primer. The molecular tag may be or comprise a protein. The molecular tag may comprise a polypeptide. The molecular tag may be a barcode.

The term "oil," as used herein, generally refers to a liquid that is not miscible with water. An oil may have a density higher or lower than water and/or a viscosity higher or lower than water.

The term "sample," as used herein, generally refers to a biological sample of a subject. The biological sample may be a nucleic acid sample or protein sample. The biological sample may be derived from another sample. The sample may be a tissue sample, such as a biopsy, core biopsy, needle aspirate, or fine needle aspirate. The sample may be a liquid sample, such as a blood sample, urine sample, or saliva sample. The sample may be a skin sample. The sample may be a cheek swap. The sample may be a plasma or serum sample. The sample may include a biological particle, e.g., a cell or virus, or a population thereof, or it may alternatively be free of biological particles. A cell-free sample may include polynucleotides. Polynucleotides may be isolated from a bodily sample that may be selected from the group consisting of blood, plasma, serum, urine, saliva, mucosal excretions, sputum, stool and tears.

The term "sequencing," as used herein, generally refers to methods and technologies for determining the sequence of nucleotide bases in one or more polynucleotides. The polynucleotides can be, for example, nucleic acid molecules such as deoxyribonucleic acid (DNA) or ribonucleic acid (RNA), including variants or derivatives thereof (e.g., single stranded DNA). Sequencing can be performed by various systems currently available, such as, without limitation, a sequencing system by ILLUMINA®, Pacific Biosciences (PACBIO®), Oxford NANOPORE®, or Life Technologies (ION TORRENT®). Alternatively or in addition, sequencing may be performed using nucleic acid amplification, polymerase chain reaction (PCR) (e.g., digital PCR, quantitative PCR, or real time PCR), or isothermal amplification. Such systems may provide a plurality of raw genetic data corresponding to the genetic information of a subject (e.g., human), as generated by the systems from a sample provided by the subject. In some examples, such systems provide sequencing reads (also "reads" herein). A read may include a string of nucleic acid bases corresponding to a sequence of a nucleic acid molecule that has been sequenced. In some situations, systems and methods provided herein may be used with proteomic information.

The term "subject," as used herein, generally refers to an animal, such as a mammal (e.g., human) or avian (e.g., bird), or other organism, such as a plant. The subject can be a vertebrate, a mammal, a mouse, a primate, a simian or a human. Animals may include, but are not limited to, farm animals, sport animals, and pets. A subject can be a healthy or asymptomatic individual, an individual that has or is suspected of having a disease (e.g., cancer) or a predisposition to the disease, or an individual that is in need of therapy or suspected of needing therapy. A subject can be a patient.

The term "substantially stationary", as used herein with respect to droplet formation, generally refers to a state when motion of formed droplets in the continuous phase is passive, e.g., resulting from the difference in density between the dispersed phase and the continuous phase.

BRIEF DESCRIPTION OF THE DRAWINGS

FIG. 9A is top view of a device of the invention with reservoirs. FIG. 9B is a micrograph of a first channel intersected by a second channel adjacent a droplet formation region.

FIG. 13A is an overview of a device with four droplet formation regions. FIG. 13B is a zoomed in view of an exemplary droplet formation region within the dotted line box in FIG. 13A.

FIG. 14A shows a device with three reservoirs employed in droplet formation. FIG. 14B is a device of the invention with four reservoirs employed in the droplet formation.

FIGS. 16A-16B are views of an embodiment according to the invention. FIG. 16A is a top view of a device having two liquid channels that meet adjacent to a droplet formation region. FIG. 16B is a zoomed in view of the droplet formation region showing the individual droplet formations regions.

FIG. 17A is an overview of the method, and FIG. 17B is a micrograph showing the use of a blocking fluid to protect a channel from a coating agent.

FIG. 18A shows the piezoelectric element in a first state. FIG. 18B shows the piezoelectric element in a second state.

FIGS. 23A-23C are schemes of a collection reservoir including a lumen configured to accept a collection device. FIG. 23A shows a collection reservoir including a lumen configured to accept a tube. FIG. 23B shows the tube in fluid communication with the lumen of the collection reservoir and an external container. The tube is configured to transfer droplets from the collection reservoir to the external container. FIG. 23C shows droplets being transferred to an external collection device by a displacement fluid (e.g., an immiscible fluid).

FIGS. 24A-24B are schemes of a collection reservoir including a lumen configured to accept a collection device. FIG. 24A shows a collection reservoir including a lumen configured to accept a pipette tip. FIG. 24B shows a collection reservoir the pipette tip inserted in the lumen.

FIG. 25A shows the collection reservoir in fluid communication with a droplet formation region. The collection reservoir includes a top portion and a bottom portion. An oil shunt channel, a reagent delivery channel, and a recovery channel connect to the collection reservoir. The collection reservoir is coupled to two thermal elements disposed to alter the temperature in the collection reservoir. FIG. 25B shows the collection reservoir being filled with droplets (circles) from the droplet formation region. FIG. 25C shows an aqueous layer (top) from a broken emulsion and an oil layer (bottom, vertical stripes).

DETAILED DESCRIPTION OF THE INVENTION

Figure 1:
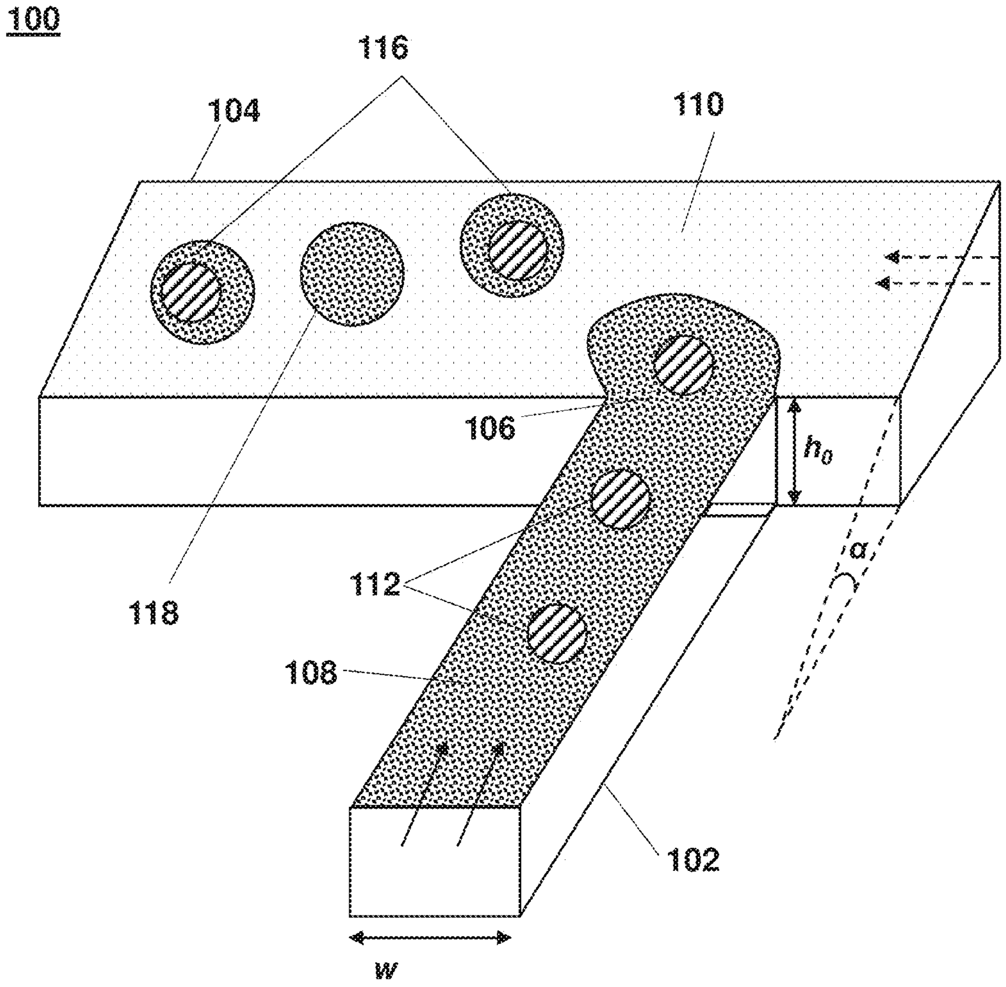
FIG. 1 shows an example of a microfluidic device for the introduction of particles, e.g., beads, into discrete droplets.

The invention provides kits, devices, methods, and systems for forming droplets or particles and methods of their use. The devices may be used to form droplets of a size suitable for utilization as microscale chemical reactors, e.g., for genetic sequencing. In general, droplets are formed in a device by flowing a first liquid through a channel and into a droplet formation region including a second liquid, i.e., the continuous phase. The invention allows for more efficient recovery of droplets or processed droplets.

Devices

A device of the invention includes a first channel having a depth, a width, a proximal end, and a distal end. The proximal end is or is configured to be in fluid communication with a source of liquid, e.g., a reservoir integral to the device or coupled to the device, e.g., by tubing. The distal end is in fluid communication with, e.g., fluidically connected to, a droplet formation region. A droplet formation region allows liquid from the first channel to expand in at least one dimension, leading to droplet formation under appropriate conditions as described herein. A droplet formation region can be of any suitable geometry, e.g., include a shelf and a step as described herein.

Droplet or Particle Sources

The devices described herein include a droplet or particle source. The droplet or particle source may include a droplet or particle formation region. Droplets or particles may be formed by any suitable method known in the art. In general, droplet formation includes two liquid phases. The two phases may be, for example, an aqueous phase and an oil phase. During formation, a plurality of discrete volume droplets or particles are formed.

The droplets may be formed by shaking or stirring a liquid to form individual droplets, creating a suspension or an emulsion containing individual droplets, or forming the droplets through pipetting techniques, e.g., with needles, or the like. The droplets may be formed made using a micro-, or nanofluidic droplet maker. Examples of such droplet makers include, e.g., a T-junction droplet maker, a Y-junction droplet maker, a channel-within-a-channel junction droplet maker, a cross (or "X") junction droplet maker, a flow-focusing junction droplet maker, a micro-capillary droplet maker (e.g., co-flow or flow-focus), and a three-dimensional droplet maker. The droplets may be produced using a flow-focusing device, or with emulsification systems, such as homogenization, membrane emulsification, shear cell emulsification, and fluidic emulsification.

Discrete liquid droplets may be encapsulated by a carrier fluid that wets the microchannel. These droplets, sometimes known as plugs, form the dispersed phase in which the reactions occur. Systems that use plugs differ from segmented-flow injection analysis in that reagents in plugs do not come into contact with the microchannel. In T junctions, the disperse phase and the continuous phase are injected from two branches of the "T". Droplets of the disperse phase are produced as a result of the shear force and interfacial tension at the fluid-fluid interface. The phase that has lower interfacial tension with the channel wall is the continuous phase. To generate droplets in a flow-focusing configuration, the continuous phase is injected through two outside channels and the disperse phase is injected through a central channel into a narrow orifice. Other geometric designs to create droplets would be known to one of skill in the art. Methods of producing droplets are disclosed in Song et al. *Angew. Chem.* 45: 7336-7356, 2006, Mazutis et al. *Nat. Protoc.* 8(5):870-891, 2013, U.S. Pat. No. 9,839,911; U.S. Pub. Nos. 2005/0172476, 2006/0163385, and 2007/0003442, PCT Pub. Nos. WO 2009/005680 and WO 2018/009766. In some embodiments, electric fields or acoustic waves may be used to produce droplets, e.g., as described in PCT Pub. No. WO 2018/009766.

In one embodiment, the droplet formation region includes a shelf region that allows liquid to expand substantially in one dimension, e.g., perpendicular to the direction of flow. The width of the shelf region is greater than the width of the first channel at its distal end. In certain embodiments, the first channel is a channel distinct from a shelf region, e.g., the shelf region widens or widens at a steeper slope or curvature than the distal end of the first channel. In other embodiments, the first channel and shelf region are merged into a continuous flow path, e.g., one that widens linearly or non-linearly from its proximal end to its distal end; in these embodiments, the distal end of the first channel can be considered to be an arbitrary point along the merged first channel and shelf region. In another embodiment, the droplet formation region includes a step region, which provides a spatial displacement and allows the liquid to expand in more than one dimension. The spatial displacement may be upward or downward or both relative to the channel. The choice of direction may be made based on the relative density of the dispersed and continuous phases, with an upward step employed when the dispersed phase is less dense than the continuous phase and a downward step employed when the dispersed phase is denser than the continuous phase. Droplet formation regions may also include combinations of a shelf and a step region, e.g., with the shelf region disposed between the channel and the step region.

Without wishing to be bound by theory, droplets of a first liquid can be formed in a second liquid in the devices of the invention by flow of the first liquid from the distal end into the droplet formation region. In embodiments with a shelf region and a step region, the stream of first liquid expands laterally into a disk-like shape in the shelf region. As the stream of first liquid continues to flow across the shelf region, the stream passes into the step region wherein the droplet assumes a more spherical shape and eventually detaches from the liquid stream. As the droplet is forming, passive flow of the continuous phase around the nascent droplet occurs, e.g., into the shelf region, where it reforms the continuous phase as the droplet separates from its liquid stream. Droplet formation by this mechanism can occur without externally driving the continuous phase, unlike in other systems. It will be understood that the continuous phase may be externally driven during droplet formation, e.g., by gently stirring or vibration but such motion is not necessary for droplet formation.

In these embodiments, the size of the generated droplets is significantly less sensitive to changes in liquid properties. For example, the size of the generated droplets is less sensitive to the dispersed phase flow rate. Adding multiple formation regions is also significantly easier from a layout and manufacturing standpoint. The addition of further formation regions allows for formation of droplets even in the event that one droplet formation region becomes blocked. Droplet formation can be controlled by adjusting one or more geometric features of fluidic channel architecture, such as a width, height, and/or expansion angle of one or more fluidic channels. For example, droplet size and speed of droplet formation may be controlled. In some instances, the number of regions of formation at a driven pressure can be increased to increase the throughput of droplet formation.

Passive flow of the continuous phase may occur simply around the nascent droplet. The droplet formation region may also include one or more channels that allow for flow of the continuous phase to a location between the distal end of the first channel and the bulk of the nascent droplet. These channels allow for the continuous phase to flow behind a nascent droplet, which modifies (e.g., increase or decreases) the rate of droplet formation. Such channels may be fluidically connected to a reservoir of the droplet formation region or to different reservoirs of the continuous phase. Although externally driving the continuous phase is not necessary, external driving may be employed, e.g., to pump continuous phase into the droplet formation region via additional channels. Such additional channels may be to one or both lateral sides of the nascent droplet or above or below the plane of the nascent droplet.

In general, the components of a device, e.g., channels, may have certain geometric features that at least partly determine the sizes of the droplets. For example, any of the channels described herein have a depth, a height, $h_0$, and width, w. The droplet formation region may have an expansion angle, α. Droplet size may decrease with increasing expansion angle. The resulting droplet radius, $R_d$, may be predicted by the following equation for the aforementioned geometric parameters of $h_0$, w, and α:

$$R_d \approx 0.44\left(1 + 2.2\sqrt{\tan\alpha}\frac{w}{h_0}\right)\frac{h_0}{\sqrt{\tan\alpha}}$$

As a non-limiting example, for a channel with w=21 μm, h=21 μm, and α=3°, the predicted droplet size is 121 μm. In another example, for a channel with w=25 μm, h=25 μm, and α=5°, the predicted droplet size is 123 μm. In yet another example, for a channel with w=28 μm, h=28 μm, and α=7°, the predicted droplet size is 124 μm. In some instances, the expansion angle may be between a range of from about 0.5° to about 4°, from about 0.1° to about 10°, or from about 0° to about 90°. For example, the expansion angle can be at least about 0.01°, 0.1°, 0.2°, 0.3°, 0.4°, 0.5°, 0.6°, 0.7°, 0.8°, 0.9°, 1°, 2°, 3°, 4°, 5°, 6°, 7°, 8°, 9°, 10°, 15°, 20°, 25°, 30°, 35°, 40°, 45°, 50°, 55°, 60°, 65°, 70°, 75°, 80°, 85°, or higher. In some instances, the expansion angle can be at most about 89°, 88°, 87°, 86°, 85°, 84°, 83°, 82°, 81°, 80°, 75°, 70°, 65°, 60°, 55°, 50°, 45°, 40°, 35°, 30°, 25°, 20°, 15°, 10°, 9°, 8°, 7°, 6°, 5°, 4°, 3°, 2°, 1°, 0.1°, 0.01°, or less.

The depth and width of the first channel may be the same, or one may be larger than the other, e.g., the width is larger than the depth, or first depth is larger than the width. In some embodiments, the depth and/or width is between about 0.1 μm and 1000 μm. In some embodiments, the depth and/or width of the first channel is from 1 to 750 μm, 1 to 500 μm, 1 to 250 μm, 1 to 100 μm, 1 to 50 μm, or 3 to 40 μm. In some cases, when the width and length differ, the ratio of the width to depth is, e.g., from 0.1 to 10, e.g., 0.5 to 2 or greater than 3, such as 3 to 10, 3 to 7, or 3 to 5. The width and depths of the first channel may or may not be constant over its length. In particular, the width may increase or decrease adjacent the distal end. In general, channels may be of any suitable cross section, such as a rectangular, triangular, or circular, or a combination thereof. In particular embodiments, a channel may include a groove along the bottom surface. The width or depth of the channel may also increase or decrease, e.g., in discrete portions, to alter the rate of flow of liquid or particles or the alignment of particles.

Devices of the invention may also include additional channels that intersect the first channel between its proximal and distal ends, e.g., one or more second channels having a second depth, a second width, a second proximal end, and a second distal end. Each of the first proximal end and second proximal ends are or are configured to be in fluid communication with, e.g., fluidically connected to, a source of liquid, e.g., a reservoir integral to the device or coupled to the device, e.g., by tubing. The inclusion of one or more intersection channels allows for splitting liquid from the first channel or introduction of liquids into the first channel, e.g., that combine with the liquid in the first channel or do not combine with the liquid in the first channel, e.g., to form a sheath flow. Channels can intersect the first channel at any suitable angle, e.g., between 5° and 135° relative to the centerline of the first channel, such as between 75° and 115° or 85° and 95°. Additional channels may similarly be present to allow introduction of further liquids or additional flows of the same liquid. Multiple channels can intersect the first channel on the same side or different sides of the first channel. When multiple channels intersect on different sides, the channels may intersect along the length of the first channel to allow liquid introduction at the same point. Alternatively, channels may intersect at different points along the length of the first channel. In some instances, a channel configured to direct a liquid comprising a plurality of particles may comprise one or more grooves in one or more surface of the channel to direct the plurality of particles towards the droplet formation fluidic connection. For example, such guidance may increase single occupancy rates of the generated droplets. These additional channels may have any of the structural features discussed above for the first channel.

Devices may include multiple first channels, e.g., to increase the rate of droplet formation. In general, throughput may significantly increase by increasing the number of droplet formation regions of a device. For example, a device having five droplet formation regions may generate five times as many droplets simultaneously relative to a device having one droplet formation region, provided that the liquid flow rate is substantially the same. A device may have as many droplet formation regions as is practical and allowed for the size of the source of liquid, e.g., reservoir. For example, the device may have at least about 2, 3, 4, 5, 6, 7, 8, 9, 10, 20, 30, 40, 50, 60, 70, 80, 90, 100, 150, 200, 250, 300, 350, 400, 450, 500, 600, 700, 800, 900, 1000, 1500, 2000 or more droplet formation regions. Inclusion of multiple droplet formation regions may require the inclusion of channels that traverse but do not intersect, e.g., the flow path is in a different plane. Multiple first channel may be in fluid communication with, e.g., fluidically connected to, a separate source reservoir and/or a separate droplet formation region. In other embodiments, two or more first channels are in fluid communication with, e.g., fluidically connected to, the same fluid source, e.g., where the multiple first channels branch from a single, upstream channel. The droplet formation region may include a plurality of inlets in fluid communication with the first proximal end and a plurality of outlets (e.g., plurality of outlets in fluid communication with a collection reservoir) (e.g., fluidically connected to the first proximal end and in fluid communication with a plurality of outlets). The number of inlets and the number of outlets in the droplet formation region may be the same (e.g., there may be 3-10 inlets and/or 3-10 outlets). Alternatively or in addition, the throughput of droplet formation can be increased by increasing the flow rate of the first liquid. In some cases, the throughput of droplet formation can be increased by having a plurality of single droplet forming devices, e.g., devices with a first channel and a droplet formation region, in a single device, e.g., parallel droplet formation.

The width of a shelf region may be from 0.1 μm to 1000 μm. In particular embodiments, the width of the shelf is from 1 to 750 μm, 10 to 500 μm, 10 to 250 μm, or 10 to 150 μm. The width of the shelf region may be constant along its length, e.g., forming a rectangular shape. Alternatively, the width of the shelf region may increase along its length away from the distal end of the first channel. This increase may be linear, nonlinear, or a combination thereof. In certain embodiments, the shelf widens 5% to 10,000%, e.g., at least 300%, (e.g., 10% to 500%, 100% to 750%, 300% to 1000%, or 500% to 1000%) relative to the width of the distal end of the first channel. The depth of the shelf can be the same as or different from the first channel. For example, the bottom of the first channel at its distal end and the bottom of the shelf region may be coplanar. Alternatively, a step or ramp may be present where the distal end meets the shelf region. The depth of the distal end may also be greater than the shelf region, such that the first channel forms a notch in the shelf region. The depth of the shelf may be from 0.1 to 1000 μm, e.g., 1 to 750 μm, 1 to 500 μm, 1 to 250 μm, 1 to 100 μm, 1 to 50 μm, or 3 to 40 μm. In some embodiments, the depth is substantially constant along the length of the shelf. Alternatively, the depth of the shelf slopes, e.g., downward or upward, from the distal end of the liquid channel to the step region. The final depth of the sloped shelf may be, for example, from 5% to 1000% greater than the shortest depth, e.g., 10 to 750%, 10 to 500%, 50 to 500%, 60 to 250%, 70 to 200%, or 100 to 150%. The overall length of the shelf region may be from at least about 0.1 μm to about 1000 μm, e.g., 0.1 to 750 μm, 0.1 to 500 μm, 0.1 to 250 μm, 0.1 to 150 μm, 1 to 150 μm, 10 to 150 μm, 50 to 150 μm, 100 to 150 μm, 10 to 80 μm, or 10 to 50 μm. In certain embodiments, the lateral walls of the shelf region, i.e., those defining the width, may be not parallel to one another. In other embodiments, the walls of the shelf region may narrower from the distal end of the first channel towards the step region. For example, the width of the shelf region adjacent the distal end of the first channel may be sufficiently large to support droplet formation. In other embodiments, the shelf region is not substantially rectangular, e.g., not rectangular or not rectangular with rounded or chamfered corners.

A step region includes a spatial displacement (e.g., depth). Typically, this displacement occurs at an angle of approximately 90°, e.g., between 85° and 95°. Other angles are possible, e.g., 10-90°, e.g., 20 to 90°, 45 to 90°, or 70 to 90°. The spatial displacement of the step region may be any suitable size to be accommodated on a device, as the ultimate extent of displacement does not affect performance of the device. The spatial displacement may be part of a wall, e.g., of a collection reservoir. The depth of the step may be greater than the depth of the distal end and the depth of the shelf, and the depth of the distal end may be greater than the depth of the shelf. Preferably the displacement is several times the diameter of the droplet being formed. In certain embodiments, the displacement is from about 1 μm to about 10 cm, e.g., at least 10 μm, at least 40 μm, at least 100 μm, or at least 500 μm, e.g., 40 μm to 600 μm. In some cases, the depth of the step region is substantially constant. In some embodiments, the displacement is at least 40 μm, at least 45 μm, at least 50 μm, at least 55 μm, at least 60 μm, at least 65 μm, at least 70 μm, at least 75 μm, at least 80 μm, at least 85 μm, at least 90 μm, at least 95 μm, at least 100 μm, at least 110 μm, at least 120 μm, at least 130 μm, at least 140 μm, at least 150 μm, at least 160 μm, at least 170 μm, at least 180 μm, at least 190 μm, at least 200 μm, at least 220 μm, at least 240 μm, at least 260 μm, at least 280 μm, at least 300 μm, at least 320 μm, at least 340 μm, at least 360 μm, at least 380 μm, at least 400 μm, at least 420 μm, at least 440 μm, at least 460 μm, at least 480 μm, at least 500 μm, at least 520 μm, at least 540 μm, at least 560 μm, at least 580 μm, or at least 600 μm. Alternatively, the depth of the step region may increase away from the shelf region, e.g., to allow droplets that sink or float to roll away from the spatial displacement as they are formed. The step region may also increase in depth in two dimensions relative to the shelf region, e.g., both above and below the plane of the shelf region. The reservoir may have an inlet and/or an outlet for the addition of continuous phase, flow of continuous phase, or removal of the continuous phase and/or droplets.

While dimension of the devices may be described as width or depths, the channels, shelf regions, and step regions may be disposed in any plane. For example, the width of the shelf may be in the x-y plane, the x-z plane, the y-z plane or any plane therebetween. In addition, a droplet formation region, e.g., including a shelf region, may be laterally spaced in the x-y plane relative to the first channel or located above or below the first channel. Similarly, a droplet formation region, e.g., including a step region, may be laterally spaced in the x-y plane, e.g., relative to a shelf region or located above or below a shelf region. The spatial displacement in a step region may be oriented in any plane suitable to allow the nascent droplet to form a spherical shape. The fluidic components may also be in different planes so long as connectivity and other dimensional requirements are met.

The device also includes a reservoir for collecting droplets formed in the droplet formation region. The collection reservoir may include a lumen configured to accept a collection device. In some cases, the lumen has an angle between ±45°, e.g., about −45°, about −44.5°, about −44°, about −43.5°, about −43°, about −42.5°, about −42°, about −41.5°, about −41°, about −40.5°, about −40°, about −39.5°, about −39°, about −38.5°, about −38°, about −37.5°, about −37°, about −36.5°, about −36°, about −35.5°, about −35°, about −34.5°, about −34°, about −33.5°, about −33°, about −32.5°, about −32°, about −31.5°, about −31°, about −30.5°, about −30°, about −29.5°, about −29°, about −28.5°, about −28°, about −27.5°, about −27°, about −26.5°, about −26°, about −25.5°, about −25°, about −24.5°, about −24°, about −23.5°, about −23°, about −22.5°, about −22°, about −21.5°, about −21°, about −20.5°, about −20°, about −19.5°, about −19°, about −18.5°, about −18°, about −17.5°, about −17°, about −16.5°, about −16°, about −15.5°, about −15°, about −14.5°, about −14°, about −13.5°, about −13°, about −12.5°, about −12°, about −11.5°, about −11°, about −10.5°, about −10°, about −9.5°, about −9°, about −8.5°, about −8°, about −7.5°, about −7°, about −6.5°, about −6°, about −5.5°, about −5°, about −4.5°, about −4°, about −3.5°, about −3°, about −2.5°, about −2°, about −1.5°, about −1°, about −0.5°, about 0°, about 0.5°, about 1°, about 1.5°, about 2°, about 2.5°, about 3°, about 3.5°, about 4°, about 4.5°, about 5°, about 5.5°, about 6°, about 6.5°, about 7°, about 7.5°, about 8°, about 8.5°, about 9°, about 9.5°, about 10°, about 10.5°, about 11°, about 11.5°, about 12°, about 12.5°, about 13°, about 13.5°, about 14°, about 14.5°, about 15°, about 15.5°, about 16°, about 16.5°, about 17°, about 17.5°, about 18°, about 18.5°, about 19°, about 19.5°, about 20°, about 20.5°, about 21°, about 21.5°, about 22°, about 22.5°, about 23°, about 23.5°, about 24°, about 24.5°, about 25°, about 25.5°, about 26°, about 26.5°, about 27°, about 27.5°, about 28°, about 28.5°, about 29°, about 29.5°, about 30°, about 30.5°, about 31°, about 31.5°, about 32°, about 32.5°, about 33°, about 33.5°, about 34°, about 34.5°, about 35°, about 35.5°, about 36°, about 36.5°, about 37°, about 37.5°, about 38°, about 38.5°, about 39°, about 39.5°, about 40°, about 40.5°, about 41°, about 41.5°, about 42°, about 42.5°, about 43°, about 43.5°, about 44°, about 44.5°, or about 45°. In some cases, the lumen is between ±45°, e.g., between about −45° and about −15°, between about −15° and about 15°, between about 15° and about 45°, between about −45° and about −30°, between about −35° and about −20°, between about −25° and about −10°, between about −15° and about 0°, between about −5° and about 10°, between about 5° and about 20°, between about 15° and about 30°, between about 25° and about 40°, or between about 35° and about 45° from surface normal.

In some instances, the collection reservoir has a top portion and a bottom portion. In some cases, an oil shunt channel is in fluid communication with the bottom portion of the collection reservoir, e.g., controllably in fluid communication. In certain cases, one or more access channels, e.g., a reagent delivery channel and/or a recovery channel are in fluid communication with the top portion of the collection reservoir, e.g., controllably in fluid communication with the top portion. The access channels can be used to deliver reagent, e.g., to break an emulsion, and/or to remove the liquid layer, typically aqueous, produced by breaking the emulsion. In some instances, one or more thermal elements are disposed to alter the temperature of the collection reservoir. In some instances, two thermal elements, e.g., resistive heaters, water baths, oil baths, or Peltier devices, are disposed to alter the temperature of the collection reservoir. In some instances, one thermal element disposed near the top portion of the collection reservoir, and one thermal element is disposed near the bottom portion of the collection reservoir. Thermal elements may or may not be integrated within the devices.

The device may also include reservoirs for liquid reagents, e.g., a first or second liquid. For example, the device may include a reservoir for the liquid to flow in a channel, e.g., the first channel. For reservoirs or other elements used in collection, the walls may be smooth and not include an orthogonal element that would impede droplet movement. For example, the walls may not include any feature that at least in part protrudes or recedes from the surface. It will be understood, however, that such elements may have a ceiling or floor. The droplets that are formed may be moved out of the path of the next droplet being formed by gravity (either upward or downward depending on the relative density of the droplet and continuous phase). Alternatively or in addition, formed droplets may be moved out of the path of the next droplet being formed by an external force applied to the liquid in the collection reservoir, e.g., gentle stirring, flowing continuous phase, or vibration. Similarly, a reservoir for liquids to flow in additional channels, such as those intersecting the first channel may be present. A single reservoir may also be connected to multiple channels in a device, e.g., when the same liquid is to be introduced at two or more different locations in the device. Waste reservoirs or overflow reservoirs may also be included to collect waste or overflow when droplets are formed. Alternatively, the device may be configured to mate with sources of the liquids, which may be external reservoirs such as vials, tubes, or pouches. Similarly, the device may be configured to mate with a separate component that houses the reservoirs. Reservoirs may be of any appropriate size, e.g., to hold 10 μL to 500 mL, e.g., 10 μL to 300 mL, 25 μL to 10 mL, 100 μL to 1 mL, 40 μL to 300 μL, 1 mL to 10 mL, or 10 mL to 50 mL. When multiple reservoirs are present, each reservoir may have the same or a different size.

In addition to the components discussed above, devices of the invention can include additional components. For example, channels may include filters to prevent introduction of debris into the device. In some cases, the microfluidic systems described herein may comprise one or more liquid flow units to direct the flow of one or more liquids, such as the aqueous liquid and/or the second liquid immiscible with the aqueous liquid. In some instances, the liquid flow unit may comprise a compressor to provide positive pressure at an upstream location to direct the liquid from the upstream location to flow to a downstream location. In some instances, the liquid flow unit may include a pump to provide negative pressure at a downstream location to direct the liquid from an upstream location to flow to the downstream location. In some instances, the liquid flow unit may include both a compressor and a pump, each at different locations. In some instances, the liquid flow unit may comprise different devices at different locations. The liquid flow unit may include an actuator. In some instances, where the second liquid is substantially stationary, the reservoir may maintain a constant pressure field at or near each droplet formation region. Devices may also include various valves to control the flow of liquids along a channel or to allow introduction or removal of liquids or droplets from the device. Suitable valves are known in the art. Valves useful for a device of the present invention include diaphragm valves, solenoid valves, pinch valves, or a combination thereof. Valves can be controlled manually, electrically, magnetically, hydraulically, pneumatically, or by a combination thereof. The device may also include integral liquid pumps or be connectable to a pump to allow for pumping in the first channels and any other channels requiring flow. Examples of pressure pumps include syringe, peristaltic, diaphragm pumps, and sources of vacuum. Other pumps can employ centrifugal or electrokinetic forces. Alternatively, liquid movement may be controlled by gravity, capillarity, or surface treatments. Multiple pumps and mechanisms for liquid movement may be employed in a single device. The device may also include one or more vents to allow pressure equalization, and one or more filters to remove particulates or other undesirable components from a liquid. The device may also include one or more inlets and or outlets, e.g., to introduce liquids and/or remove droplets. Such additional components may be actuated or monitored by one or more controllers or computers operatively coupled to the device, e.g., by being integrated with, physically connected to (mechanically or electrically), or by wired or wireless connection.

Alternatively or in addition to controlling droplet formation via microfluidic channel geometry, droplet formation may be controlled using one or more piezoelectric elements. Piezoelectric elements may be positioned inside a channel (i.e., in contact with a fluid in the channel), outside the channel (i.e., isolated from the fluid), or a combination thereof. In some cases, the piezoelectric element may be at the exit of a channel, e.g., where the channel connects to a reservoir or other channel, that serves as a droplet generation point. For example, the piezoelectric element may be integrated with the channel or coupled or otherwise fastened to the channel. Examples of fastenings include, but are not limited to, complementary threading, form-fitting pairs, hooks and loops, latches, threads, screws, staples, clips, clamps, prongs, rings, brads, rubber bands, rivets, grommets, pins, ties, snaps, adhesives (e.g., glue), tapes, vacuum, seals, magnets, or a combination thereof. In some instances, the piezoelectric element can be built into the channel. Alternatively or in addition, the piezoelectric element may be connected to a reservoir or channel or may be a component of a reservoir or channel, such as a wall. In some cases, the piezoelectric element may further include an aperture therethrough such that liquids can pass upon actuation of the piezoelectric element, or the device may include an aperture operatively coupled to the piezoelectric element.

The piezoelectric element can have various shapes and sizes. The piezoelectric element may have a shape or cross-section that is circular, triangular, square, rectangular, or partial shapes or combination of shapes thereof. The piezoelectric element can have a thickness from about 100 micrometers (μm) to about 100 millimeters (mm). The piezoelectric element can have a dimension (e.g., cross-section) of at least about 1 mm. The piezoelectric element can be formed of, for example, lead zirconate titanate, zinc oxide, barium titanate, potassium niobate, sodium tungstate, $Ba_2NaNb_5O_5$, and $Pb_2KNb_5O_{15}$. The piezoelectric element, for example, can be a piezo crystal. The piezoelectric element may contract when a voltage is applied and return to its original state when the voltage is unapplied. Alternatively, the piezoelectric element may expand when a voltage is applied and return to its original state when the voltage is unapplied. Alternatively or in addition, application of a voltage to the piezoelectric element can cause mechanical stress, vibration, bending, deformation, compression, decompression, expansion, and/or a combination thereof in its structure, and vice versa (e.g., applying some form of mechanical stress or pressure on the piezoelectric element may produce a voltage). In some instances, the piezoelectric element may include a composite of both piezoelectric material and non-piezoelectric material.

In some instances, the piezoelectric element may be in a first state when no electrical charge is applied, e.g., an equilibrium state. When an electrical charge is applied to the piezoelectric element, the piezoelectric element may bend backwards, pulling a part of the first channel outwards, and drawing in more of the first fluid into the first channel via negative pressure, such as from a reservoir of the first fluid. When the electrical charge is altered, the piezoelectric element may bend in another direction (e.g., inwards towards the contents of the channel), pushing a part of the first channel inwards, and propelling (e.g., at least partly via displacement) a volume of the first fluid, thereby generating a droplet of the first fluid in a second fluid. After the droplet is propelled, the piezoelectric element may return to the first state. The cycle can be repeated to generate more droplets. In some instances, each cycle may generate a plurality of droplets (e.g., a volume of the first fluid propelled breaks off as it enters the second fluid to form a plurality of discrete droplets). A plurality of droplets can be collected in a second channel for continued transportation to a different location (e.g., reservoir), direct harvesting, and/or storage.

While the above non-limiting example describes bending of the piezoelectric element in response to application of an electrical charge, the piezoelectric may undergo or experience vibration, bending, deformation, compression, decompression, expansion, other mechanical stress and/or a combination thereof upon application of an electrical charge, which movement may be translated to the first channel.

In some cases, a channel may include a plurality of piezoelectric elements working independently or cooperatively to achieve the desired formation (e.g., propelling) of droplets. For example, a first channel of a device can be coupled to at least 1, 2, 3, 4, 5, 6, 7, 8, 9, 10, 20, 30, 40, 50, 60, 70, 80, 90, 100, 200, 300, 400, or 500 piezoelectric elements. In an example, a separate piezoelectric element may be operatively coupled to (or be integrally part of) each side wall of a channel. In another example, multiple piezoelectric elements may be positioned adjacent to one another along an axis parallel to the direction of flow in the first channel. Alternatively or in addition, multiple piezoelectric elements may circumscribe the first channel. For example, a plurality of piezoelectric elements may each be in electrical communication with the same controller or one or more different controllers. The throughput of droplet generation can be increased by increasing the points of generation, such as increasing the number of junctions between first fluid channels and the second fluid channel. For example, each of the first fluid channels may comprise a piezoelectric element for controlled droplet generation at each point of generation. The piezoelectric element may be actuated to facilitate droplet formation and/or flow of the droplets.

The frequency of application of electrical charge to the piezoelectric element may be adjusted to control the speed of droplet generation. For example, the frequency of droplet generation may increase with the frequency of alternating electrical charge. Additionally, the material of the piezoelectric element, number of piezoelectric elements in the channel, the location of the piezoelectric elements, strength of the electrical charge applied, hydrodynamic forces of the respective fluids, and other factors may be adjusted to control droplet generation and/or size of the droplets generated. For example, without wishing to be bound by a particular theory, if the strength of the electrical charge applied is increased, the mechanical stress experienced by the piezoelectric element may be increased, which can increase the impact on the structural deformation of the first channel, increasing the volume of the first fluid propelled, resulting in an increased droplet size.

In a non-limiting example, the first channel can carry a first fluid (e.g., aqueous) and the second channel can carry a second fluid (e.g., oil) that is immiscible with the first fluid. The two fluids can communicate at a junction. In some instances, the first fluid in the first channel may include suspended particles. The particles may be beads, biological particles, cells, cell beads, or any combination thereof (e.g., a combination of beads and cells or a combination of beads and cell beads, etc.). A discrete droplet generated may include a particle, such as when one or more particles are suspended in the volume of the first fluid that is propelled into the second fluid. Alternatively, a discrete droplet generated may include more than one particle. Alternatively, a discrete droplet generated may not include any particles. For example, in some instances, a discrete droplet generated may contain one or more biological particles where the first fluid in the first channel includes a plurality of biological particles.

Alternatively or in addition, one or more piezoelectric elements may be used to control droplet formation acoustically.

The piezoelectric element may be operatively coupled to a first end of a buffer substrate (e.g., glass). A second end of the buffer substrate, opposite the first end, may include an acoustic lens. In some instances, the acoustic lens can have a spherical, e.g., hemispherical, cavity. In other instances, the acoustic lens can be a different shape and/or include one or more other objects for focusing acoustic waves. The second end of the buffer substrate and/or the acoustic lens can be in contact with the first fluid in the first channel. Alternatively, the piezoelectric element may be operatively coupled to a part (e.g., wall) of the first channel without an intermediary substrate. The piezoelectric element can be in electrical communication with a controller. The piezoelectric element can be responsive to (e.g., excited by) an electric voltage driven at RF frequency. In some embodiments, the piezoelectric element can be made from zinc oxide (ZnO).

The frequency that drives the electric voltage applied to the piezoelectric element may be from about 5 to about 300 megahertz (MHz). e.g., about 5 MHz, about 6 MHz, about 7 MHz, about MHz, about 9 MHz, about 10 MHz, about 20 MHz, about 30 MHz, about 40 MHz, about 50 MHz, about 60 MHz, about 70 MHz, about 80 MHz, about 90 MHz, about 100 MHz, about 110 MHz, about 120 MHz, about 130 MHz, about 140 MHz, about 150 MHz, about 160 MHz, about 170 MHz, about 180 MHz, about 190 MHz, about 200 MHz, about 210 MHz, about 220 MHz, about 230 MHz, about 240 MHz, about 250 MHz, about 260 MHz, about 270 MHz, about 280 MHz, about 290 MHz, or about 300 MHz. Alternatively, the RF energy may have a frequency range of less than about 5 MHz or greater than about 300 MHz. As will be appreciated, the necessary voltage and/or the RF frequency driving the electric voltage may change with the properties of the piezoelectric element (e.g., efficiency).

Before an electric voltage is applied to a piezoelectric element, the first fluid and the second fluid may remain separated at or near the junction via an immiscible barrier. When the electric voltage is applied to the piezoelectric element, it can generate sound waves (e.g., acoustic waves) that propagate in the buffer substrate. The buffer substrate, such as glass, can be any material that can transfer sound waves. The acoustic lens of the buffer substrate can focus the sound waves towards the immiscible interface between the two immiscible fluids. The acoustic lens may be located such that the interface is located at the focal plane of the converging beam of the sound waves. Upon impact of the sound burst on the barrier, the pressure of the sound waves may cause a volume of the first fluid to be propelled into the second fluid, thereby generating a droplet of the volume of the first fluid in the second fluid. In some instances, each propelling may generate a plurality of droplets (e.g., a volume of the first fluid propelled breaks off as it enters the second fluid to form a plurality of discrete droplets). After ejection of the droplet, the immiscible interface can return to its original state. Subsequent applications of electric voltage to the piezoelectric element can be repeated to subsequently generate more droplets. A plurality of droplets can be collected in the second channel for continued transportation to a different location (e.g., reservoir), direct harvesting, and/or storage. Beneficially, the droplets generated can have substantially uniform size, velocity (when ejected), and/or directionality.

In some cases, a device may include a plurality of piezoelectric elements working independently or cooperatively to achieve the desired formation (e.g., propelling) of droplets. For example, the first channel can be coupled to at least 1, 2, 3, 4, 5, 6, 7, 8, 9, 10, 20, 30, 40, 50, 60, 70, 80, 90, 100, 200, 300, 400, or 500 piezoelectric elements. In an example, multiple piezoelectric elements may be positioned adjacent to one another along an axis parallel of the first channel. Alternatively or in addition, multiple piezoelectric elements may circumscribe the first channel. In some instances, the plurality of piezoelectric elements may each be in electrical communication with the same controller or one or more different controllers. The plurality of piezoelectric elements may each transmit acoustic waves from the same buffer substrate or one or more different buffer substrates. In some instances, a single buffer substrate may comprise a plurality of acoustic lenses at different locations.

In some instances, the first channel may be in communication with a third channel. The third channel may carry the first fluid to the first channel such as from a reservoir of the first fluid. The third channel may include one or more piezoelectric elements, for example, as described herein in the described devices. As described elsewhere herein, the third channel may carry first fluid with one or more particles (e.g., beads, biological particles, etc.) and/or one or more reagents suspended in the fluid. Alternatively or in addition, the device may include one or more other channels communicating with the first channel and/or the second channel.

The number and duration of electric voltage pulses applied to the piezoelectric element may be adjusted to control the speed of droplet generation. For example, the frequency of droplet generation may increase with the number of electric voltage pulses. Additionally, the material and size of the piezoelectric element, material and size of the buffer substrate, material, size, and shape of the acoustic lens, number of piezoelectric elements, number of buffer substrates, number of acoustic lenses, respective locations of the one or more piezoelectric elements, respective locations of the one or more buffer substrates, respective locations of the one or more acoustic lenses, dimensions (e.g., length, width, height, expansion angle) of the respective channels, level of electric voltage applied to the piezoelectric element, hydrodynamic forces of the respective fluids, and other factors may be adjusted to control droplet generation speed and/or size of the droplets generated.

A discrete droplet generated may include a particle, such as when one or more beads are suspended in the volume of the first fluid that is propelled into the second fluid. Alternatively, a discrete droplet generated may include more than one particle. Alternatively, a discrete droplet generated may not include any particles. For example, in some instances, a discrete droplet generated may contain one or more biological particles where the first fluid in the first channel further includes a suspension of a plurality of biological particles.

In some cases, the droplets formed using a piezoelectric element may be collected in a collection reservoir that is disposed below the droplet generation point. The collection reservoir may be configured to hold a source of fluid to keep the formed droplets isolated from one another. The collection reservoir used after piezoelectric or acoustic element-assisted droplet formation may contain an oil that is continuously circulated, e.g., using a paddle mixer, conveyor system, or a magnetic stir bar. Alternatively, the collection reservoir may contain one or more reagents for chemical reactions that can provide a coating on the droplets to ensure isolation, e.g., polymerization, e.g., thermal- or photo-initiated polymerization.

Surface Properties

A surface of the device may include a material, coating, or surface texture that determines the physical properties of the device. In particular, the flow of liquids through a device of the invention may be controlled by the device surface properties (e.g., water contact angle of a liquid-contacting surface). In some cases, a device portion (e.g., a channel or droplet formation region) may have a surface having a water contact angle suitable for facilitating liquid flow (e.g., in a channel) or assisting droplet formation of a first liquid in a second liquid (e.g., in a droplet formation region).

A device may include a channel having a surface with a first water contact angle in fluid communication with (e.g., fluidically connected to) a droplet formation region having a surface with a second water contact angle. The surface water contact angles may be suited to producing droplets of a first liquid in a second liquid. In this non-limiting example, the channel carrying the first liquid may have surface with a first water contact angle suited for the first liquid wetting the channel surface. For example, when the first liquid is substantially miscible with water (e.g., the first liquid is an aqueous liquid), the first water contact angle may be about 95° or less (e.g., 90° or less). Additionally, in this non-limiting example, the droplet formation region may have a surface with a second water contact angle suited for the second liquid wetting the droplet formation region surface (e.g., shelf surface). For example, when the second liquid is substantially immiscible with water (e.g., the second liquid is an oil), the second water contact angle may be about 70° or more (e.g., 90° or more, 95° or more, or 100° or more). Typically, in this non-limiting example, the second water contact angle will differ from the first water contact angle by 5° to 100°. For example, when the first liquid is substantially miscible with water (e.g., the first liquid is an aqueous liquid), and the second liquid is substantially immiscible with water (e.g., the second liquid is an oil), the second water contact angle may be greater than the first water contact angle by 5° to 100°.

For example, portions of the device carrying aqueous phases (e.g., a channel) may have a surface with a water contact angle of less than or equal to about 90° (e.g., include a hydrophilic material or coating), and/or portions of the device housing an oil phase may have a surface with a water contact angle of greater than 70° (e.g., greater than 90°, greater than 95°, greater than 100° (e.g., 95°-120° or 100°-110°)), e.g., include a hydrophobic material or coating. In certain embodiments, the droplet formation region may include a material or surface coating that reduces or prevents wetting by aqueous phases. For example, the droplet formation region may have a surface with a water contact angle of greater than 70° (e.g., greater than 90°, greater than 95°, greater than 100° (e.g., 95°-120° or 100°-110°)). The device can be designed to have a single type of material or coating throughout. Alternatively, the device may have separate regions having different materials or coatings. Surface textures may also be employed to control fluid flow.

The device surface properties may be those of a native surface (i.e., the surface properties of the bulk material used for the device fabrication) or of a surface treatment. Non-limiting examples of surface treatments include, e.g., surface coatings and surface textures. In one approach, the device surface properties are attributable to one or more surface coatings present in a device portion. Hydrophobic coatings may include fluoropolymers (e.g., AQUAPEL® glass treatment), silanes, siloxanes, silicones, or other coatings known in the art. Other coatings include those vapor deposited from a precursor such as henicosyl-1,1,2,2-tetrahydrododecyldimethyltris(dimethylaminosilane); henicosyl-1,1,2,2-tetrahydrododecyltrichlorosilane (C12); heptadecafluoro-1,1,2,2-tetrahydrodecyltrichlorosilane (C10); nonafluoro-1,1,2,2-tetrahydrohexyltris(dimethylamino)silane; 3,3,3,4,4,5,5,6,6-nonafluorohexyltrichlorosilane; tridecafluoro-1,1,2,2-tetrahydrooctyltrichlorosilane (C8); bis(tridecafluoro-1,1,2,2-tetrahydrooctyl)dimethylsiloxymethylchlorosilane; nonafluorohexyltriethoxysilane (C6); dodecyltrichlorosilane (DTS); dimethyldichlorosilane (DDMS); or 10-undecenyltrichlorosilane (V11); pentafluorophenylpropyltrichlorosilane (C5). Hydrophilic coatings include polymers such as polysaccharides, polyethylene glycol, polyamines, and polycarboxylic acids. Hydrophilic surfaces may also be created by oxygen plasma treatment of certain materials.

A coated surface may be formed by depositing a metal oxide onto a surface of the device. Example metal oxides useful for coating surfaces include, but are not limited to, $Al_2O_3$, $TiO_2$, $SiO_2$, or a combination thereof. Other metal oxides useful for surface modifications are known in the art. The metal oxide can be deposited onto a surface by standard deposition techniques, including, but not limited to, atomic layer deposition (ALD), physical vapor deposition (PVD), e.g., sputtering, chemical vapor deposition (CVD), or laser deposition. Other deposition techniques for coating surfaces, e.g., liquid-based deposition, are known in the art. For example, an atomic layer of $Al_2O_3$ can be deposited on a surface by contacting it with trimethylaluminum (TMA) and water.

In another approach, the device surface properties may be attributable to surface texture. For example, a surface may have a nanotexture, e.g., have a surface with nanometer surface features, such as cones or columns, that alters the wettability of the surface. Nanotextured surface may be hydrophilic, hydrophobic, or superhydrophobic, e.g., have a water contact angle greater than 150°. Exemplary superhydrophobic materials include Manganese Oxide Polystyrene ($MnO_2$/PS) nano-composite, Zinc Oxide Polystyrene (ZnO/PS) nano-composite, Precipitated Calcium Carbonate, Carbon nano-tube structures, and a silica nano-coating. Superhydrophobic coatings may also include a low surface energy material (e.g., an inherently hydrophobic material) and a surface roughness (e.g., using laser ablation techniques, plasma etching techniques, or lithographic techniques in which a material is etched through apertures in a patterned mask). Examples of low surface energy materials include fluorocarbon materials, e.g., polytetrafluoroethylene (PTFE), fluorinated ethylene propylene (FEP), ethylene tetrafluoroethylene (ETFE), ethylene chloro-trifluoroethylene (ECTFE), perfluoro-alkoxyalkane (PFA), poly(chloro-trifluoroethylene) (CTFE), perfluoro-alkoxyalkane (PFA), and poly(vinylidene fluoride) (PVDF). Other superhydrophobic surfaces are known in the art.

In some cases, the first water contact angle is less than or equal to about 90°, e.g., less than 80°, 70°, 60°, 50°, 40°, 30°, 20°, or 10°, e.g., 90°, 85°, 80°, 75°, 70°, 65°, 60°, 55°, 50°, 45°, 40°, 35°, 30°, 25°, 20°, 15°, 10°, 9°, 8°, 7°, 6°, 5°, 4°, 3°, 2°, 1°, or 0°. In some cases, the second water contact angle is at least 70°, e.g., at least 80°, at least 85°, at least 90°, at least 95°, or at least 100° (e.g., about 100°, 101°, 102°, 103°, 104°, 105°, 106°, 107°, 108°, 109°, 110°, 115°, 120°, 125°, 130°, 135°, 140°, 145°, or about 150°).

The difference between the first and second water contact angles may be 5° to 100°, e.g., 5° to 80°, 5° to 60°, 5° to 50°, 5° to 40°, 5° to 30°, 5° to 20°, 10° to 75°, 15° to 70°, 20° to 65°, 25° to 60°, 30 to 50°, 35° to 45°, e.g., 5°, 6°,7°, 8°, 9°, 10°, 15°, 20°, 25°, 30°, 35°, 40°, 45°, 50°, 55°, 60, 65°, 70°, 75°, 80°, 85°, 90°, 95°, or 100°.

The above discussion centers on the water contact angle. It will be understood that liquids employed in the devices and methods of the invention may not be water, or even aqueous. Accordingly, the actual contact angle of a liquid on a surface of the device may differ from the water contact angle.

Particles

The invention includes devices, systems, and kits having particles. For example, particles configured with, e.g., barcodes, nucleic acids, binding molecules (e.g., proteins, peptides, aptamers, antibodies, or antibody fragments), enzymes, substrates, etc. can be included in a droplet containing an analyte to modify the analyte and/or detect the presence or concentration of the analyte. In some embodiments, particles are synthetic particles (e.g., beads, e.g., gel beads).

For example, a droplet may include one or more such moieties, e.g., unique identifiers, such as barcodes. Moieties, e.g., barcodes, may be introduced into droplets previous to, subsequent to, or concurrently with droplet formation. The delivery of the moieties, e.g., barcodes, to a particular droplet allows for the later attribution of the characteristics of an individual sample (e.g., biological particle) to the particular droplet. Moieties, e.g., barcodes, may be delivered, for example on a nucleic acid (e.g., an oligonucleotide), to a droplet via any suitable mechanism. Moieties, e.g., barcoded nucleic acids (e.g., oligonucleotides), can be introduced into a droplet via a particle, such as a microcapsule. In some cases, moieties, e.g., barcoded nucleic acids (e.g., oligonucleotides), can be initially associated with the particle (e.g., microcapsule) and then released upon application of a stimulus which allows the moieties, e.g., nucleic acids (e.g., oligonucleotides), to dissociate or to be released from the particle.

A particle, e.g., a bead, may be porous, non-porous, hollow (e.g., a microcapsule), solid, semi-solid, semi-fluidic, fluidic, and/or a combination thereof. In some instances, a particle, e.g., a bead, may be dissolvable, disruptable, and/or degradable. In some cases, a particle, e.g., a bead, may not be degradable. In some cases, the particle, e.g., a bead, may be a gel bead. A gel bead may be a hydrogel bead. A gel bead may be formed from molecular precursors, such as a polymeric or monomeric species. A semi-solid particle, e.g., a bead, may be a liposomal bead. Solid particles, e.g., beads, may comprise metals including iron oxide, gold, and silver. In some cases, the particle, e.g., the bead, may be a silica bead. In some cases, the particle, e.g., a bead, can be rigid. In other cases, the particle, e.g., a bead, may be flexible and/or compressible.

A particle, e.g., a bead, may comprise natural and/or synthetic materials. For example, a particle, e.g., a bead, can comprise a natural polymer, a synthetic polymer or both natural and synthetic polymers. Examples of natural polymers include proteins and sugars such as deoxyribonucleic acid, rubber, cellulose, starch (e.g., amylose, amylopectin), proteins, enzymes, polysaccharides, silks, polyhydroxyalkanoates, chitosan, dextran, collagen, carrageenan, ispaghula, acacia, agar, gelatin, shellac, sterculia gum, xanthan gum, Corn sugar gum, guar gum, gum karaya, agarose, alginic acid, alginate, or natural polymers thereof. Examples of synthetic polymers include acrylics, nylons, silicones, spandex, viscose rayon, polycarboxylic acids, polyvinyl acetate, polyacrylamide, polyacrylate, polyethylene glycol, polyurethanes, polylactic acid, silica, polystyrene, polyacrylonitrile, polybutadiene, polycarbonate, polyethylene, polyethylene terephthalate, poly(chlorotrifluoroethylene), poly(ethylene oxide), poly(ethylene terephthalate), polyethylene, polyisobutylene, poly(methyl methacrylate), poly(oxymethylene), polyformaldehyde, polypropylene, polystyrene, poly (tetrafluoroethylene), poly(vinyl acetate), poly(vinyl alcohol), poly(vinyl chloride), poly(vinylidene dichloride), poly (vinylidene difluoride), poly(vinyl fluoride) and/or combinations (e.g., co-polymers) thereof. Beads may also be formed from materials other than polymers, including lipids, micelles, ceramics, glass-ceramics, material composites, metals, other inorganic materials, and others.

In some instances, the particle, e.g., the bead, may contain molecular precursors (e.g., monomers or polymers), which may form a polymer network via polymerization of the molecular precursors. In some cases, a precursor may be an already polymerized species capable of undergoing further polymerization via, for example, a chemical cross-linkage. In some cases, a precursor can comprise one or more of an acrylamide or a methacrylamide monomer, oligomer, or polymer. In some cases, the particle, e.g., the bead, may comprise prepolymers, which are oligomers capable of further polymerization. For example, polyurethane beads may be prepared using prepolymers. In some cases, the particle, e.g., the bead, may contain individual polymers that may be further polymerized together. In some cases, particles, e.g., beads, may be generated via polymerization of different precursors, such that they comprise mixed polymers, co-polymers, and/or block co-polymers. In some cases, the particle, e.g., the bead, may comprise covalent or ionic bonds between polymeric precursors (e.g., monomers, oligomers, linear polymers), oligonucleotides, primers, and other entities. In some cases, the covalent bonds can be carbon-carbon bonds or thioether bonds.

Cross-linking may be permanent or reversible, depending upon the particular cross-linker used. Reversible cross-linking may allow for the polymer to linearize or dissociate under appropriate conditions. In some cases, reversible cross-linking may also allow for reversible attachment of a material bound to the surface of a bead. In some cases, a cross-linker may form disulfide linkages. In some cases, the chemical cross-linker forming disulfide linkages may be cystamine or a modified cystamine.

Particles, e.g., beads, may be of uniform size or heterogeneous size. In some cases, the diameter of a particle, e.g., a bead, may be at least about 1 micrometer (μm), 5 μm, 10 μm, 20 μm, 30 μm, 40 μm, 50 μm, 60 μm, 70 μm, 80 μm, 90 μm, 100 μm, 250 μm, 500 μm, 1 mm, or greater. In some cases, a particle, e.g., a bead, may have a diameter of less than about 1 μm, 5 μm, 10 μm, 20 μm, 30 μm, 40 μm, 50 μm, 60 μm, 70 μm, 80 μm, 90 μm, 100 μm, 250 μm, 500 μm, 1 mm, or less. In some cases, a particle, e.g., a bead, may have a diameter in the range of about 40-75 μm, 30-75 μm, 20-75 μm, 40-85 μm, 40-95 μm, 20-100 μm, 10-100 μm, 1-100 μm, 20-250 μm, or 20-500 μm. The size of a particle, e.g., a bead, e.g., a gel bead, used to produce droplets is typically on the order of a cross section of the first channel (width or depth). In some cases, the gel beads are larger than the width and/or depth of the first channel and/or shelf, e.g., at least 1.5×, 2×, 3×, or 4*x* larger than the width and/or depth of the first channel and/or shelf.

In certain embodiments, particles, e.g., beads, can be provided as a population or plurality of particles, e.g., beads, having a relatively monodisperse size distribution. Where it may be desirable to provide relatively consistent amounts of reagents within droplets, maintaining relatively consistent particle, e.g., bead, characteristics, such as size, can contribute to the overall consistency. In particular, the particles, e.g., beads, described herein may have size distributions that have a coefficient of variation in their cross-sectional dimensions of less than 50%, less than 40%, less than 30%, less than 20%, and in some cases less than 15%, less than 10%, less than 5%, or less.

Particles may be of any suitable shape. Examples of particles, e.g., beads, shapes include, but are not limited to, spherical, non-spherical, oval, oblong, amorphous, circular, cylindrical, and variations thereof.

A particle, e.g., bead, injected or otherwise introduced into a droplet may comprise releasably, cleavably, or reversibly attached moieties (e.g., barcodes). A particle, e.g., bead, injected or otherwise introduced into a droplet may comprise activatable moieties (e.g., barcodes). A particle, e.g., bead, injected or otherwise introduced into a droplet may be a degradable, disruptable, or dissolvable particle, e.g., dissolvable bead.

Particles, e.g., beads, within a channel may flow at a substantially regular flow profile (e.g., at a regular flow rate). Such regular flow profiles can permit a droplet, when formed, to include a single particle (e.g., bead) and a single cell or other biological particle. Such regular flow profiles may permit the droplets to have an dual occupancy (e.g., droplets having at least one bead and at least one cell or other biological particle) greater than 5%, 10%, 20%, 30%, 40%, 50%, 60%, 70%, 80%, 81%, 82%, 83%, 84%, 85%, 86%, 87%, 88%, 89%, 90%, 91%, 92%, 93%, 94%, 95%, 96%, 97% 98%, or 99% of the population. In some embodiments, the droplets have a 1:1 dual occupancy (i.e., droplets having exactly one particle (e.g., bead)) and exactly one cell or other biological particle) greater than 5%, 10%, 20%, 30%, 40%, 50%, 60%, 70%, 80%, 81%, 82%, 83%, 84%, 85%, 86%, 87%, 88%, 89%, 90%, 91%, 92%, 93%, 94%, 95%, 96%, 97% 98%, or 99% of the population. Such regular flow profiles and devices that may be used to provide such regular flow profiles are provided, for example, in U.S. Patent Publication No. 2015/0292988, which is entirely incorporated herein by reference.

As discussed above, moieties (e.g., barcodes) can be releasably, cleavably or reversibly attached to the particles, e.g., beads, such that moieties (e.g., barcodes) can be released or be releasable through cleavage of a linkage between the barcode molecule and the particle, e.g., bead, or released through degradation of the particle (e.g., bead) itself, allowing the barcodes to be accessed or be accessible by other reagents, or both. Releasable moieties (e.g., barcodes) may sometimes be referred to as activatable moieties (e.g., activatable barcodes), in that they are available for reaction once released. Thus, for example, an activatable-moiety (e.g., activatable barcode) may be activated by releasing the moiety (e.g., barcode) from a particle, e.g., bead (or other suitable type of droplet described herein). Other activatable configurations are also envisioned in the context of the described methods and systems.

In addition to, or as an alternative to the cleavable linkages between the particles, e.g., beads, and the associated moieties, such as barcode containing nucleic acids (e.g., oligonucleotides), the particles, e.g., beads may be degradable, disruptable, or dissolvable spontaneously or upon exposure to one or more stimuli (e.g., temperature changes, pH changes, exposure to particular chemical species or phase, exposure to light, reducing agent, etc.). In some cases, a particle, e.g., bead, may be dissolvable, such that material components of the particle, e.g., bead, are degraded or solubilized when exposed to a particular chemical species or an environmental change, such as a change temperature or a change in pH. In some cases, a gel bead can be degraded or dissolved at elevated temperature and/or in basic conditions. In some cases, a particle, e.g., bead, may be thermally degradable such that when the particle, e.g., bead, is exposed to an appropriate change in temperature (e.g., heat), the particle, e.g., bead, degrades. Degradation or dissolution of a particle (e.g., bead) bound to a species (e.g., a nucleic acid, e.g., an oligonucleotide, e.g., barcoded oligonucleotide) may result in release of the species from the particle, e.g., bead. As will be appreciated from the above disclosure, the degradation of a particle, e.g., bead, may refer to the disassociation of a bound or entrained species from a particle, e.g., bead, both with and without structurally degrading the physical particle, e.g., bead, itself. For example, entrained species may be released from particles, e.g., beads, through osmotic pressure differences due to, for example, changing chemical environments. By way of example, alteration of particle, e.g., bead, pore sizes due to osmotic pressure differences can generally occur without structural degradation of the particle, e.g., bead, itself. In some cases, an increase in pore size due to osmotic swelling of a particle, e.g., bead or microcapsule (e.g., liposome), can permit the release of entrained species within the particle. In other cases, osmotic shrinking of a particle may cause the particle, e.g., bead, to better retain an entrained species due to pore size contraction.

A degradable particle, e.g., bead, may be introduced into a droplet, such as a droplet of an emulsion or a well, such that the particle, e.g., bead, degrades within the droplet and any associated species (e.g., nucleic acids, oligonucleotides, or fragments thereof) are released within the droplet when the appropriate stimulus is applied. The free species (e.g., nucleic acid, oligonucleotide, or fragment thereof) may interact with other reagents contained in the droplet. For example, a polyacrylamide bead comprising cystamine and linked, via a disulfide bond, to a barcode sequence, may be combined with a reducing agent within a droplet of a water-in-oil emulsion. Within the droplet, the reducing agent can break the various disulfide bonds, resulting in particle, e.g., bead, degradation and release of the barcode sequence into the aqueous, inner environment of the droplet. In another example, heating of a droplet comprising a particle-, e.g., bead-, bound moiety (e.g., barcode) in basic solution may also result in particle, e.g., bead, degradation and release of the attached barcode sequence into the aqueous, inner environment of the droplet.

Any suitable number of moieties (e.g., molecular tag molecules (e.g., primer, barcoded oligonucleotide, etc.)) can be associated with a particle, e.g., bead, such that, upon release from the particle, the moieties (e.g., molecular tag molecules (e.g., primer, e.g., barcoded oligonucleotide, etc.)) are present in the droplet at a pre-defined concentration. Such pre-defined concentration may be selected to facilitate certain reactions for generating a sequencing library, e.g., amplification, within the droplet. In some cases, the pre-defined concentration of a primer can be limited by the process of producing oligonucleotide-bearing particles, e.g., beads.

Additional reagents may be included as part of the particles and/or in solution or dispersed in the droplet, for example, to activate, mediate, or otherwise participate in a reaction, e.g., between the analyte and moiety.

Biological Samples

A droplet of the present disclosure may include biological particles (e.g., cells) and/or macromolecular constituents thereof (e.g., components of cells (e.g., intracellular or extracellular proteins, nucleic acids, glycans, or lipids) or products of cells (e.g., secretion products)). An analyte from a biological particle, e.g., component or product thereof, may be considered to be a bioanalyte. In some embodiments, a biological particle, e.g., cell, or product thereof is included in a droplet, e.g., with one or more particles (e.g., beads) having a moiety. A biological particle, e.g., cell, and/or components or products thereof can, in some embodiments, be encased inside a gel, such as via polymerization of a droplet containing the biological particle and precursors capable of being polymerized or gelled.

In the case of encapsulated biological particles (e.g., cells), a biological particle may be included in a droplet that contains lysis reagents in order to release the contents (e.g., contents containing one or more analytes (e.g., bioanalytes)) of the biological particles within the droplet. In such cases, the lysis agents can be contacted with the biological particle suspension concurrently with, or immediately prior to the introduction of the biological particles into the droplet formation region, for example, through an additional channel or channels upstream or proximal to a second channel or a third channel that is upstream or proximal to a second droplet formation region. Examples of lysis agents include bioactive reagents, such as lysis enzymes that are used for lysis of different cell types, e.g., gram positive or negative bacteria, plants, yeast, mammalian, etc., such as lysozymes, achromopeptidase, lysostaphin, labiase, kitalase, lyticase, and a variety of other lysis enzymes available from, e.g., Sigma-Aldrich, Inc. (St Louis, Mo.), as well as other commercially available lysis enzymes. Other lysis agents may additionally or alternatively be contained in a droplet with the biological particles (e.g., cells) to cause the release of the biological particles' contents into the droplets. For example, in some cases, surfactant based lysis solutions may be used to lyse cells, although these may be less desirable for emulsion based systems where the surfactants can interfere with stable emulsions. In some cases, lysis solutions may include non-ionic surfactants such as, for example, TRITON X-100 and TWEEN 20. In some cases, lysis solutions may include ionic surfactants such as, for example, sarcosyl and sodium dodecyl sulfate (SDS). In some embodiments, lysis solutions are hypotonic, thereby lysing cells by osmotic shock. Electroporation, thermal, acoustic or mechanical cellular disruption may also be used in certain cases, e.g., non-emulsion based droplet formation such as encapsulation of biological particles that may be in addition to or in place of droplet formation, where any pore size of the encapsulate is sufficiently small to retain nucleic acid fragments of a desired size, following cellular disruption.

In addition to the lysis agents, other reagents can also be included in droplets with the biological particles, including, for example, DNase and RNase inactivating agents or inhibitors, such as proteinase K, chelating agents, such as EDTA, and other reagents employed in removing or otherwise reducing negative activity or impact of different cell lysate components on subsequent processing of nucleic acids. In addition, in the case of encapsulated biological particles (e.g., cells), the biological particles may be exposed to an appropriate stimulus to release the biological particles or their contents from a microcapsule within a droplet. For example, in some cases, a chemical stimulus may be included in a droplet along with an encapsulated biological particle to allow for degradation of the encapsulating matrix and release of the cell or its contents into the larger droplet. In some cases, this stimulus may be the same as the stimulus described elsewhere herein for release of moieties (e.g., oligonucleotides) from their respective particle (e.g., bead). In alternative aspects, this may be a different and non-overlapping stimulus, in order to allow an encapsulated biological particle to be released into a droplet at a different time from the release of moieties (e.g., oligonucleotides) into the same droplet.

Additional reagents may also be included in droplets with the biological particles, such as endonucleases to fragment a biological particle's DNA, DNA polymerase enzymes and dNTPs used to amplify the biological particle's nucleic acid fragments and to attach the barcode molecular tags to the amplified fragments. Other reagents may also include reverse transcriptase enzymes, including enzymes with terminal transferase activity, primers and oligonucleotides, and switch oligonucleotides (also referred to herein as "switch oligos" or "template switching oligonucleotides") which can be used for template switching. In some cases, template switching can be used to increase the length of a cDNA. In some cases, template switching can be used to append a predefined nucleic acid sequence to the cDNA. In an example of template switching, cDNA can be generated from reverse transcription of a template, e.g., cellular mRNA, where a reverse transcriptase with terminal transferase activity can add additional nucleotides, e.g., polyC, to the cDNA in a template independent manner. Switch oligos can include sequences complementary to the additional nucleotides, e.g., polyG. The additional nucleotides (e.g., polyC) on the cDNA can hybridize to the additional nucleotides (e.g., polyG) on the switch oligo, whereby the switch oligo can be used by the reverse transcriptase as template to further extend the cDNA. Template switching oligonucleotides may comprise a hybridization region and a template region. The hybridization region can comprise any sequence capable of hybridizing to the target. In some cases, as previously described, the hybridization region comprises a series of G bases to complement the overhanging C bases at the 3' end of a cDNA molecule. The series of G bases may comprise 1 G base, 2 G bases, 3 G bases, 4 G bases, 5 G bases or more than 5 G bases. The template sequence can comprise any sequence to be incorporated into the cDNA. In some cases, the template region comprises at least 1 (e.g., at least 2, 3, 4, 5 or more) tag sequences and/or functional sequences. Switch oligos may comprise deoxyribonucleic acids; ribonucleic acids; modified nucleic acids including 2-Aminopurine, 2,6-Diaminopurine (2-Amino-dA), inverted dT, 5-Methyl dC, 2'-deoxyinosine, Super T (5-hydroxybutynl-2'-deoxyuridine), Super G (8-aza-7-deazaguanosine), locked nucleic acids (LNAs), unlocked nucleic acids (UNAs, e.g., UNA-A, UNA-U, UNA-C, UNA-G), Iso-dG, Iso-dC, 2' Fluoro bases (e.g., Fluoro C, Fluoro U, Fluoro A, and Fluoro G), or any combination.

In some cases, the length of a switch oligo may be 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250 nucleotides or longer.

In some cases, the length of a switch oligo may be at least 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249 or 250 nucleotides or longer.

In some cases, the length of a switch oligo may be at most 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249 or 250 nucleotides.

Once the contents of the cells are released into their respective droplets, the macromolecular components (e.g., macromolecular constituents of biological particles, such as RNA, DNA, or proteins) contained therein may be further processed within the droplets.

As described above, the macromolecular components (e.g., bioanalytes) of individual biological particles (e.g., cells) can be provided with unique identifiers (e.g., barcodes) such that upon characterization of those macromolecular components, at which point components from a heterogeneous population of cells may have been mixed and are interspersed or solubilized in a common liquid, any given component (e.g., bioanalyte) may be traced to the biological particle (e.g., cell) from which it was obtained. The ability to attribute characteristics to individual biological particles or groups of biological particles is provided by the assignment of unique identifiers specifically to an individual biological particle or groups of biological particles. Unique identifiers, for example, in the form of nucleic acid barcodes, can be assigned or associated with individual biological particles (e.g., cells) or populations of biological particles (e.g., cells), in order to tag or label the biological particle's macromolecular components (and as a result, its characteristics) with the unique identifiers. These unique identifiers can then be used to attribute the biological particle's components and characteristics to an individual biological particle or group of biological particles. This can be performed by forming droplets including the individual biological particle or groups of biological particles with the unique identifiers (via particles, e.g., beads), as described in the systems and methods herein.

In some aspects, the unique identifiers are provided in the form of oligonucleotides that comprise nucleic acid barcode sequences that may be attached to or otherwise associated with the nucleic acid contents of individual biological particle, or to other components of the biological particle, and particularly to fragments of those nucleic acids. The oligonucleotides are partitioned such that as between oligonucleotides in a given droplet, the nucleic acid barcode sequences contained therein are the same, but as between different droplets, the oligonucleotides can, and do have differing barcode sequences, or at least represent a large number of different barcode sequences across all of the droplets in a given analysis. In some aspects, only one nucleic acid barcode sequence can be associated with a given droplet, although in some cases, two or more different barcode sequences may be present.

The nucleic acid barcode sequences can include from 6 to about 20 or more nucleotides within the sequence of the oligonucleotides. In some cases, the length of a barcode sequence may be 6, 7, 8, 9, 10, 11, 12, 13, 14, 15, 16, 17, 18, 19, 20 nucleotides or longer. In some cases, the length of a barcode sequence may be at least 6, 7, 8, 9, 10, 11, 12, 13, 14, 15, 16, 17, 18, 19, 20 nucleotides or longer. In some cases, the length of a barcode sequence may be at most 6, 7, 8, 9, 10, 11, 12, 13, 14, 15, 16, 17, 18, 19, 20 nucleotides or shorter. These nucleotides may be completely contiguous, i.e., in a single stretch of adjacent nucleotides, or they may be separated into two or more separate subsequences that are separated by 1 or more nucleotides. In some cases, separated barcode subsequences can be from about 4 to about 16 nucleotides in length. In some cases, the barcode subsequence may be 4, 5, 6, 7, 8, 9, 10, 11, 12, 13, 14, 15, 16 nucleotides or longer. In some cases, the barcode subsequence may be at least 4, 5, 6, 7, 8, 9, 10, 11, 12, 13, 14, 15, 16 nucleotides or longer. In some cases, the barcode subsequence may be at most 4, 5, 6, 7, 8, 9, 10, 11, 12, 13, 14, 15, 16 nucleotides or shorter.

Moieties (e.g., oligonucleotides) in droplets can also include other functional sequences useful in processing of nucleic acids from biological particles contained in the droplet. These sequences include, for example, targeted or random/universal amplification primer sequences for amplifying the genomic DNA from the individual biological particles within the droplets while attaching the associated barcode sequences, sequencing primers or primer recognition sites, hybridization or probing sequences, e.g., for identification of presence of the sequences or for pulling down barcoded nucleic acids, or any of a number of other potential functional sequences.

Other mechanisms of forming droplets containing oligonucleotides may also be employed, including, e.g., coalescence of two or more droplets, where one droplet contains oligonucleotides, or microdispensing of oligonucleotides into droplets, e.g., droplets within microfluidic systems.

In an example, particles (e.g., beads) are provided that each include large numbers of the above described barcoded oligonucleotides releasably attached to the beads, where all of the oligonucleotides attached to a particular bead will include the same nucleic acid barcode sequence, but where a large number of diverse barcode sequences are represented across the population of beads used. In some embodiments, hydrogel beads, e.g., beads having polyacrylamide polymer matrices, are used as a solid support and delivery vehicle for the oligonucleotides into the droplets, as they are capable of carrying large numbers of oligonucleotide molecules, and may be configured to release those oligonucleotides upon exposure to a particular stimulus, as described elsewhere herein. In some cases, the population of beads will provide a diverse barcode sequence library that includes at least about 1,000 different barcode sequences, at least about 5,000 different barcode sequences, at least about 10,000 different barcode sequences, at least about 50,000 different barcode sequences, at least about 100,000 different barcode sequences, at least about 1,000,000 different barcode sequences, at least about 5,000,000 different barcode sequences, or at least about 10,000,000 different barcode sequences, or more. Additionally, each bead can be provided with large numbers of oligonucleotide molecules attached. In particular, the number of molecules of oligonucleotides including the barcode sequence on an individual bead can be at least about 1,000 oligonucleotide molecules, at least about 5,000 oligonucleotide molecules, at least about 10,000 oligonucleotide molecules, at least about 50,000 oligonucleotide molecules, at least about 100,000 oligonucleotide molecules, at least about 500,000 oligonucleotides, at least about 1,000,000 oligonucleotide molecules, at least about 5,000,000 oligonucleotide molecules, at least about 10,000,000 oligonucleotide molecules, at least about 50,000,000 oligonucleotide molecules, at least about 100,000,000 oligonucleotide molecules, and in some cases at least about 1 billion oligonucleotide molecules, or more.

Moreover, when the population of beads are included in droplets, the resulting population of droplets can also include a diverse barcode library that includes at least about 1,000 different barcode sequences, at least about 5,000 different barcode sequences, at least about 10,000 different barcode sequences, at least at least about 50,000 different barcode sequences, at least about 100,000 different barcode sequences, at least about 1,000,000 different barcode sequences, at least about 5,000,000 different barcode sequences, or at least about 10,000,000 different barcode sequences. Additionally, each droplet of the population can include at least about 1,000 oligonucleotide molecules, at least about 5,000 oligonucleotide molecules, at least about 10,000 oligonucleotide molecules, at least about 50,000 oligonucleotide molecules, at least about 100,000 oligonucleotide molecules, at least about 500,000 oligonucleotides, at least about 1,000,000 oligonucleotide molecules, at least about 5,000,000 oligonucleotide molecules, at least about 10,000,000 oligonucleotide molecules, at least about 50,000,000 oligonucleotide molecules, at least about 100,000,000 oligonucleotide molecules, and in some cases at least about 1 billion oligonucleotide molecules.

In some cases, it may be desirable to incorporate multiple different barcodes within a given droplet, either attached to a single or multiple particles, e.g., beads, within the droplet. For example, in some cases, mixed, but known barcode sequences set may provide greater assurance of identification in the subsequent processing, for example, by providing a stronger address or attribution of the barcodes to a given droplet, as a duplicate or independent confirmation of the output from a given droplet.

Oligonucleotides may be releasable from the particles (e.g., beads) upon the application of a particular stimulus. In some cases, the stimulus may be a photo-stimulus, e.g., through cleavage of a photo-labile linkage that releases the oligonucleotides. In other cases, a thermal stimulus may be used, where increase in temperature of the particle, e.g., bead, environment will result in cleavage of a linkage or other release of the oligonucleotides form the particles, e.g., beads. In still other cases, a chemical stimulus is used that cleaves a linkage of the oligonucleotides to the beads, or otherwise results in release of the oligonucleotides from the particles, e.g., beads. In one case, such compositions include the polyacrylamide matrices described above for encapsulation of biological particles, and may be degraded for release of the attached oligonucleotides through exposure to a reducing agent, such as dithiothreitol (DTT).

The droplets described herein may contain either one or more biological particles (e.g., cells), either one or more barcode carrying particles, e.g., beads, or both at least a biological particle and at least a barcode carrying particle, e.g., bead. In some instances, a droplet may be unoccupied and contain neither biological particles nor barcode-carrying particles, e.g., beads. As noted previously, by controlling the flow characteristics of each of the liquids combining at the droplet formation region(s), as well as controlling the geometry of the droplet formation region(s), droplet formation can be optimized to achieve a desired occupancy level of particles, e.g., beads, biological particles, or both, within the droplets that are generated.

Kits and Systems

Devices of the invention may be combined with various external components, e.g., pumps, reservoirs, or controllers, reagents, liquids, particles (e.g., beads), and/or sample in the form of kits and systems.

Methods

The methods described herein to generate droplets, e.g., of uniform and predictable sizes, and with high throughput, may be used to greatly increase the efficiency of single cell applications and/or other applications receiving droplet-based input. Such single cell applications and other applications may often be capable of processing a certain range of droplet sizes. The methods may be employed to generate droplets for use as microscale chemical reactors, where the volumes of the chemical reactants are small (~pLs).

The methods disclosed herein may produce emulsions, generally, i.e., droplet of a dispersed phases in a continuous phase. For example, droplets may include a first liquid, and the other liquid may be a second liquid. The first liquid may be substantially immiscible with the second liquid. In some instances, the first liquid may be an aqueous liquid or may be substantially miscible with water. Droplets produced according to the methods disclosed herein may combine multiple liquids. For example, a droplet may combine a first and third liquids. The first liquid may be substantially miscible with the third liquid. The second liquid may be an oil, as described herein.

A variety of applications require the evaluation of the presence and quantification of different biological particle or organism types within a population of biological particles, including, for example, microbiome analysis and characterization, environmental testing, food safety testing, epidemiological analysis, e.g., in tracing contamination or the like.

The methods described herein may allow for the production of one or more droplets containing a single particle, e.g., bead, and/or single biological particle (e.g., cell) with uniform and predictable droplet size. The methods also allow for the production of one or more droplets comprising a single biological particle (e.g., cell) and more than one particle, e.g., bead, one or more droplets comprising more than one biological particle (e.g., cell) and a single particle, e.g., bead, and/or one or more droplets comprising more than one biological particle (e.g., cell) and more than one particle, e.g., beads. The methods may also allow for increased throughput of droplet formation.

Droplets are in general formed by allowing a first liquid to flow into a second liquid in a droplet formation region, where droplets spontaneously form as described herein. The droplets may comprise an aqueous liquid dispersed phase within a non-aqueous continuous phase, such as an oil phase. In some cases, droplet formation may occur in the absence of externally driven movement of the continuous phase, e.g., a second liquid, e.g., an oil. As discussed above, the continuous phase may nonetheless be externally driven, even though it is not required for droplet formation. Emulsion systems for creating stable droplets in non-aqueous (e.g., oil) continuous phases are described in detail in, for example, U.S. Pat. No. 9,012,390, which is entirely incorporated herein by reference for all purposes. Alternatively or in addition, the droplets may comprise, for example, micro-vesicles that have an outer barrier surrounding an inner liquid center or core. In some cases, the droplets may comprise a porous matrix that is capable of entraining and/or retaining materials within its matrix. A variety of different vessels are described in, for example, U.S. Patent Application Publication No. 2014/0155295, which is entirely incorporated herein by reference for all purposes. The droplets can be collected in a substantially stationary volume of liquid, e.g., with the buoyancy of the formed droplets moving them out of the path of nascent droplets (up or down depending on the relative density of the droplets and continuous phase). Alternatively or in addition, the formed droplets can be moved out of the path of nascent droplets actively, e.g., using a gentle flow of the continuous phase, e.g., a liquid stream or gently stirred liquid.

Allocating particles, e.g., beads (e.g., microcapsules carrying barcoded oligonucleotides) or biological particles (e.g., cells) to discrete droplets may generally be accomplished by introducing a flowing stream of particles, e.g., beads, in an aqueous liquid into a flowing stream or non-flowing reservoir of a non-aqueous liquid, such that droplets are generated. In some instances, the occupancy of the resulting droplets (e.g., number of particles, e.g., beads, per droplet) can be controlled by providing the aqueous stream at a certain concentration or frequency of particles, e.g., beads. In some instances, the occupancy of the resulting droplets can also be controlled by adjusting one or more geometric features at the point of droplet formation, such as a width of a fluidic channel carrying the particles, e.g., beads, relative to a diameter of a given particles, e.g., beads.

Where single particle-, e.g., bead-, containing droplets are desired, the relative flow rates of the liquids can be selected such that, on average, the droplets contain fewer than one particle, e.g., bead, per droplet in order to ensure that those droplets that are occupied are primarily singly occupied. In some embodiments, the relative flow rates of the liquids can be selected such that a majority of droplets are occupied, for example, allowing for only a small percentage of unoccupied droplets. The flows and channel architectures can be controlled as to ensure a desired number of singly occupied droplets, less than a certain level of unoccupied droplets and/or less than a certain level of multiply occupied droplets.

The methods described herein can be operated such that a majority of occupied droplets include no more than one biological particle per occupied droplet. In some cases, the droplet formation process is conducted such that fewer than 25% of the occupied droplets contain more than one biological particle (e.g., multiply occupied droplets), and in many cases, fewer than 20% of the occupied droplets have more than one biological particle. In some cases, fewer than 10% or even fewer than 5% of the occupied droplets include more than one biological particle per droplet.

It may be desirable to avoid the creation of excessive numbers of empty droplets, for example, from a cost perspective and/or efficiency perspective. However, while this may be accomplished by providing sufficient numbers of particles, e.g., beads, into the droplet formation region, the Poisson distribution may expectedly increase the number of droplets that may include multiple biological particles. As such, at most about 95%, 90%, 85%, 80%, 75%, 70%, 65%, 60%, 55%, 50%, 45%, 40%, 35%, 30%, 25%, 20%, 15%, 10%, 5% or less of the generated droplets can be unoccupied. In some cases, the flow of one or more of the particles, or liquids directed into the droplet formation region can be conducted such that, in many cases, no more than about 50% of the generated droplets, no more than about 25% of the generated droplets, or no more than about 10% of the generated droplets are unoccupied. These flows can be controlled so as to present non-Poisson distribution of singly occupied droplets while providing lower levels of unoccupied droplets. The above noted ranges of unoccupied droplets can be achieved while still providing any of the single occupancy rates described above. For example, in many cases, the use of the systems and methods described herein creates resulting droplets that have multiple occupancy rates of less than about 25%, less than about 20%, less than about 15%, less than about 10%, and in many cases, less than about 5%, while having unoccupied droplets of less than about 50%, less than about 40%, less than about 30%, less than about 20%, less than about 10%, less than about 5%, or less.

The flow of the first fluid may be such that the droplets contain a single particle, e.g., bead. In certain embodiments, the yield of droplets containing a single particle is at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, or at least 99%.

As will be appreciated, the above-described occupancy rates are also applicable to droplets that include both biological particles (e.g., cells) and beads. The occupied droplets (e.g., at least about 10%, 20%, 30%, 40%, 50%, 60%, 70%, 80%, 90%, 95%, or 99% of the occupied droplets) can include both a bead and a biological particle. Particles, e.g., beads, within a channel (e.g., a particle channel) may flow at a substantially regular flow profile (e.g., at a regular flow rate) to provide a droplet, when formed, with a single particle (e.g., bead) and a single cell or other biological particle. Such regular flow profiles may permit the droplets to have a dual occupancy (e.g., droplets having at least one bead and at least one cell or biological particle) greater than 5%, 10%, 20%, 30%, 40%, 50%, 60%, 70%, 80%, 81%, 82%, 83%, 84%, 85%, 86%, 87%, 88%, 89%, 90%, 91%, 92%, 93%, 94%, 95%, 96%, 97% 98%, or 99%. In some embodiments, the droplets have a 1:1 dual occupancy (i.e., droplets having exactly one particle (e.g., bead) and exactly one cell or biological particle) greater than 5%, 10%, 20%, 30%, 40%, 50%, 60%, 70%, 80%, 81%, 82%, 83%, 84%, 85%, 86%, 87%, 88%, 89%, 90%, 91%, 92%, 93%, 94%, 95%, 96%, 97% 98%, or 99%. Such regular flow profiles and devices that may be used to provide such regular flow profiles are provided, for example, in U.S. Patent Publication No. 2015/0292988, which is entirely incorporated herein by reference.

In some cases, additional particles may be used to deliver additional reagents to a droplet. In such cases, it may be advantageous to introduce different particles (e.g., beads) into a common channel (e.g., proximal to or upstream from a droplet formation region) or droplet formation intersection from different bead sources (e.g., containing different associated reagents) through different channel inlets into such common channel or droplet formation region. In such cases, the flow and/or frequency of each of the different particle, e.g., bead, sources into the channel or fluidic connections may be controlled to provide for the desired ratio of particles, e.g., beads, from each source, while optionally ensuring the desired pairing or combination of such particles, e.g., beads, are formed into a droplet with the desired number of biological particles.

The droplets described herein may comprise small volumes, for example, less than about 10 microliters (μL), 5 μL, 1 μL, 900 picoliters (pL), 800 pL, 700 pL, 600 pL, 500 pL, 400 pL, 300 pL, 200 pL, 100 pL, 50 pL, 20 pL, 10 pL, 1 pL, 500 nanoliters (nL), 100 nL, 50 nL, or less. For example, the droplets may have overall volumes that are less than about 1000 pL, 900 pL, 800 pL, 700 pL, 600 pL, 500 pL, 400 pL, 300 pL, 200 pL, 100 pL, 50 pL, 20 pL, 10 pL, 1 pL, or less. Where the droplets further comprise particles (e.g., beads or microcapsules), it will be appreciated that the sample liquid volume within the droplets may be less than about 90% of the above described volumes, less than about 80%, less than about 70%, less than about 60%, less than about 50%, less than about 40%, less than about 30%, less than about 20%, or less than about 10% the above described volumes (e.g., of a partitioning liquid), e.g., from 1% to 99%, from 5% to 95%, from 10% to 90%, from 20% to 80%, from 30% to 70%, or from 40% to 60%, e.g., from 1% to 5%, 5% to 10%, 10% to 15%, 15% to 20%, 20% to 25%, 25% to 30%, 30% to 35%, 35% to 40%, 40% to 45%, 45% to 50%, 50% to 55%, 55% to 60%, 60% to 65%, 65% to 70%, 70% to 75%, 75% to 80%, 80% to 85%, 85% to 90%, 90% to 95%, or 95% to 100% of the above described volumes.

Any suitable number of droplets can be generated. For example, in a method described herein, a plurality of droplets may be generated that comprises at least about 1,000 droplets, at least about 5,000 droplets, at least about 10,000 droplets, at least about 50,000 droplets, at least about 100,000 droplets, at least about 500,000 droplets, at least about 1,000,000 droplets, at least about 5,000,000 droplets at least about 10,000,000 droplets, at least about 50,000,000 droplets, at least about 100,000,000 droplets, at least about 500,000,000 droplets, at least about 1,000,000,000 droplets, or more. Moreover, the plurality of droplets may comprise both unoccupied droplets (e.g., empty droplets) and occupied droplets.

The fluid to be dispersed into droplets may be transported from a reservoir to the droplet formation region. Alternatively, the fluid to be dispersed into droplets is formed in situ by combining two or more fluids in the device. For example, the fluid to be dispersed may be formed by combining one fluid containing one or more reagents with one or more other fluids containing one or more reagents. In these embodiments, the mixing of the fluid streams may result in a chemical reaction. For example, when a particle is employed, a fluid having reagents that disintegrates the particle may be combined with the particle, e.g., immediately upstream of the droplet generating region. In these embodiments, the particles may be cells, which can be combined with lysing reagents, such as surfactants. When particles, e.g., beads, are employed, the particles, e.g., beads, may be dissolved or chemically degraded, e.g., by a change in pH (acid or base), redox potential (e.g., addition of an oxidizing or reducing agent), enzymatic activity, change in salt or ion concentration, or other mechanism.

The first fluid is transported through the first channel at a flow rate sufficient to produce droplets in the droplet formation region. Faster flow rates of the first fluid generally increase the rate of droplet production; however, at a high enough rate, the first fluid will form a jet, which may not break up into droplets. Typically, the flow rate of the first fluid though the first channel may be between about 0.01 μL/min to about 100 μL/min, e.g., 0.1 to 50 μL/min, 0.1 to 10 μL/min, or 1 to 5 μL/min. In some instances, the flow rate of the first liquid may be between about 0.04 μL/min and about 40 μL/min. In some instances, the flow rate of the first liquid may be between about 0.01 μL/min and about 100 μL/min. Alternatively, the flow rate of the first liquid may be less than about 0.01 μL/min. Alternatively, the flow rate of the first liquid may be greater than about 40 μL/min, e.g., 45 μL/min, 50 μL/min, 55 μL/min, 60 μL/min, 65 μL/min, 70 μL/min, 75 μL/min, 80 μL/min, 85 μL/min, 90 μL/min, 95 μL/min, 100 μL/min, 110 μL/min, 120 μL/min, 130 μL/min, 140 μL/min, 150 μL/min, or greater. At lower flow rates, such as flow rates of about less than or equal to 10 μL/min, the droplet radius may not be dependent on the flow rate of first liquid. Alternatively or in addition, for any of the abovementioned flow rates, the droplet radius may be independent of the flow rate of the first liquid.

The typical droplet formation rate for a single channel in a device of the invention is between 0.1 Hz to 10,000 Hz, e.g., 1 to 1000 Hz or 1 to 500 Hz. The use of multiple first channels can increase the rate of droplet formation by increasing the number of locations of formation.

As discussed above, droplet formation may occur in the absence of externally driven movement of the continuous phase. In such embodiments, the continuous phase flows in response to displacement by the advancing stream of the first fluid or other forces. Channels may be present in the droplet formation region, e.g., including a shelf region, to allow more rapid transport of the continuous phase around the first fluid. This increase in transport of the continuous phase can increase the rate of droplet formation. Alternatively, the continuous phase may be actively transported. For example, the continuous phase may be actively transported into the droplet formation region, e.g., including a shelf region, to increase the rate of droplet formation; continuous phase may be actively transported to form a sheath flow around the first fluid as it exits the distal end; or the continuous phase may be actively transported to move droplets away from the point of formation.

Additional factors that affect the rate of droplet formation include the viscosity of the first fluid and of the continuous phase, where increasing the viscosity of either fluid reduces the rate of droplet formation. In certain embodiments, the viscosity of the first fluid and/or continuous is between 0.5 cP to 10 cP. Furthermore, lower interfacial tension results in slower droplet formation. In certain embodiments, the interfacial tension is between 0.1 and 100 mN/m, e.g., 1 to 100 mN/m or 2 mN/m to 60 mN/m. The depth of the shelf region can also be used to control the rate of droplet formation, with a shallower depth resulting in a faster rate of formation.

The methods may be used to produce droplets in range of 1 μm to 500 μm in diameter, e.g., 1 to 250 μm, 5 to 200 μm, 5 to 150 μm, or 12 to 125 μm. Factors that affect the size of the droplets include the rate of formation, the cross-sectional dimension of the distal end of the first channel, the depth of the shelf, and fluid properties and dynamic effects, such as the interfacial tension, viscosity, and flow rate.

The first liquid may be aqueous, and the second liquid may be an oil (or vice versa). Examples of oils include perfluorinated oils, mineral oil, and silicone oils. For example, a fluorinated oil may include a fluorosurfactant for stabilizing the resulting droplets, for example, inhibiting subsequent coalescence of the resulting droplets. Examples of particularly useful liquids and fluorosurfactants are described, for example, in U.S. Pat. No. 9,012,390, which is entirely incorporated herein by reference for all purposes. Specific examples include hydrofluoroethers, such as HFE 7500, 7300, 7200, or 7100. Suitable liquids are those described in US 2015/0224466 and US 62/522,292, the liquids of which are hereby incorporated by reference. In some cases, liquids include additional components such as a particle, e.g., a cell or a gel bead. As discussed above, the first fluid or continuous phase may include reagents for carrying out various reactions, such as nucleic acid amplification, lysis, or bead dissolution. The first liquid or continuous phase may include additional components that stabilize or otherwise affect the droplets or a component inside the droplet. Such additional components include surfactants, antioxidants, preservatives, buffering agents, antibiotic agents, salts, chaotropic agents, enzymes, nanoparticles, and sugars.

Devices of the present invention having a collection reservoir that includes a lumen configured to accept a collection device may be used to produce droplets and recover droplets in a highly efficient manner by reducing the amount of droplets lost during sample transfer. In some devices, the lumen has an angle of between ±45 degrees (e.g., about −45°, about −44.5°, about −44°, about −43.5°, about −43°, about −42.5°, about −42°, about −41.5°, about −41°, about −40.5°, about −40°, about −39.5°, about −39°, about −38.5°, about −38°, about −37.5°, about −37°, about −36.5°, about −36°, about −35.5°, about −35°, about −34.5°, about −34°, about −33.5°, about −33°, about −32.5°, about −32°, about −31.5°, about −31°, about −30.5°, about −30°, about −29.5°, about −29°, about −28.5°, about −28°, about −27.5°, about −27°, about −26.5°, about −26°, about −25.5°, about −25°, about −24.5°, about −24°, about −23.5°, about −23°, about −22.5°, about −22°, about −21.5°, about −21°, about −20.5°, about −20°, about −19.5°, about −19°, about −18.5°, about −18°, about −17.5°, about −17°, about −16.5°, about −16°, about −15.5°, about −15°, about −14.5°, about −14°, about −13.5°, about −13°, about −12.5°, about −12°, about −11.5°, about −11°, about −10.5°, about −10°, about −9.5°, about −9°, about −8.5°, about −8°, about −7.5°, about −7°, about −6.5°, about −6°, about −5.5°, about −5°, about −4.5°, about −4°, about −3.5°, about −3°, about −2.5°, about −2°, about −1.5°, about −1°, about −0.5°, about 0°, about 0.5°, about 1°, about 1.5°, about 2°, about 2.5°, about 3°, about 3.5°, about 4°, about 4.5°, about 5°, about 5.5°, about 6°, about 6.5°, about 7°, about 7.5°, about 8°, about 8.5°, about 9°, about 9.5°, about 10°, about 10.5°, about 11°, about 11.5°, about 12°, about 12.5°, about 13°, about 13.5°, about 14°, about 14.5°, about 15°, about 15.5°, about 16°, about 16.5°, about 17°, about 17.5°, about 18°, about 18.5°, about 19°, about 19.5°, about 20°, about 20.5°, about 21°, about 21.5°, about 22°, about 22.5°, about 23°, about 23.5°, about 24°, about 24.5°, about 25°, about 25.5°, about 26°, about 26.5°, about 27°, about 27.5°, about 28°, about 28.5°, about 29°, about 29.5°, about 30°, about 30.5°, about 31°, about 31.5°, about 32°, about 32.5°, about 33°, about 33.5°, about 34°, about 34.5°, about 35°, about 35.5°, about 36°, about 36.5°, about 37°, about 37.5°, about 38°, about 38.5°, about 39°, about 39.5°, about 40°, about 40.5°, about 41°, about 41.5°, about 42°, about 42.5°, about 43°, about 43.5°, about 44°, about 44.5°, or about 45°) from surface normal. In some cases, the lumen is between ±45°, about −45°, about −44.5°, about −44°, about −43.5°, about −43°, about −42.5°, about −42°, about −41.5°, about −41°, about −40.5°, about −40°, about −39.5°, about −39°, about −38.5°, about −38°, about −37.5°, about −37°, about −36.5°, about −36°, about −35.5°, about −35°, about −34.5°, about −34°, about −33.5°, about −33°, about −32.5°, about −32°, about −31.5°, about −31°, about −30.5°, about −30°, about −29.5°, about −29°, about −28.5°, about −28°, about −27.5°, about −27°, about −26.5°, about −26°, about −25.5°, about −25°, about −24.5°, about −24°, about −23.5°, about −23°, about −22.5°, about −22°, about −21.5°, about −21°, about −20.5°, about −20°, about −19.5°, about −19°, about −18.5°, about −18°, about −17.5°, about −17°, about −16.5°, about −16°, about −15.5°, about −15°, about −14.5°, about −14°, about −13.5°, about −13°, about −12.5°, about −12°, about −11.5°, about −11°, about −10.5°, about −10°, about −9.5°, about −9°, about −8.5°, about −8°, about −7.5°, about −7°, about −6.5°, about −6°, about −5.5°, about −5°, about −4.5°, about −4°, about −3.5°, about −3°, about −2.5°, about −2°, about −1.5°, about −1°, about −0.5°, about 0°, about 0.5°, about 1°, about 1.5°, about 2°, about 2.5°, about 3°, about 3.5°, about 4°, about 4.5°, about 5°, about 5.5°, about 6°, about 6.5°, about 7°, about 7.5°, about 8°, about 8.5°, about 9°, about 9.5°, about 10°, about 10.5°, about 11°, about 11.5°, about 12°, about 12.5°, about 13°, about 13.5°, about 14°, about 14.5°, about 15°, about 15.5°, about 16°, about 16.5°, about 17°, about 17.5°, about 18°, about 18.5°, about 19°, about 19.5°, about 20°, about 20.5°, about 21°, about 21.5°, about 22°, about 22.5°, about 23°, about 23.5°, about 24°, about 24.5°, about 25°, about 25.5°, about 26°, about 26.5°, about 27°, about 27.5°, about 28°, about 28.5°, about 29°, about 29.5°, about 30°, about 30.5°, about 31°, about 31.5°, about 32°, about 32.5°, about 33°, about 33.5°, about 34°, about 34.5°, about 35°, about 35.5°, about 36°, about 36.5°, about 37°, about 37.5°, about 38°, about 38.5°, about 39°, about 39.5°, about 40°, about 40.5°, about 41°, about 41.5°, about 42°, about 42.5°, about 43°, about 43.5°, about 44°, about 44.5°, or about 45°. In some cases, the lumen is between ±45°, e.g., between about −45° and about −15°, between about −15° and about 15°, between about 15° and about 45°, between about −45° and about −30°, between about −35° and about −20°, between about −25° and about −10°, between about −15° and about 0°, between about −5° and about 10°, between about 5° and about 20°, between about 15° and about 30°, between about 25° and about 40°, or between about 35° and about 45° from surface normal. In this configuration, the lumen accepts a collection device (e.g., pipette tip or a collection tube) prior to droplet production, and the droplets accumulate in the collection device after they are formed. In some instances, the collection device is a tube in fluid communication with an external container (i.e., one not physically connected to the device other than by the tube). In this configuration, after the droplets accumulate in the tube, an immiscible displacement fluid, e.g., any liquid less dense than water, e.g., additional continuous phase, or other oil such as silicone or organic oils, transfers the droplets from the collection reservoir, through the tube, and into the external container. Thus, when a production run for forming droplets is complete, the droplets are already within a collection device. This limits the loss of droplets during transferring steps, thereby increasing efficiency.

In some instances, devices of the present invention having a droplet or particle source in fluid communication with the collection reservoir may be used to simultaneously provide a second set of droplets and/or particles to the collection reservoir at a rate faster than the production of a first set of droplets. In this configuration, the first droplets include a sample, and the second droplets and/or particles do not. In this case, when a production run for forming droplets is complete, the number of droplets including no sample will be the same or greater (e.g., 1, 2, 3, 4, 5, 6, 7, 8, 9, or 10 times greater) than the number of droplets including a sample. Thus, during transfer the chances that a droplet including a sample is lost are lower than the chances of losing a droplet with no sample, thereby increasing efficiency.

In the present invention, some devices have a collection reservoir having a top portion and a bottom portion. In some devices, the collection reservoir has an oil shunt in fluid communication with the bottom portion of the collection reservoir, e.g., controllably in fluid communication with the bottom portion. The collection reservoir may also be in fluid communication with one or more access channels, e.g., a reagent delivery channel and/or a recovery channel, e.g., controllably in fluid communication with, the top portion. One or more thermal elements, e.g., resistive heaters, water baths, oil baths, or Peltier devices, may be disposed to alter the temperature of the collection reservoir. Thus, when a production run for forming droplets is complete, the droplets are in the collection reservoir for processing. The thermal elements alter the temperature (e.g., heating or cooling the collection reservoir, thereby processing the sample). The emulsion may then be broken to produce an aqueous layer in the collection reservoir via delivery of a reagent from an access channel, e.g., a reagent delivery channel. The broken emulsion, typically an aqueous layer, may be removed, e.g., via an access channel, e.g., a recovery channel or the same channel by which reagents are delivered. The collection reservoir can also be opened for reagent delivery or processed sample removal. Recovery may be affected by a pressure differential, displacement, or other pumping mechanism. This removes the necessity to transfer the droplets out of the collection reservoir to process the sample, thereby increasing efficiency.

Breaking the emulsion can encompass any method by which the contents of a droplet are liberated. Non-limiting examples of release methods include breaking the surface of a droplet, making the droplet porous such that the contents can diffuse out of the droplet, and destabilizing the emulsion in which a droplet is present. An emulsion can be mixed with a destabilization agent that causes the droplets to destabilize and to coalesce. A destabilization agent can be any agent that induces droplets of an emulsion to coalesce with one another. The destabilization agent may be introduced at an amount effective to induce coalescence, which may be selected based, for example, on the volume of the emulsion, the volume of carrier fluid in the emulsion, and/or the total volume of droplets, among others. The amount also or alternatively may be selected, based, for example, on the type of continuous phase fluid, amount and type of surfactant in each phase, etc. The destabilization agent can be delivered by an access channel, e.g., a reagent delivery channel. In some cases, a destabilization agent may be a weak surfactant.

Without wishing to be bound by theory, a weak surfactant can compete with droplet surfactant at the oil/aqueous interface causing an emulsion to collapse. In some cases, the destabilization agent can be perfluorooctanol (PFO), however, other fluorous compounds with a small hydrophilic group may be used. Other examples of destabilization agents include one or more halogen-substituted hydrocarbons. In some cases, the destabilization agent may be predominantly or at least substantially composed of one or more halogen-substituted hydrocarbons. Additional examples of destabilization agents are provided in U.S. Patent Publication Nos.

2013/018970 and 2016/0244809, the destabilizing agents of which are incorporated herein by reference.

Devices, systems, compositions, and methods of the present disclosure may be used for various applications, such as, for example, processing a single analyte (e.g., bioanalytes, e.g., RNA, DNA, or protein) or multiple analytes (e.g., bioanalytes, e.g., DNA and RNA, DNA and protein, RNA and protein, or RNA, DNA and protein) from a single cell. For example, a biological particle (e.g., a cell or virus) can be formed in a droplet, and one or more analytes (e.g., bioanalytes) from the biological particle (e.g., cell) can be modified or detected (e.g., bound, labeled, or otherwise modified by a moiety) for subsequent processing. The multiple analytes may be from the single cell. This process may enable, for example, proteomic, transcriptomic, and/or genomic analysis of the cell or population thereof (e.g., simultaneous proteomic, transcriptomic, and/or genomic analysis of the cell or population thereof).

Methods of modifying analytes include providing a plurality of particles (e.g., beads) in a liquid carrier (e.g., an aqueous carrier); providing a sample containing an analyte (e.g., as part of a cell, or component or product thereof) in a sample liquid; and using the device to combine the liquids and form a droplet containing one or more particles and one or more analytes (e.g., as part of one or more cells, or components or products thereof). Such sequestration of one or more particles with analyte (e.g., bioanalyte associated with a cell) in a droplet enables labeling of discrete portions of large, heterologous samples (e.g., single cells within a heterologous population). Once labeled or otherwise modified, droplets can be combined (e.g., by breaking an emulsion), and the resulting liquid can be analyzed to determine a variety of properties associated with each of numerous single cells.

In particular embodiments, the invention features methods of producing droplets using a device having a particle channel and a sample channel that intersect proximal to a droplet formation region. Particles having a moiety in a liquid carrier flow proximal-to-distal (e.g., towards the droplet formation region) through the particle channel and a sample liquid containing an analyte flows proximal-to-distal (e.g., towards the droplet formation region) through the sample channel until the two liquids meet and combine at the intersection of the sample channel and the particle channel, upstream (and/or proximal to) the droplet formation region. The combination of the liquid carrier with the sample liquid results in a combined liquid. In some embodiments, the two liquids are miscible (e.g., they both contain solutes in water or aqueous buffer). The combination of the two liquids can occur at a controlled relative rate, such that the liquid has a desired volumetric ratio of particle liquid to sample liquid, a desired numeric ratio of particles to cells, or a combination thereof (e.g., one particle per cell per 50 pL). As the liquid flows through the droplet formation region into a partitioning liquid (e.g., a liquid which is immiscible with the liquid, such as an oil), droplets form. These droplets may continue to flow through one or more channels. Alternatively or in addition, the droplets may accumulate (e.g., as a substantially stationary population) in a droplet collection reservoir. In some cases, the accumulation of a population of droplets may occur by a gentle flow of a fluid within the droplet collection reservoir, e.g., to move the formed droplets out of the path of the nascent droplets.

Devices may feature any combination of elements described herein. For example, various droplet formation regions can be employed in the design of a device. In some embodiments, droplets are formed at a droplet formation region having a shelf region, where the liquid expands in at least one dimension as it passes through the droplet formation region. Any shelf region described herein can be useful in the methods of droplet formation provided herein. Additionally or alternatively, the droplet formation region may have a step at or distal to an inlet of the droplet formation region (e.g., within the droplet formation region or distal to the droplet formation region). In some embodiments, droplets are formed without externally driven flow of a continuous phase (e.g., by one or more crossing flows of liquid at the droplet formation region). Alternatively, droplets are formed in the presence of an externally driven flow of a continuous phase.

A device useful for droplet formation may feature multiple droplet formation regions (e.g., in or out of (e.g., as independent, parallel circuits) fluid communication with one another. For example, such a device may have 2-100, 3-50, 4-40, 5-30, 6-24, 8-18, or 9-12, e.g., 2-6, 6-12, 12-18, 18-24, 24-36, 36-48, or 48-96, e.g., 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, or more droplet formation regions configured to produce droplets).

Source reservoirs can store liquids prior to and during droplet formation. In some embodiments, a device useful in droplet formation includes one or more particle reservoirs connected proximally to one or more particle channels. Particle suspensions can be stored in particle reservoirs prior to droplet formation. Particle reservoirs can be configured to store particles containing a moiety. For example, particle reservoirs can include, e.g., a coating to prevent adsorption or binding (e.g., specific or non-specific binding) of particles or moieties. Additionally or alternatively, particle reservoirs can be configured to minimize degradation of moieties (e.g., by containing nuclease, e.g., DNAse or RNAse) or the particle matrix itself, accordingly.

Additionally or alternatively, a device includes one or more sample reservoirs connected proximally to one or more sample channels. Samples containing cells and/or other reagents can be stored in sample reservoirs prior to droplet formation. Sample reservoirs can be configured to reduce degradation of sample components, e.g., by including nuclease (e.g., DNAse or RNAse).

Methods of the invention include administering a sample and/or particles to the device, for example, (a) by pipetting a sample liquid, or a component or concentrate thereof, into a sample reservoir and/or (b) by pipetting a liquid carrier (e.g., an aqueous carrier) and/or particles into a particle reservoir. In some embodiments, the method involves first pipetting the liquid carrier (e.g., an aqueous carrier) and/or particles into the particle reservoir prior to pipetting the sample liquid, or a component or concentrate thereof, into the sample reservoir.

The sample reservoir and/or particle reservoir may be incubated in conditions suitable to preserve or promote activity of their contents until the initiation or commencement of droplet formation.

Formation of bioanalyte droplets, as provided herein, can be used for various applications. In particular, by forming bioanalyte droplets using the methods, devices, systems, and kits herein, a user can perform standard downstream processing methods to barcode heterogeneous populations of cells or perform single-cell nucleic acid sequencing.

In methods of barcoding a population of cells, an aqueous sample having a population of cells is combined with bioanalyte particles having a nucleic acid primer sequence and a barcode in an aqueous carrier at an intersection of the sample channel and the particle channel to form a reaction liquid. Upon passing through the droplet formation region, the reaction liquid meets a partitioning liquid (e.g., a partitioning oil) under droplet-forming conditions to form a plurality of reaction droplets, each reaction droplet having one or more of the particles and one or more cells in the reaction liquid. The reaction droplets are incubated under conditions sufficient to allow for barcoding of the nucleic acid of the cells in the reaction droplets. In some embodiments, the conditions sufficient for barcoding are thermally optimized for nucleic acid replication, transcription, and/or amplification. For example, reaction droplets can be incubated at temperatures configured to enable reverse transcription of RNA produced by a cell in a droplet into DNA, using reverse transcriptase. Additionally or alternatively, reaction droplets may be cycled through a series of temperatures to promote amplification, e.g., as in a polymerase chain reaction (PCR). Accordingly, in some embodiments, one or more nucleotide amplification reagents (e.g., PCR reagents) are included in the reaction droplets (e.g., primers, nucleotides, and/or polymerase). Any one or more reagents for nucleic acid replication, transcription, and/or amplification can be provided to the reaction droplet by the aqueous sample, the liquid carrier, or both. In some embodiments, one or more of the reagents for nucleic acid replication, transcription, and/or amplification are in the aqueous sample.

Also provided herein are methods of single-cell nucleic acid sequencing, in which a heterologous population of cells can be characterized by their individual gene expression, e.g., relative to other cells of the population. Methods of barcoding cells discussed above and known in the art can be part of the methods of single-cell nucleic acid sequencing provided herein. After barcoding, nucleic acid transcripts that have been barcoded are sequenced, and sequences can be processed, analyzed, and stored according to known methods. In some embodiments, these methods enable the generation of a genome library containing gene expression data for any single cell within a heterologous population.

Alternatively, the ability to sequester a single cell in a reaction droplet provided by methods herein enables bioanalyte applications beyond genome characterization. For example, a reaction droplet containing a single cell and variety of analyte moieties capable of binding different proteins can allow a single cell to be detectably labeled to provide relative protein expression data. In some embodiments, analyte moieties are antigen-binding molecules (e.g., antibodies or fragments thereof), wherein each antibody clone is detectably labeled (e.g., with a fluorescent marker having a distinct emission wavelength). Binding of antibodies to proteins can occur within the reaction droplet, and cells can be subsequently analyzed for bound antibodies according to known methods to generate a library of protein expression. Other methods known in the art can be employed to characterize cells within heterologous populations after detecting analytes using the methods provided herein. In one example, following the formation or droplets, subsequent operations that can be performed can include formation of amplification products, purification (e.g., via solid phase reversible immobilization (SPRI)), further processing (e.g., shearing, ligation of functional sequences, and subsequent amplification (e.g., via PCR)). These operations may occur in bulk (e.g., outside the droplet). An exemplary use for droplets formed using methods of the invention is in performing nucleic acid amplification, e.g., polymerase chain reaction (PCR), where the reagents necessary to carry out the amplification are contained within the first fluid. In the case where a droplet is a droplet in an emulsion, the emulsion can be broken and the contents of the droplet pooled for additional operations. Additional reagents that may be included in a droplet along with the barcode bearing bead may include oligonucleotides to block ribosomal RNA (rRNA) and nucleases to digest genomic DNA from cells. Alternatively, rRNA removal agents may be applied during additional processing operations. The configuration of the constructs generated by such a method can help minimize (or avoid) sequencing of poly-T sequence during sequencing and/or sequence the 5' end of a polynucleotide sequence. The amplification products, for example first amplification products and/or second amplification products, may be subject to sequencing for sequence analysis. In some cases, amplification may be performed using the Partial Hairpin Amplification for Sequencing (PHASE) method.

Methods of Device Manufacture

The microfluidic devices of the present disclosure may be fabricated in any of a variety of conventional ways. For example, in some cases the devices comprise layered structures, where a first layer includes a planar surface into which is disposed a series of channels or grooves that correspond to the channel network in the finished device. A second layer includes a planar surface on one side, and a series of reservoirs defined on the opposing surface, where the reservoirs communicate as passages through to the planar layer, such that when the planar surface of the second layer is mated with the planar surface of the first layer, the reservoirs defined in the second layer are positioned in liquid communication with the termini of the channels on the first layer. Alternatively, both the reservoirs and the connected channels may be fabricated into a single part, where the reservoirs are provided upon a first surface of the structure, with the apertures of the reservoirs extending through to the opposing surface of the structure.

The channel network is fabricated as a series of grooves and features in this second surface. A thin laminating layer is then provided over the second surface to seal, and provide the final wall of the channel network, and the bottom surface of the reservoirs.

These layered structures may be fabricated in whole or in part from polymeric materials, such as polyethylene or polyethylene derivatives, such as cyclic olefin copolymers (COC), polymethylmethacrylate (PMMA), polydimethylsiloxane (PDMS), polycarbonate, polystyrene, polypropylene, polyvinyl chloride, polytetrafluoroethylene, polyoxymethylene, polyether ether ketone, polycarbonate, polystyrene, or the like, or they may be fabricated in whole or in part from inorganic materials, such as silicon, or other silica based materials, e.g., glass, quartz, fused silica, borosilicate glass, metals, ceramics, and combinations thereof. Polymeric device components may be fabricated using any of a number of processes including soft lithography, embossing techniques, micromachining, e.g., laser machining, or in some aspects injection molding of the layer components that include the defined channels as well as other structures, e.g., reservoirs, integrated functional components, etc. In some aspects, the structure comprising the reservoirs and channels may be fabricated using, e.g., injection molding techniques to produce polymeric structures. In such cases, a laminating layer may be adhered to the molded structured part through readily available methods, including thermal lamination, solvent based lamination, sonic welding, or the like.

As will be appreciated, structures comprised of inorganic materials also may be fabricated using known techniques. For example, channels and other structures may be micromachined into surfaces or etched into the surfaces using standard photolithographic techniques. In some aspects, the microfluidic devices or components thereof may be fabricated using three-dimensional printing techniques to fabricate the channel or other structures of the devices and/or their discrete components.

Methods for Surface Modifications

The invention features methods for producing a microfluidic device that has a surface modification, e.g., a surface with a modified water contact angle. The methods may be employed to modify the surface of a device such that a liquid can "wet" the surface by altering the contact angle the liquid makes with the surface. An exemplary use of the methods of the invention is in creating a device having differentially coated surfaces to optimize droplet formation.

Devices to be modified with surface coating agents may be primed, e.g., pre-treated, before coating processes occur. In one embodiment, the device has a channel that is in fluid communication with a droplet formation region. In particular, the droplet formation region is configured to allow a liquid exiting the channel to expand in at least one dimension. A surface of the droplet formation region is contacted by at least one reagent that has an affinity for the primed surface to produce a surface having a first water contact angle of greater than about 90°, e.g., a hydrophobic or fluorophillic surface. In certain embodiments, the first contact angle is greater than the water contact angle of the primed surface. In other embodiments, the first contact angle is greater than the water contact angle of the channel surface. Thus, the method allows for the differential coating of surfaces within the microfluidic device.

A surface may be primed by depositing a metal oxide onto it. Example metal oxides useful for priming surfaces include, but are not limited to, $Al_2O_3$, $TiO_2$, $SiO_2$, or a combination thereof. Other metal oxides useful for surface modifications are known in the art. The metal oxide can be applied to the surface by standard deposition techniques, including, but not limited to, atomic layer deposition (ALD), physical vapor deposition (PVD), e.g., sputtering, chemical vapor deposition (CVD), or laser deposition. Other deposition techniques for coating surfaces, e.g., liquid-based deposition, are known in the art. For example, an atomic layer of $Al_2O_3$ can be prepared on a surface by depositing trimethylaluminum (TMA) and water.

In some cases, the coating agent may create a surface that has a water contact angle greater than 90°, e.g., hydrophobic or fluorophillic, or may create a surface with a water contact angle of less than 90°, e.g., hydrophilic. For example, a fluorophillic surface may be created by flowing fluorosilane (e.g., $H_3FSi$) through a primed device surface, e.g., a surface coated in a metal oxide. The priming of the surfaces of the device enhances the adhesion of the coating agents to the surface by providing appropriate surface functional groups. In some cases, the coating agent used to coat the primed surface may be a liquid reagent. For example, when a liquid coating agent is used to coat a surface, the coating agent may be directly introduced to the droplet formation region by a feed channel in fluid communication with the droplet formation region. In order to keep the coating agent localized to the droplet formation region, e.g., prevent ingress of the coating agent to another portion of the device, e.g., the channel, the portion of the device that is not to be coated can be substantially blocked by a substance that does not allow the coating agent to pass. For example, in order to prevent ingress of a liquid coating agent into the channel, the channel may be filled with a blocking liquid that is substantially immiscible with the coating agent. The blocking liquid may be actively transported through the portion of the device not to be coated, or the blocking liquid may be stationary. Alternatively, the channel may be filled with a pressurized gas such that the pressure prevents ingress of the coating agent into the channel. The coating agent may also be applied to the regions of interest external to the main device. For example, the device may incorporate an additional reservoir and at least one feed channel that connects to the region of interest such that no coating agent is passed through the device.

EXAMPLES

Examples 1-22 show various droplet formation regions that can be used in devices, kits, systems, and methods of the invention. Examples 23-25 describe the production of the devices, kits, systems, and methods of the invention and how the structural features of the invention may be used to increase the collection efficiency, or for the processing and collection of a sample.

Example 1

FIG. 1 shows an example of a microfluidic device for the controlled inclusion of particles, e.g., beads, into discrete droplets. A device 100 can include a channel 102 communicating at a fluidic connection 106 (or intersection) with a reservoir 104. The reservoir 104 can be a chamber. Any reference to "reservoir," as used herein, can also refer to a "chamber." In operation, an aqueous liquid 108 that includes suspended beads 112 may be transported along the channel 102 into the fluidic connection 106 to meet a second liquid 110 that is immiscible with the aqueous liquid 108 in the reservoir 104 to create droplets 116, 118 of the aqueous liquid 108 flowing into the reservoir 104. At the fluidic connection 106 where the aqueous liquid 108 and the second liquid 110 meet, droplets can form based on factors such as the hydrodynamic forces at the fluidic connection 106, flow rates of the two liquids 108, 110, liquid properties, and certain geometric parameters (e.g., w, $h_0$, a, etc.) of the device 100. A plurality of droplets can be collected in the reservoir 104 by continuously injecting the aqueous liquid 108 from the channel 102 through the fluidic connection 106.

In some instances, the second liquid 110 may not be subjected to and/or directed to any flow in or out of the reservoir 104. For example, the second liquid 110 may be substantially stationary in the reservoir 104. In some instances, the second liquid 110 may be subjected to flow within the reservoir 104, but not in or out of the reservoir 104, such as via application of pressure to the reservoir 104 and/or as affected by the incoming flow of the aqueous liquid 108 at the fluidic connection 106. Alternatively, the second liquid 110 may be subjected and/or directed to flow in or out of the reservoir 104. For example, the reservoir 104 can be a channel directing the second liquid 110 from upstream to downstream, transporting the generated droplets. Alternatively or in addition, the second liquid 110 in reservoir 104 may be used to sweep formed droplets away from the path of the nascent droplets.

While FIG. 1 illustrates the reservoir 104 having a substantially linear inclination (e.g., creating the expansion angle, $\alpha$) relative to the channel 102, the inclination may be non-linear. The expansion angle may be an angle between the immediate tangent of a sloping inclination and the channel 102. In an example, the reservoir 104 may have a dome-like (e.g., hemispherical) shape. The reservoir 104 may have any other shape.

Example 2

Figure 2:
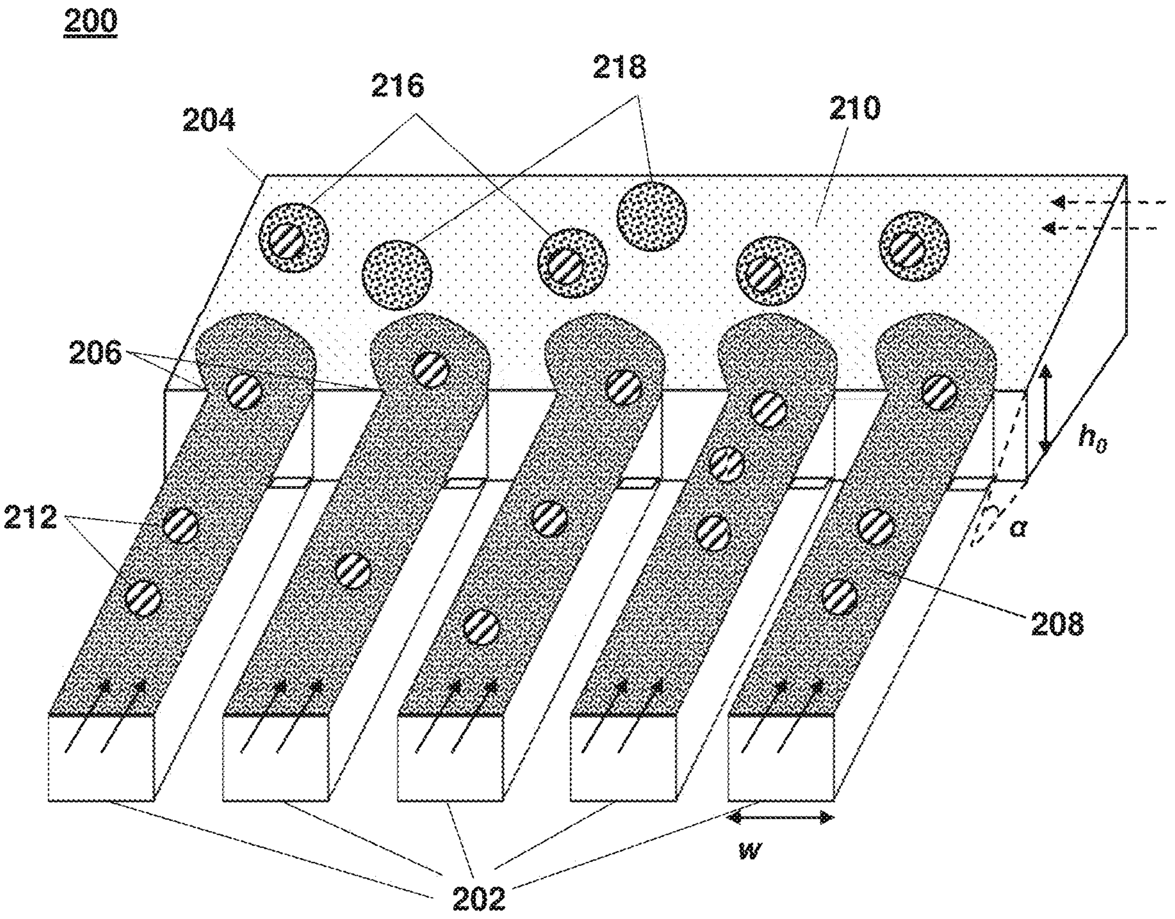
FIG. 2 shows an example of a microfluidic device for increased droplet formation throughput.

FIG. 2 shows an example of a microfluidic device for increased droplet formation throughput. A device 200 can comprise a plurality of channels 202 and a reservoir 204. Each of the plurality of channels 202 may be in fluid communication with the reservoir 204. The device 200 can comprise a plurality of fluidic connections 206 between the plurality of channels 202 and the reservoir 204. Each fluidic connection can be a point of droplet formation. The channel 102 from the device 100 in FIG. 1 and any description to the components thereof may correspond to a given channel of the plurality of channels 202 in device 200 and any description to the corresponding components thereof. The reservoir 104 from the device 100 and any description to the components thereof may correspond to the reservoir 204 from the device 200 and any description to the corresponding components thereof.

Each channel of the plurality of channels 202 may comprise an aqueous liquid 208 that includes suspended particles, e.g., beads, 212. The reservoir 204 may comprise a second liquid 210 that is immiscible with the aqueous liquid 208. In some instances, the second liquid 210 may not be subjected to and/or directed to any flow in or out of the reservoir 204. For example, the second liquid 210 may be substantially stationary in the reservoir 204. Alternatively or in addition, the formed droplets can be moved out of the path of nascent droplets using a gentle flow of the second liquid 210 in the reservoir 204. In some instances, the second liquid 210 may be subjected to flow within the reservoir 204, but not in or out of the reservoir 204, such as via application of pressure to the reservoir 204 and/or as affected by the incoming flow of the aqueous liquid 208 at the fluidic connections. Alternatively, the second liquid 210 may be subjected and/or directed to flow in or out of the reservoir 204. For example, the reservoir 204 can be a channel directing the second liquid 210 from upstream to downstream, transporting the generated droplets. Alternatively or in addition, the second liquid 210 in reservoir 204 may be used to sweep formed droplets away from the path of the nascent droplets.

In operation, the aqueous liquid 208 that includes suspended particles, e.g., beads, 212 may be transported along the plurality of channels 202 into the plurality of fluidic connections 206 to meet the second liquid 210 in the reservoir 204 to create droplets 216, 218. A droplet may form from each channel at each corresponding fluidic connection with the reservoir 204. At the fluidic connection where the aqueous liquid 208 and the second liquid 210 meet, droplets can form based on factors such as the hydrodynamic forces at the fluidic connection, flow rates of the two liquids 208, 210, liquid properties, and certain geometric parameters (e.g., w, $h_0$, $\alpha$, etc.) of the device 200, as described elsewhere herein. A plurality of droplets can be collected in the reservoir 204 by continuously injecting the aqueous liquid 208 from the plurality of channels 202 through the plurality of fluidic connections 206. The geometric parameters, w, $h_0$, and $\alpha$, may or may not be uniform for each of the channels in the plurality of channels 202. For example, each channel may have the same or different widths at or near its respective fluidic connection with the reservoir 204. For example, each channel may have the same or different height at or near its respective fluidic connection with the reservoir 204. In another example, the reservoir 204 may have the same or different expansion angle at the different fluidic connections with the plurality of channels 202. When the geometric parameters are uniform, beneficially, droplet size may also be controlled to be uniform even with the increased throughput. In some instances, when it is desirable to have a different distribution of droplet sizes, the geometric parameters for the plurality of channels 202 may be varied accordingly.

Example 3

Figure 3:
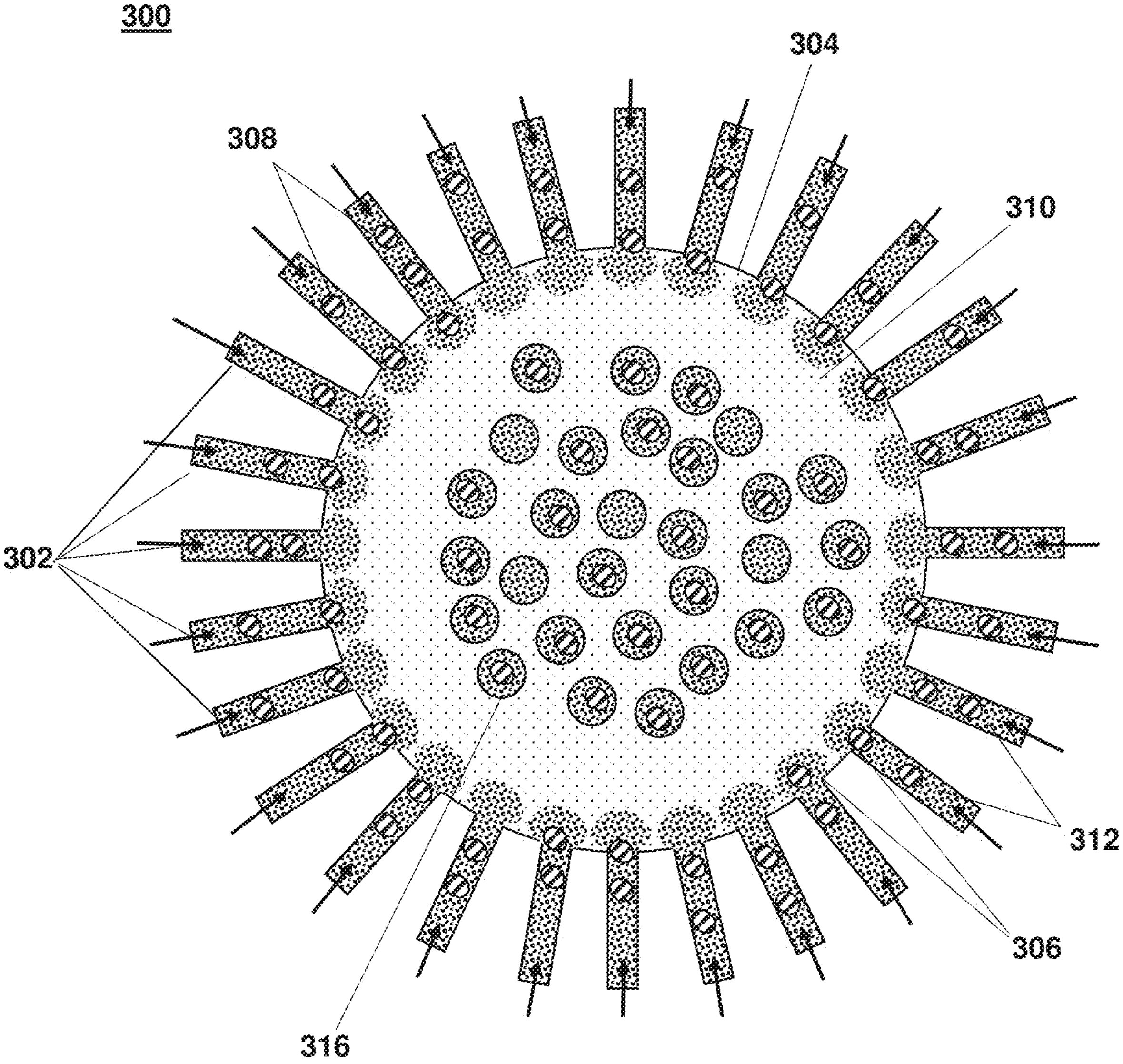
FIG. 3 shows another example of a microfluidic device for increased droplet formation throughput.

FIG. 3 shows another example of a microfluidic device for increased droplet formation throughput. A microfluidic device 300 can comprise a plurality of channels 302 arranged generally circularly around the perimeter of a reservoir 304. Each of the plurality of channels 302 may be in liquid communication with the reservoir 304. The device 300 can comprise a plurality of fluidic connections 306 between the plurality of channels 302 and the reservoir 304. Each fluidic connection can be a point of droplet formation. The channel 102 from the device 100 in FIG. 1 and any description to the components thereof may correspond to a given channel of the plurality of channels 302 in device 300 and any description to the corresponding components thereof. The reservoir 104 from the device 100 and any description to the components thereof may correspond to the reservoir 304 from the device 300 and any description to the corresponding components thereof.

Each channel of the plurality of channels 302 may comprise an aqueous liquid 308 that includes suspended particles, e.g., beads, 312. The reservoir 304 may comprise a second liquid 310 that is immiscible with the aqueous liquid 308. In some instances, the second liquid 310 may not be subjected to and/or directed to any flow in or out of the reservoir 304. For example, the second liquid 310 may be substantially stationary in the reservoir 304. In some instances, the second liquid 310 may be subjected to flow within the reservoir 304, but not in or out of the reservoir 304, such as via application of pressure to the reservoir 304 and/or as affected by the incoming flow of the aqueous liquid 308 at the fluidic connections. Alternatively, the second liquid 310 may be subjected and/or directed to flow in or out of the reservoir 304. For example, the reservoir 304 can be a channel directing the second liquid 310 from upstream to downstream, transporting the generated droplets. Alternatively or in addition, the second liquid 310 in reservoir 304 may be used to sweep formed droplets away from the path of the nascent droplets.

In operation, the aqueous liquid 308 that includes suspended particles, e.g., beads, 312 may be transported along the plurality of channels 302 into the plurality of fluidic connections 306 to meet the second liquid 310 in the reservoir 304 to create a plurality of droplets 316. A droplet may form from each channel at each corresponding fluidic connection with the reservoir 304. At the fluidic connection where the aqueous liquid 308 and the second liquid 310 meet, droplets can form based on factors such as the hydrodynamic forces at the fluidic connection, flow rates of the two liquids 308, 310, liquid properties, and certain geometric parameters (e.g., widths and heights of the channels 302, expansion angle of the reservoir 304, etc.) of the channel, as described elsewhere herein. A plurality of droplets can be collected in the reservoir 304 by continuously injecting the aqueous liquid 308 from the plurality of channels 302 through the plurality of fluidic connections 306.

Example 4

Figure 4:
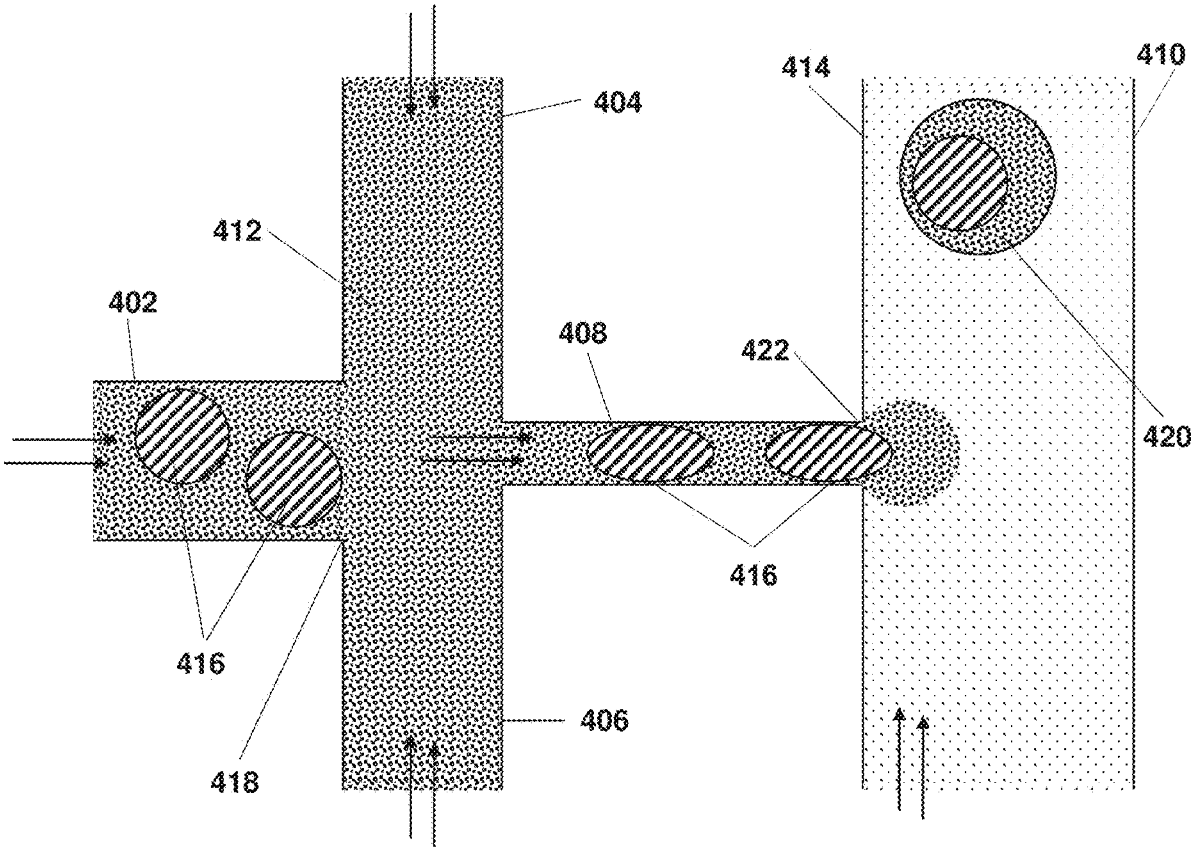
FIG. 4 shows another example of a microfluidic device for the introduction of particles, e.g., beads, into discrete droplets.

FIG. 4 shows another example of a microfluidic device for the introduction of beads into discrete droplets. A device 400 can include a first channel 402, a second channel 404, a third channel 406, a fourth channel 408, and a reservoir 410. The first channel 402, second channel 404, third channel 406, and fourth channel 408 can communicate at a first intersection 418. The fourth channel 408 and the reservoir 410 can communicate at a fluidic connection 422. In some instances, the fourth channel 408 and components thereof can correspond to the channel 102 in the device 100 in FIG. 1 and components thereof. In some instances, the reservoir 410 and components thereof can correspond to the reservoir 104 in the device 100 and components thereof.

In operation, an aqueous liquid 412 that includes suspended particles, e.g., beads, 416 may be transported along the first channel 402 into the intersection 418 at a first frequency to meet another source of the aqueous liquid 412 flowing along the second channel 404 and the third channel 406 towards the intersection 418 at a second frequency. In some instances, the aqueous liquid 412 in the second channel 404 and the third channel 406 may comprise one or more reagents. At the intersection, the combined aqueous liquid 412 carrying the suspended particles, e.g., beads, 416 (and/or the reagents) can be directed into the fourth channel 408. In some instances, a cross-section width or diameter of the fourth channel 408 can be chosen to be less than a cross-section width or diameter of the particles, e.g., beads, 416. In such cases, the particles, e.g., beads, 416 can deform and travel along the fourth channel 408 as deformed particles, e.g., beads, 416 towards the fluidic connection 422. At the fluidic connection 422, the aqueous liquid 412 can meet a second liquid 414 that is immiscible with the aqueous liquid 412 in the reservoir 410 to create droplets 420 of the aqueous liquid 412 flowing into the reservoir 410. Upon leaving the fourth channel 408, the deformed particles, e.g., beads, 416 may revert to their original shape in the droplets 420. At the fluidic connection 422 where the aqueous liquid 412 and the second liquid 414 meet, droplets can form based on factors such as the hydrodynamic forces at the fluidic connection 422, flow rates of the two liquids 412, 414, liquid properties, and certain geometric parameters (e.g., w, $h_0$, a, etc.) of the channel, as described elsewhere herein. A plurality of droplets can be collected in the reservoir 410 by continuously injecting the aqueous liquid 412 from the fourth channel 408 through the fluidic connection 422.

A discrete droplet generated may include a particle, e.g., a bead, (e.g., as in droplets 420). Alternatively, a discrete droplet generated may include more than one particle, e.g., bead. Alternatively, a discrete droplet generated may not include any particles, e.g., beads. In some instances, a discrete droplet generated may contain one or more biological particles, e.g., cells (not shown in FIG. 4).

In some instances, the second liquid 414 may not be subjected to and/or directed to any flow in or out of the reservoir 410. For example, the second liquid 414 may be substantially stationary in the reservoir 410. In some instances, the second liquid 414 may be subjected to flow within the reservoir 410, but not in or out of the reservoir 410, such as via application of pressure to the reservoir 410 and/or as affected by the incoming flow of the aqueous liquid 412 at the fluidic connection 422. In some instances, the second liquid 414 may be gently stirred in the reservoir 410. Alternatively, the second liquid 414 may be subjected and/or directed to flow in or out of the reservoir 410. For example, the reservoir 410 can be a channel directing the second liquid 414 from upstream to downstream, transporting the generated droplets. Alternatively or in addition, the second liquid 414 in reservoir 410 may be used to sweep formed droplets away from the path of the nascent droplets.

Example 5

Figure 5A:
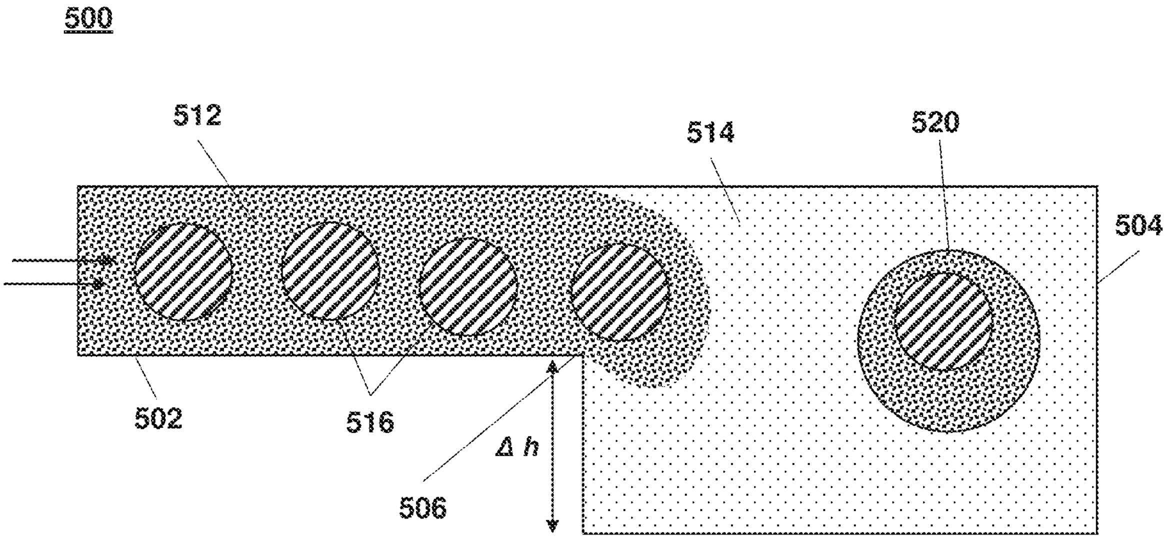
FIGS. 5A-5B show cross-section (FIG. 5A) and perspective (FIG. 5B) views an embodiment according to the invention of a microfluidic device with a geometric feature for droplet formation.
Figure 5B:
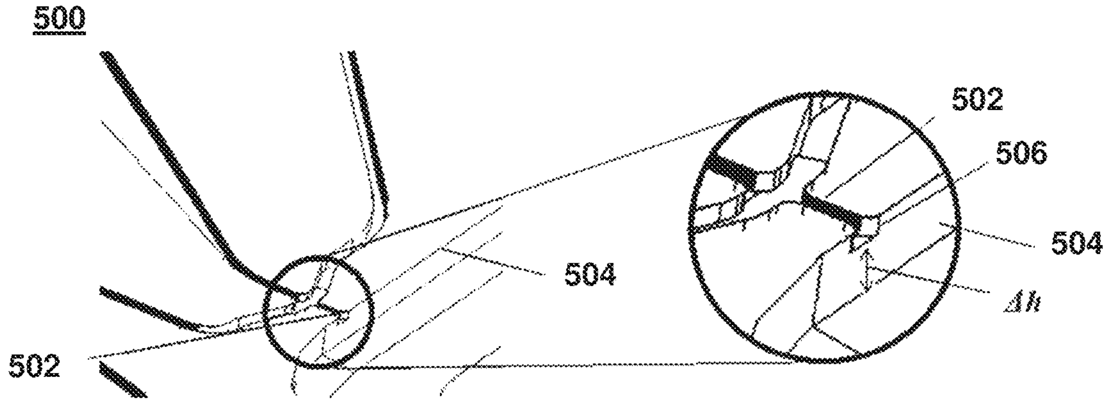

FIG. 5A shows a cross-section view of another example of a microfluidic device with a geometric feature for droplet formation. A device 500 can include a channel 502 communicating at a fluidic connection 506 (or intersection) with a reservoir 504. In some instances, the device 500 and one or more of its components can correspond to the device 100 and one or more of its components. FIG. 5B shows a perspective view of the device 500 of FIG. 5A.

An aqueous liquid 512 comprising a plurality of particles 516 may be transported along the channel 502 into the fluidic connection 506 to meet a second liquid 514 (e.g., oil, etc.) that is immiscible with the aqueous liquid 512 in the reservoir 504 to create droplets 520 of the aqueous liquid 512 flowing into the reservoir 504. At the fluidic connection 506 where the aqueous liquid 512 and the second liquid 514 meet, droplets can form based on factors such as the hydrodynamic forces at the fluidic connection 506, relative flow rates of the two liquids 512, 514, liquid properties, and certain geometric parameters (e.g., Δh, etc.) of the device 500. A plurality of droplets can be collected in the reservoir 504 by continuously injecting the aqueous liquid 512 from the channel 502 at the fluidic connection 506.

While FIGS. 5A and 5B illustrate the height difference, Δh, being abrupt at the fluidic connection 506 (e.g., a step increase), the height difference may increase gradually (e.g., from about 0 μm to a maximum height difference). Alternatively, the height difference may decrease gradually (e.g., taper) from a maximum height difference. A gradual increase or decrease in height difference, as used herein, may refer to a continuous incremental increase or decrease in height difference, wherein an angle between any one differential segment of a height profile and an immediately adjacent differential segment of the height profile is greater than 90°. For example, at the fluidic connection 506, a bottom wall of the channel and a bottom wall of the reservoir can meet at an angle greater than 90°. Alternatively or in addition, a top wall (e.g., ceiling) of the channel and a top wall (e.g., ceiling) of the reservoir can meet an angle greater than 90°. A gradual increase or decrease may be linear or non-linear (e.g., exponential, sinusoidal, etc.). Alternatively or in addition, the height difference may variably increase and/or decrease linearly or non-linearly.

Example 6

Figure 6A:
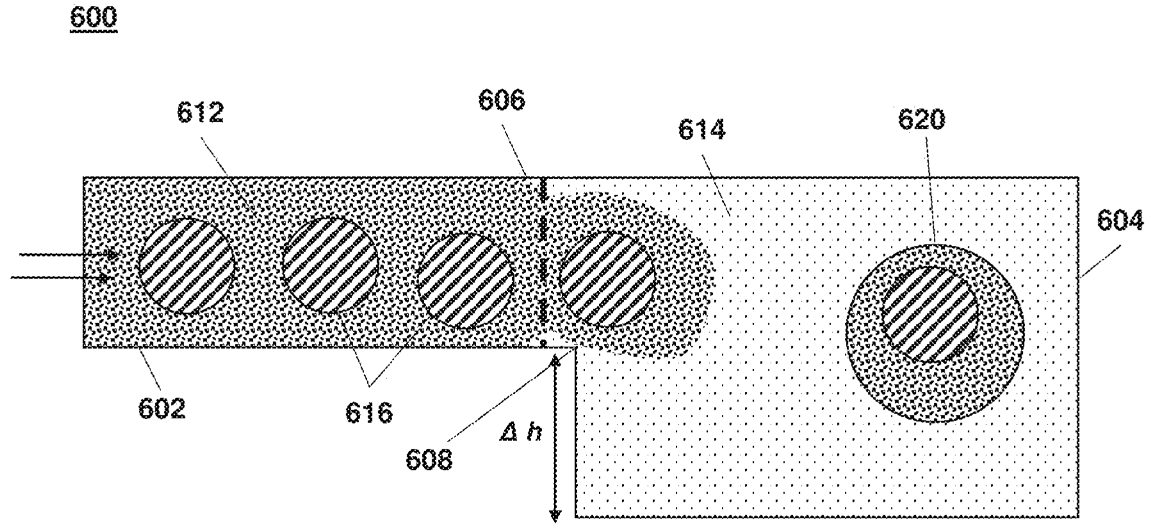
FIGS. 6A-6B show a cross-section view and a top view, respectively, of another example of a microfluidic device with a geometric feature for droplet formation.
Figure 6B:
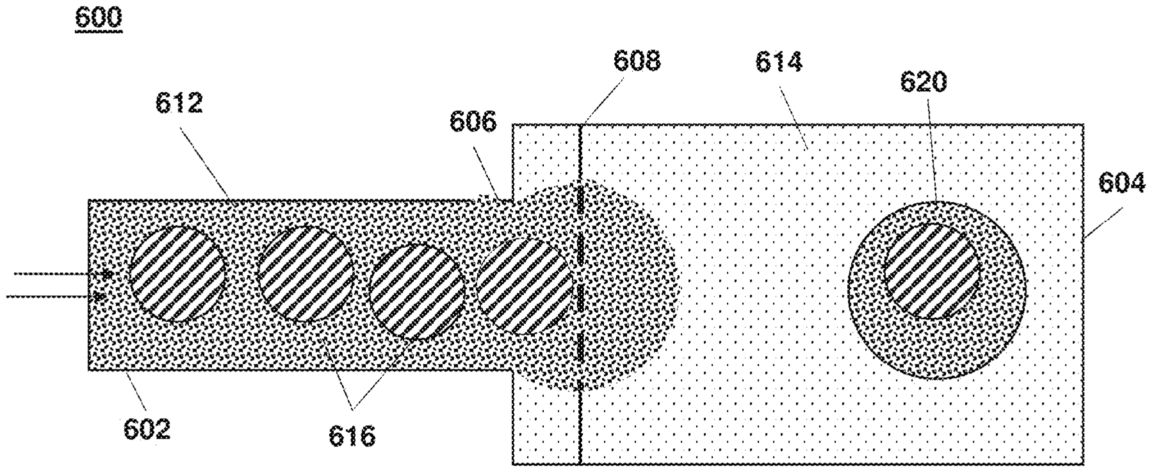

FIGS. 6A and 6B show a cross-section view and a top view, respectively, of another example of a microfluidic device with a geometric feature for droplet formation. A device 600 can include a channel 602 communicating at a fluidic connection 606 (or intersection) with a reservoir 604. In some instances, the device 600 and one or more of its components can correspond to the device 500 and one or more of its components.

An aqueous liquid 612 comprising a plurality of particles 616 may be transported along the channel 602 into the fluidic connection 606 to meet a second liquid 614 (e.g., oil, etc.) that is immiscible with the aqueous liquid 612 in the reservoir 604 to create droplets 620 of the aqueous liquid 612 flowing into the reservoir 604. At the fluidic connection 606 where the aqueous liquid 612 and the second liquid 614 meet, droplets can form based on factors such as the hydrodynamic forces at the fluidic connection 606, relative flow rates of the two liquids 612, 614, liquid properties, and certain geometric parameters (e.g., Δh, ledge, etc.) of the channel 602. A plurality of droplets can be collected in the reservoir 604 by continuously injecting the aqueous liquid 612 from the channel 602 at the fluidic connection 606.

The aqueous liquid may comprise particles. The particles 616 (e.g., beads) can be introduced into the channel 602 from a separate channel (not shown in FIG. 6). In some instances, the particles 616 can be introduced into the channel 602 from a plurality of different channels, and the frequency controlled accordingly. In some instances, different particles may be introduced via separate channels. For example, a first separate channel can introduce beads and a second separate channel can introduce biological particles into the channel 602. The first separate channel introducing the beads may be upstream or downstream of the second separate channel introducing the biological particles.

While FIGS. 6A and 6B illustrate one ledge (e.g., step) in the reservoir 604, as can be appreciated, there may be a plurality of ledges in the reservoir 604, for example, each having a different cross-section height. For example, where there is a plurality of ledges, the respective cross-section height can increase with each consecutive ledge. Alternatively, the respective cross-section height can decrease and/or increase in other patterns or profiles (e.g., increase then decrease then increase again, increase then increase then increase, etc.).

While FIGS. 6A and 6B illustrate the height difference, dh, being abrupt at the ledge 608 (e.g., a step increase), the height difference may increase gradually (e.g., from about 0 μm to a maximum height difference). In some instances, the height difference may decrease gradually (e.g., taper) from a maximum height difference. In some instances, the height difference may variably increase and/or decrease linearly or non-linearly. The same may apply to a height difference, if any, between the first cross-section and the second cross-section.

Example 7

Figure 7A:
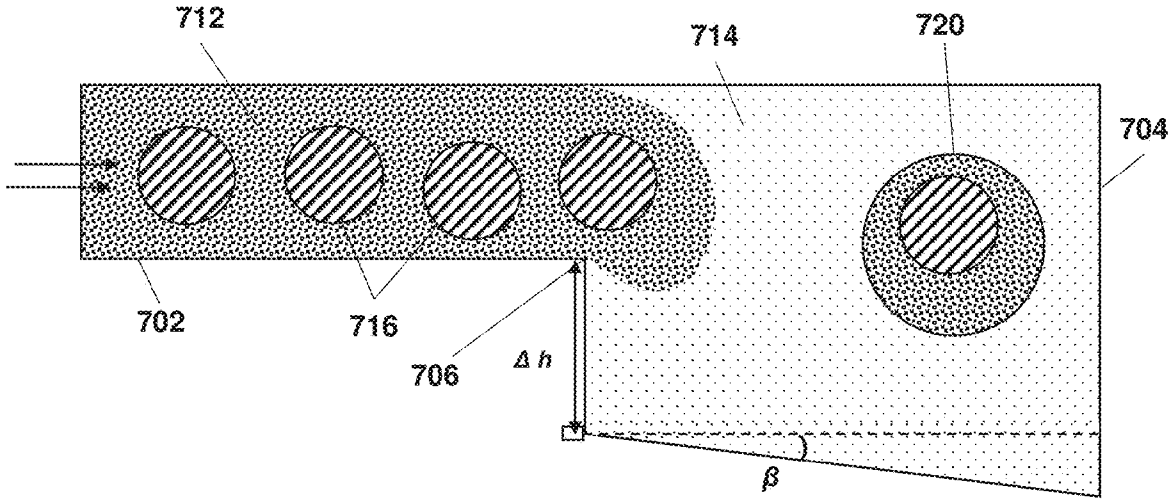
FIGS. 7A-7B show a cross-section view and a top view, respectively, of another example of a microfluidic device with a geometric feature for droplet formation.
Figure 7B:
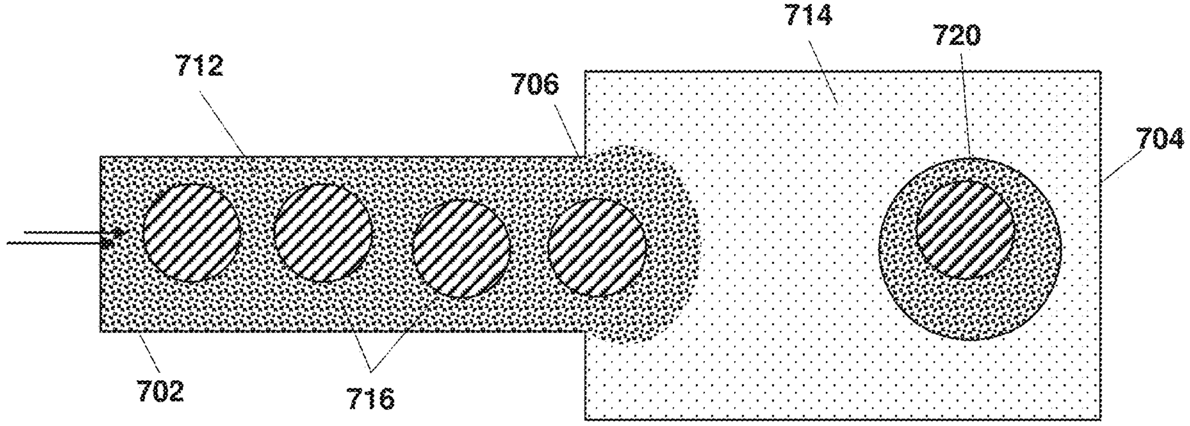

FIGS. 7A and 7B show a cross-section view and a top view, respectively, of another example of a microfluidic device with a geometric feature for droplet formation. A device 700 can include a channel 702 communicating at a fluidic connection 706 (or intersection) with a reservoir 704. In some instances, the device 700 and one or more of its components can correspond to the device 600 and one or more of its components.

An aqueous liquid 712 comprising a plurality of particles 716 may be transported along the channel 702 into the fluidic connection 706 to meet a second liquid 714 (e.g., oil, etc.) that is immiscible with the aqueous liquid 712 in the reservoir 704 to create droplets 720 of the aqueous liquid 712 flowing into the reservoir 704. At the fluidic connection 706 where the aqueous liquid 712 and the second liquid 714 meet, droplets can form based on factors such as the hydrodynamic forces at the fluidic connection 706, relative flow rates of the two liquids 712, 714, liquid properties, and certain geometric parameters (e.g., Δh, etc.) of the device 700. A plurality of droplets can be collected in the reservoir 704 by continuously injecting the aqueous liquid 712 from the channel 702 at the fluidic connection 706.

In some instances, the second liquid 714 may not be subjected to and/or directed to any flow in or out of the reservoir 704. For example, the second liquid 714 may be substantially stationary in the reservoir 704. In some instances, the second liquid 714 may be subjected to flow within the reservoir 704, but not in or out of the reservoir 704, such as via application of pressure to the reservoir 704 and/or as affected by the incoming flow of the aqueous liquid 712 at the fluidic connection 706. Alternatively, the second liquid 714 may be subjected and/or directed to flow in or out of the reservoir 704. For example, the reservoir 704 can be a channel directing the second liquid 714 from upstream to downstream, transporting the generated droplets. Alternatively or in addition, the second liquid 714 in reservoir 704 may be used to sweep formed droplets away from the path of the nascent droplets.

The device 700 at or near the fluidic connection 706 may have certain geometric features that at least partly determine the sizes and/or shapes of the droplets formed by the device 700. The channel 702 can have a first cross-section height, $h_1$, and the reservoir 704 can have a second cross-section height, $h_2$. The first cross-section height, $h_1$, may be different from the second cross-section height $h_2$ such that at or near the fluidic connection 706, there is a height difference of Δh. The second cross-section height, $h_2$, may be greater than the first cross-section height, $h_1$. The reservoir may thereafter gradually increase in cross-section height, for example, the more distant it is from the fluidic connection 706. In some instances, the cross-section height of the reservoir may increase in accordance with expansion angle, β, at or near the fluidic connection 706. The height difference, Δh, and/or expansion angle, β, can allow the tongue (portion of the aqueous liquid 712 leaving channel 702 at fluidic connection 706 and entering the reservoir 704 before droplet formation) to increase in depth and facilitate decrease in curvature of the intermediately formed droplet. For example, droplet size may decrease with increasing height difference and/or increasing expansion angle.

While FIGS. 7A and 7B illustrate the height difference, Δh, being abrupt at the fluidic connection 706, the height difference may increase gradually (e.g., from about 0 μm to a maximum height difference). In some instances, the height difference may decrease gradually (e.g., taper) from a maximum height difference. In some instances, the height difference may variably increase and/or decrease linearly or non-linearly. While FIGS. 7A and 7B illustrate the expanding reservoir cross-section height as linear (e.g., constant expansion angle, β), the cross-section height may expand non-linearly. For example, the reservoir may be defined at least partially by a dome-like (e.g., hemispherical) shape having variable expansion angles. The cross-section height may expand in any shape.

Example 8

Figure 8A:
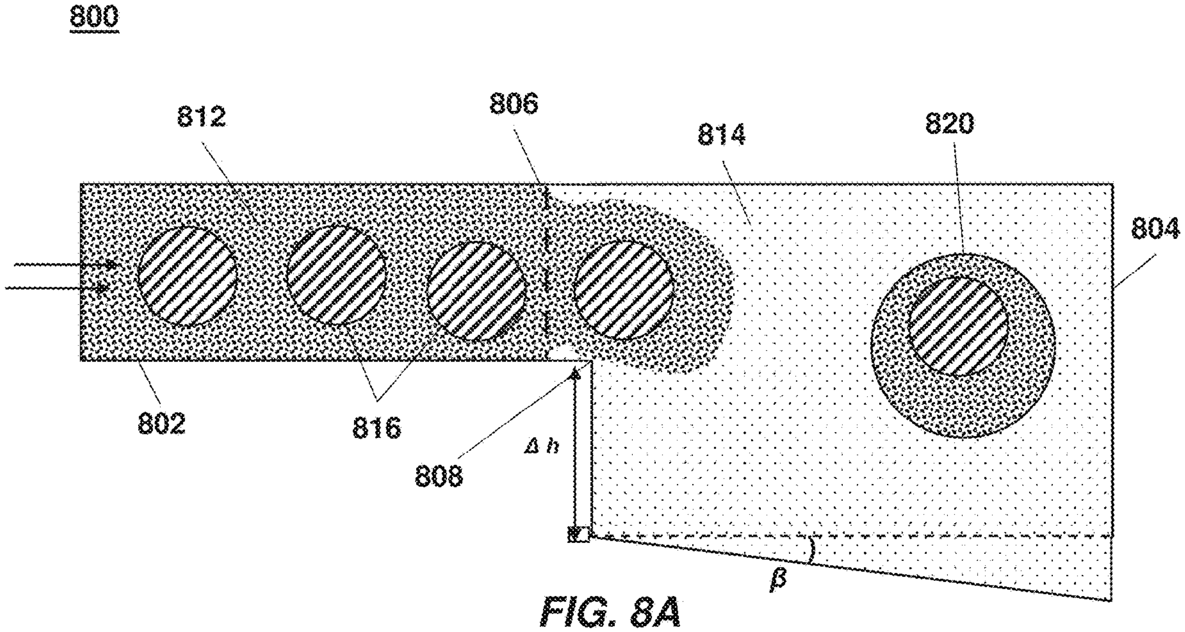
FIGS. 8A-8B show a cross-section view and a top view, respectively, of another example of a microfluidic device with a geometric feature for droplet formation.
Figure 8B:
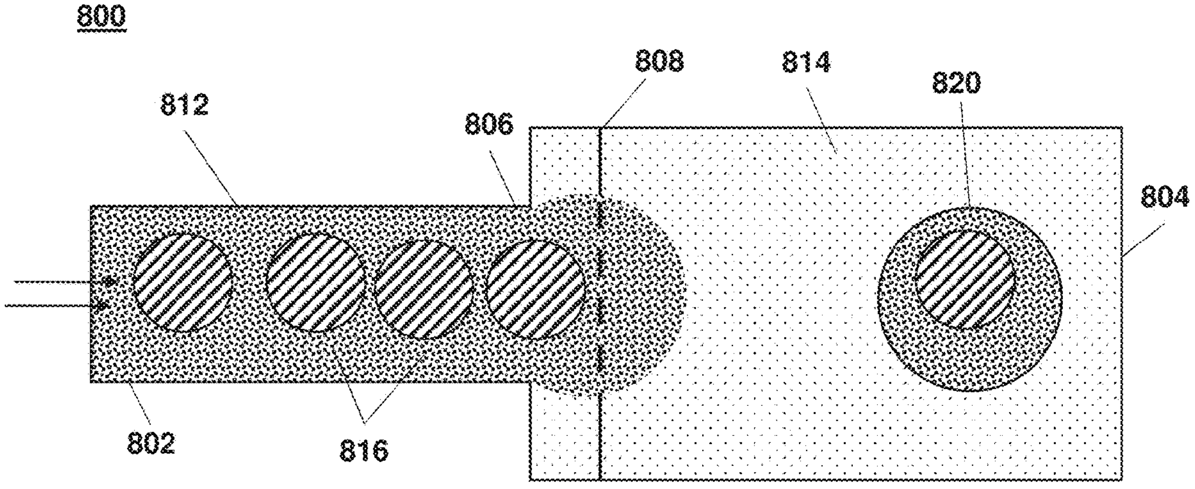

FIGS. 8A and 8B show a cross-section view and a top view, respectively, of another example of a microfluidic device with a geometric feature for droplet formation. A device 800 can include a channel 802 communicating at a fluidic connection 806 (or intersection) with a reservoir 804. In some instances, the device 800 and one or more of its components can correspond to the device 700 and one or more of its components and/or correspond to the device 600 and one or more of its components.

An aqueous liquid 812 comprising a plurality of particles 816 may be transported along the channel 802 into the fluidic connection 806 to meet a second liquid 814 (e.g., oil, etc.) that is immiscible with the aqueous liquid 812 in the reservoir 804 to create droplets 820 of the aqueous liquid 812 flowing into the reservoir 804. At the fluidic connection 806 where the aqueous liquid 812 and the second liquid 814 meet, droplets can form based on factors such as the hydrodynamic forces at the fluidic connection 806, relative flow rates of the two liquids 812, 814, liquid properties, and certain geometric parameters (e.g., Δh, etc.) of the device 800. A plurality of droplets can be collected in the reservoir 804 by continuously injecting the aqueous liquid 812 from the channel 802 at the fluidic connection 806.

A discrete droplet generated may comprise one or more particles of the plurality of particles 816. As described elsewhere herein, a particle may be any particle, such as a bead, cell bead, gel bead, biological particle, macromolecular constituents of biological particle, or other particles. Alternatively, a discrete droplet generated may not include any particles.

In some instances, the second liquid 814 may not be subjected to and/or directed to any flow in or out of the reservoir 804. For example, the second liquid 814 may be substantially stationary in the reservoir 804. In some instances, the second liquid 814 may be subjected to flow within the reservoir 804, but not in or out of the reservoir 804, such as via application of pressure to the reservoir 804 and/or as affected by the incoming flow of the aqueous liquid 812 at the fluidic connection 806. Alternatively, the second liquid 814 may be subjected and/or directed to flow in or out of the reservoir 804. For example, the reservoir 804 can be a channel directing the second liquid 814 from upstream to downstream, transporting the generated droplets. Alternatively or in addition, the second liquid 814 in reservoir 804 may be used to sweep formed droplets away from the path of the nascent droplets.

While FIGS. 8A and 8B illustrate one ledge (e.g., step) in the reservoir 804, as can be appreciated, there may be a plurality of ledges in the reservoir 804, for example, each having a different cross-section height. For example, where there is a plurality of ledges, the respective cross-section height can increase with each consecutive ledge. Alternatively, the respective cross-section height can decrease and/or increase in other patterns or profiles (e.g., increase then decrease then increase again, increase then increase then increase, etc.).

While FIGS. 8A and 8B illustrate the height difference, dh, being abrupt at the ledge 808, the height difference may increase gradually (e.g., from about 0 μm to a maximum height difference). In some instances, the height difference may decrease gradually (e.g., taper) from a maximum height difference. In some instances, the height difference may variably increase and/or decrease linearly or non-linearly. While FIGS. 8A and 8B illustrate the expanding reservoir cross-section height as linear (e.g., constant expansion angle), the cross-section height may expand non-linearly. For example, the reservoir may be defined at least partially by a dome-like (e.g., hemispherical) shape having variable expansion angles. The cross-section height may expand in any shape.

Example 9

Figure 9A:
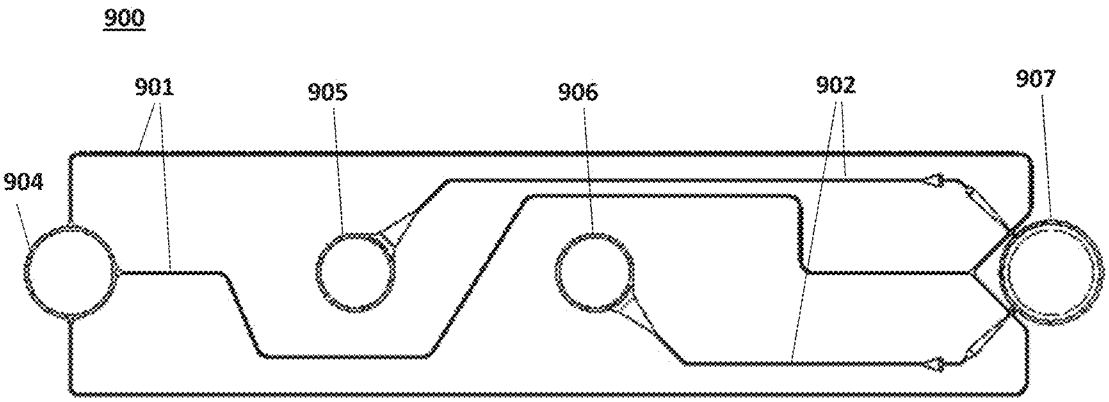
FIGS. 9A-9B are views of another device of the invention.
Figure 9B:
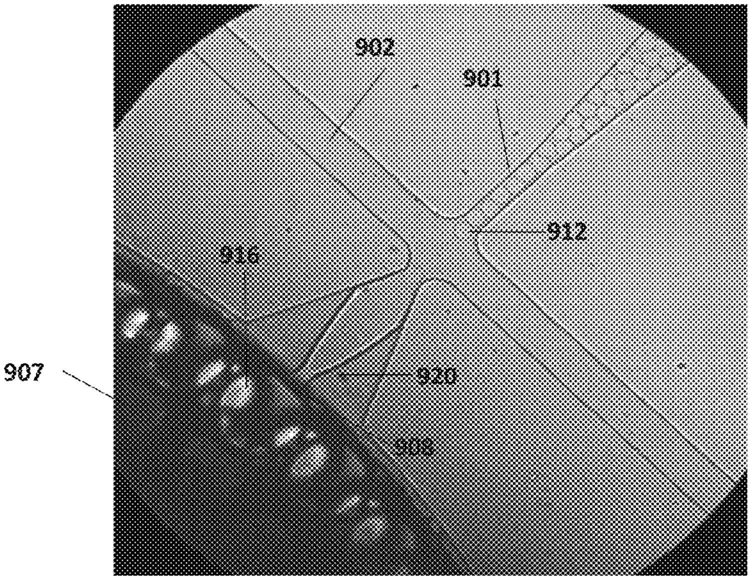

An example of a device according to the invention is shown in FIGS. 9A-9B. The device 900 includes four fluid reservoirs, 904, 905, 906, and 907, respectively. Reservoir 904 houses one liquid; reservoirs 905 and 906 house another liquid, and reservoir 907 houses continuous phase in the step region 908. This device 900 include two first channels 902 connected to reservoir 905 and reservoir 906 and connected to a shelf region 920 adjacent a step region 908. As shown, multiple channels 901 from reservoir 904 deliver additional liquid to the first channels 902. The liquids from reservoir 904 and reservoir 905 or 906 combine in the first channel 902 forming the first liquid that is dispersed into the continuous phase as droplets. In certain embodiments, the liquid in reservoir 905 and/or reservoir 906 includes a particle, such as a gel bead. FIG. 9B shows a view of the first channel 902 containing gel beads 912 intersected by a second channel 901 adjacent to a shelf region 920 leading to a step region 908, which contains multiple droplets 916.

Example 10

Figure 10A:
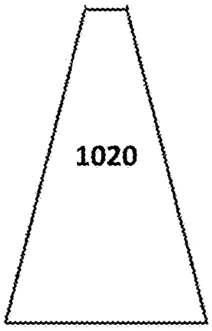
FIGS. 10A-10E are views of droplet formation regions including shelf regions.
Figure 10B:
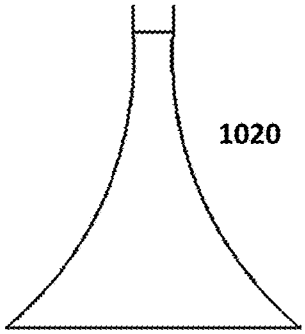
Figure 10C:
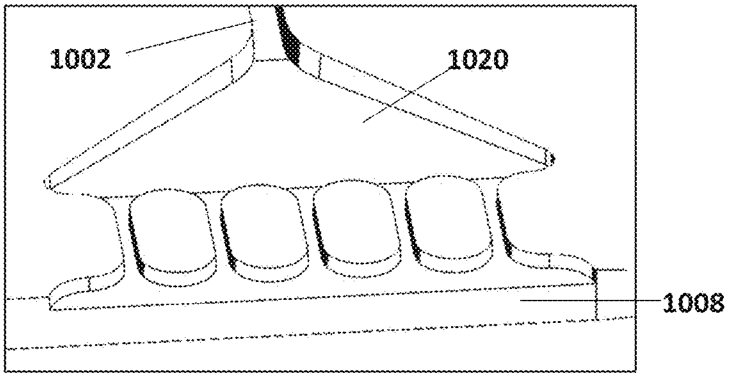
Figure 10D:
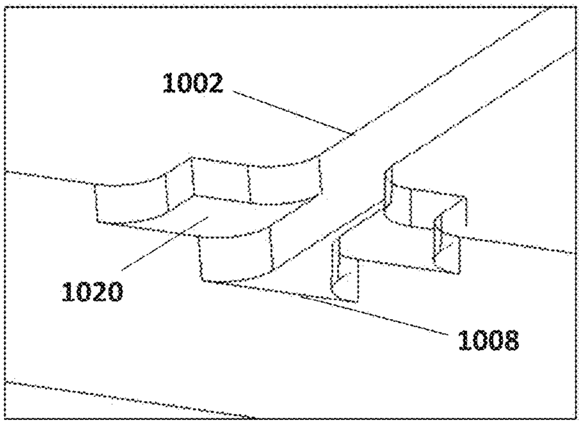
Figure 10E:
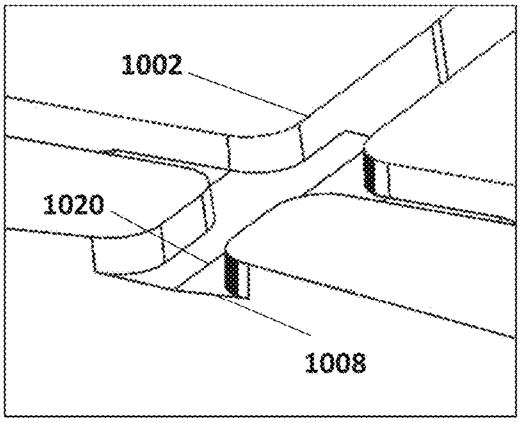
Figure 11A:
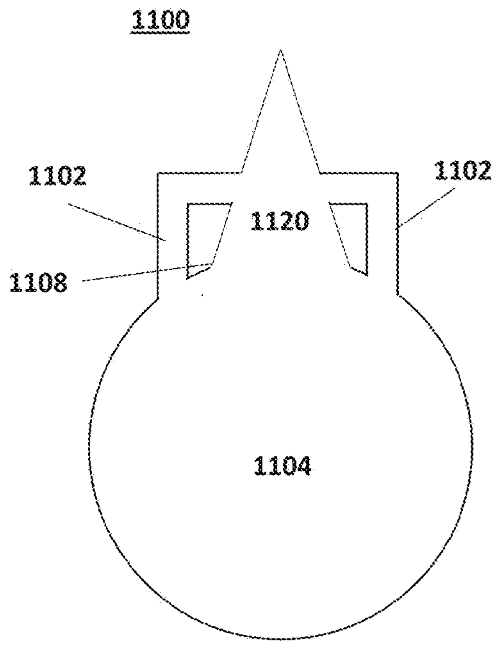
FIGS. 11A-11D are views of droplet formation regions including shelf regions including additional channels to deliver continuous phase.
Figure 11B:
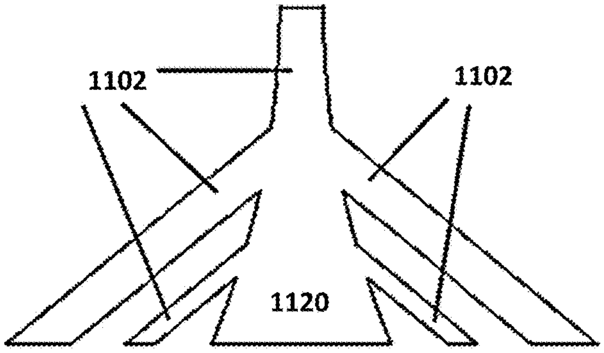
Figure 11C:
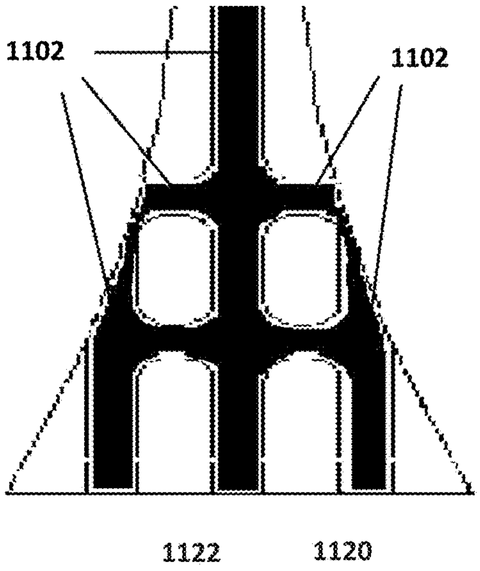
Figure 11D:
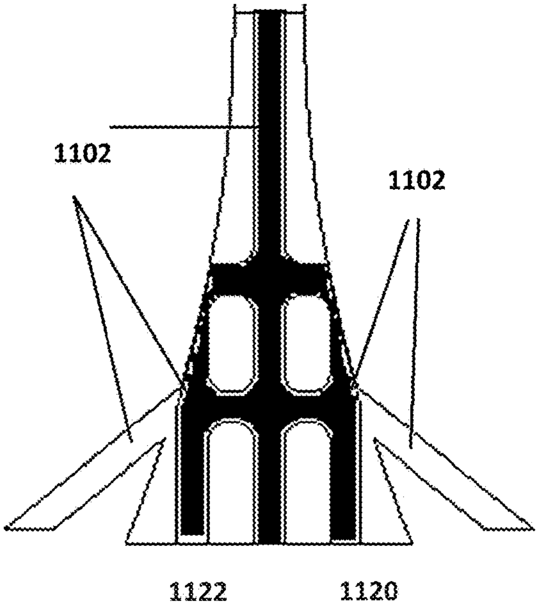

Variations on shelf regions 1020 are shown in FIGS. 10A-10E. As shown in FIGS. 10A-10B, the width of the shelf region 1020 can increase from the distal end of a first channel 1002 towards the step region 1008, linearly as in 10A or non-linearly as in 10B. As shown in FIG. 10C, multiple first channels 1002 can branch from a single feed channel 1002 and introduce fluid into interconnected shelf regions 1020. As shown in FIG. 10D, the depth of the first channel 1002 may be greater than the depth of the shelf region 1020 and cut a path through the shelf region 1020. As shown in FIG. 10E, the first channel 1002 and shelf region 1020 may contain a grooved bottom surface. This device 1000 also includes a second channel 1002 that intersects the first channel 1002 proximal to its distal end.

Example 11

Continuous phase delivery channels 1102, shown in FIGS. 11A-11D, are variations on shelf regions 1120 including channels 1102 for delivery (passive or active) of continuous phase behind a nascent droplet. In one example in FIG. 11A, the device 1100 includes two channels 1102 that connect the reservoir 1104 of the step region 1108 to either side of the shelf region 1120. In another example in FIG. 11B, four channels 1102 provide continuous phase to the shelf region 1120. These channels 1102 can be connected to the reservoir 1104 of the step region 1108 or to a separate source of continuous phase. In a further example in FIG. 11C, the shelf region 1120 includes one or more channels 1102 (white) below the depth of the first channel 1102 (black) that connect to the reservoir 1104 of the step region 1108. The shelf region 1120 contains islands 1122 in black. In another example FIG. 11D, the shelf region 1120 of FIG. 11C includes two additional channels 1102 for delivery of continuous phase on either side of the shelf region 1120.

Example 12

Figure 12:
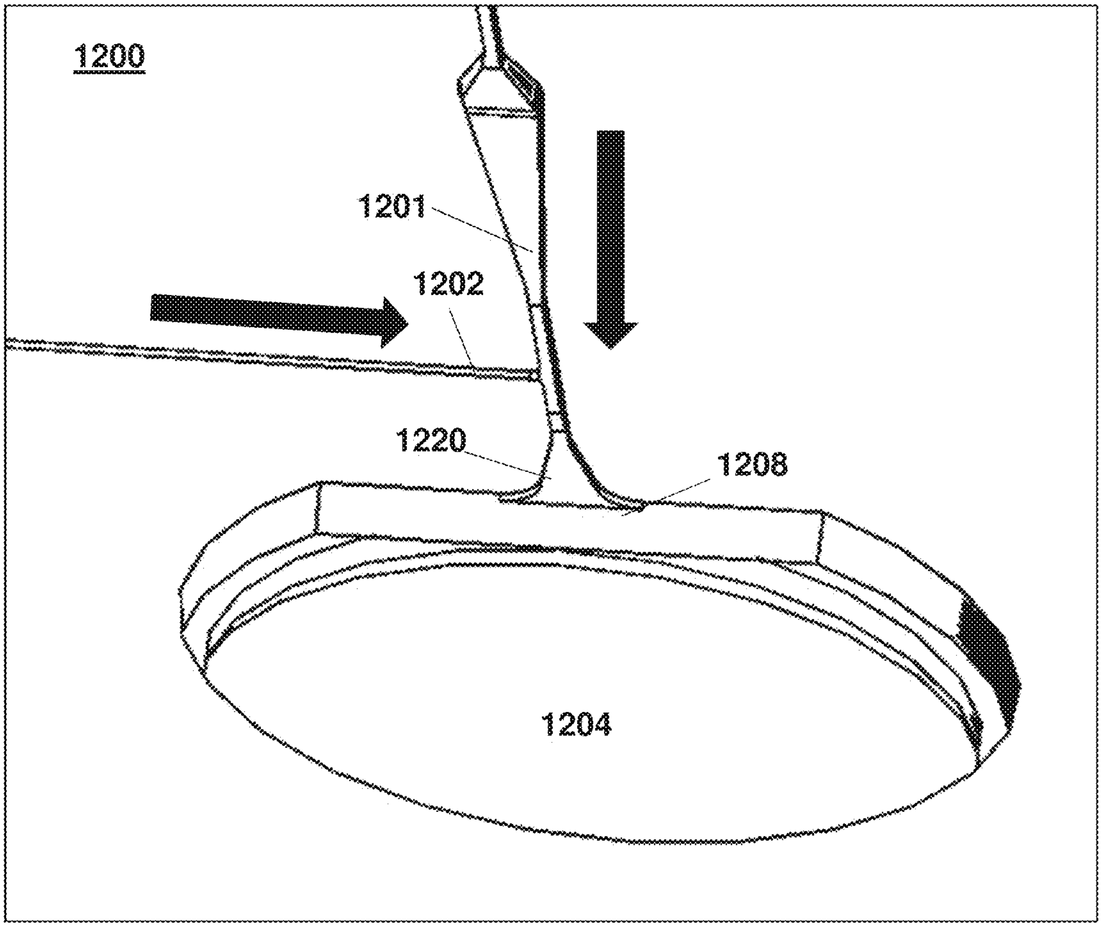
FIG. 12 is another device according to the invention having a pair of intersecting channels that lead to a droplet formation region and collection reservoir.

An embodiment of a device according to the invention is shown in FIG. 12. This device 1200 includes two channels 1201, 1202 that intersect upstream of a droplet formation region. The droplet formation region includes both a shelf region 1220 and a step region 1208 disposed between the distal end of the first channel 1201 and the step region 1208 that lead to a collection reservoir 1204. The black and white arrows show the flow of liquids through each of first channel 1201 and second channel 1202, respectively. In certain embodiments, the liquid flowing through the first channel 1201 or second channel 1202 includes a particle, such as a gel bead. As shown in the FIG. 12, the width of the shelf region 1220 can increase from the distal end of a first channel 1201 towards the step region 1208; in particular, the width of the shelf region 1220 in FIG. 12 increases non-linearly. In this embodiment, the shelf region extends from the edge of a reservoir to allow droplet formation away from the edge. Such a geometry allows droplets to move away from the droplet formation region due to differential density between the continuous and dispersed phase.

Example 13

Figure 13A:
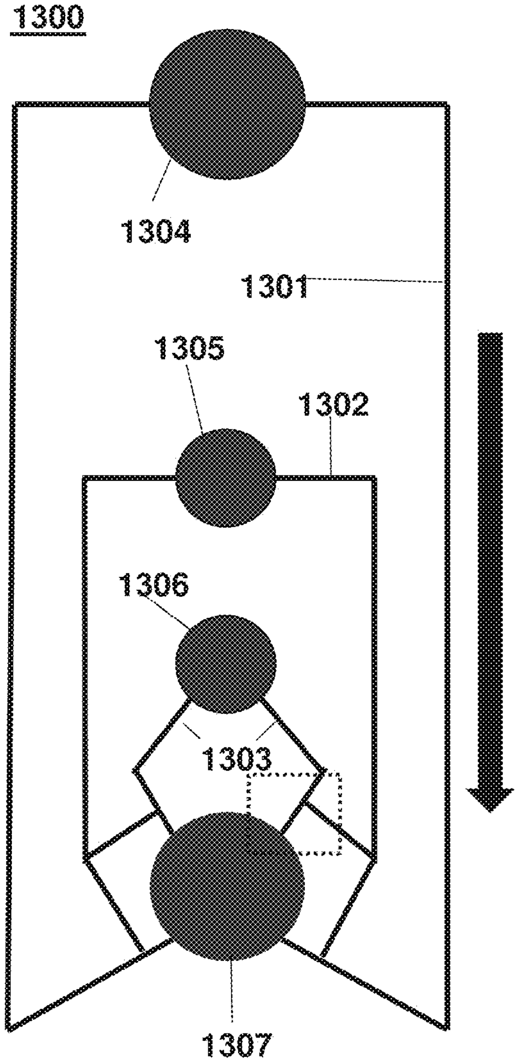
FIGS. 13A-13B are views of a device of the invention.
Figure 13B:
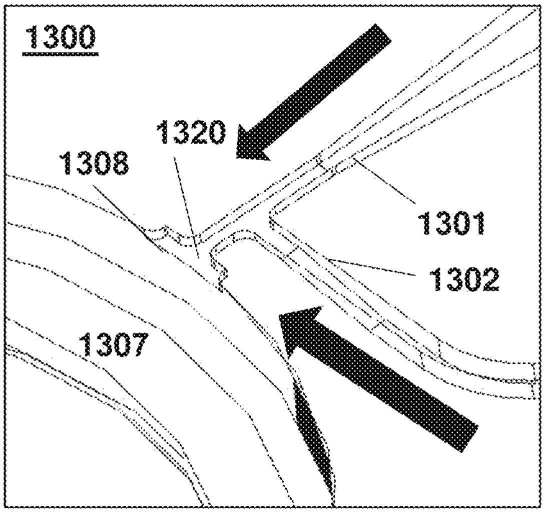

An embodiment of a device according to the invention for multiplexed droplet formation is shown in FIGS. 13A-13B.

This device 1300 includes four fluid reservoirs, 1304, 1305, 1306, and 1307, and the overall direction of flow within the device 1300 is shown by the black arrow in FIG. 13A. Reservoir 1304 and reservoir 1306 house one liquid; reservoir 1305 houses another liquid, and reservoir 1307 houses continuous phase and is a collection reservoir. Fluid channels 1301, 1303 directly connect reservoir 1304 and reservoir 1306, respectively, to reservoir 1307; thus, there are four droplet formation region in this device 1300. Each droplet formation region has a shelf region 1320 and a step region 1308. This device 1300 further has two channels 1302 from the reservoir 1305 where each of these channels splits into two separate channels at their distal ends. Each of the branches of the split channel intersects the first channels 1301 or 1303 upstream of their connection to the collection reservoir 1307. As shown in the zoomed in view of the dotted line box in FIG. 13B, second channel 1302, with its flow indicated by the white arrow, has its distal end intersecting a channel 1303 from reservoir 1305, with the flow of the channel indicated by the black arrow, upstream of the droplet formation region. The liquid from reservoir 1304 and reservoir 1306, separately, are introduced into channels 1301, 1303 and flow towards the collection reservoir 1307. The liquid from the second reservoir 1305 combines with the fluid from reservoir 1304 or reservoir 1306, and the combined fluid is dispersed into the droplet formation region and to the continuous phase. In certain embodiments, the liquid flowing through the first channel 1301 or 1303 or second channel 1302 includes a particle, such as a gel bead.

Example 14

Figure 14A:
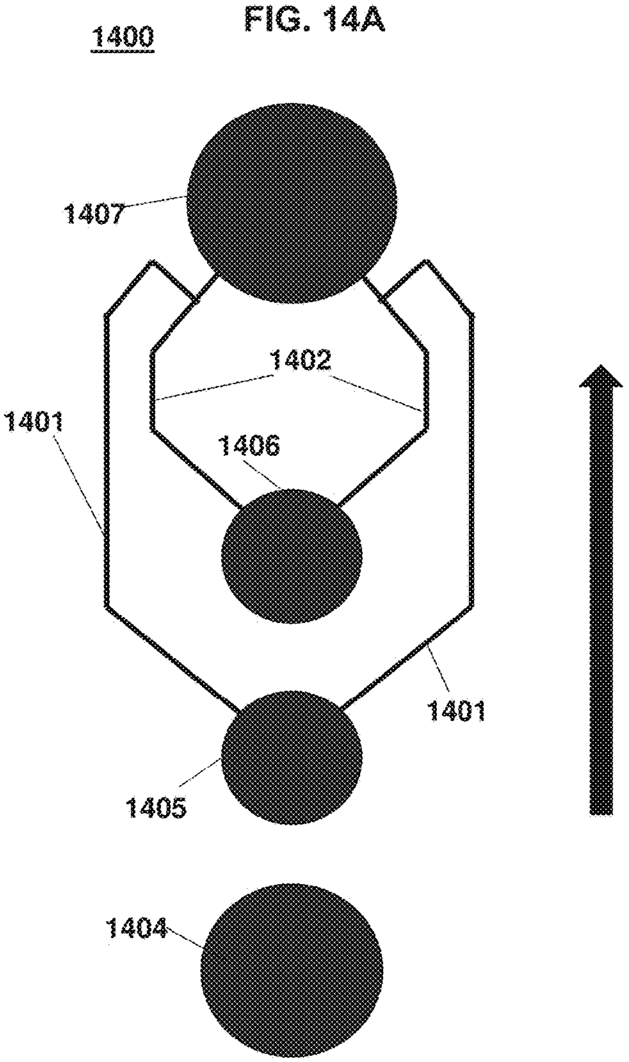
FIGS. 14A-14B are views of devices according to the invention.
Figure 14B:
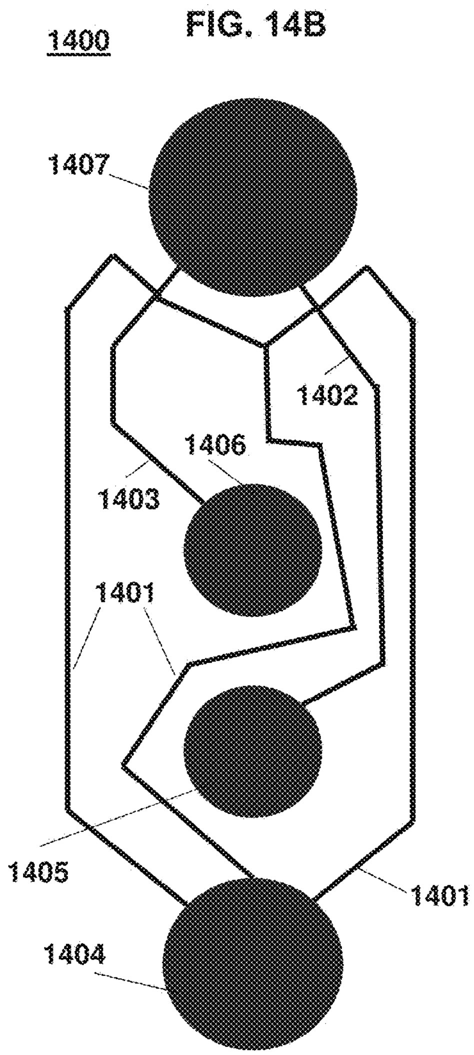

Examples of devices according to the invention that include two droplet formation regions are shown in FIGS. 14A-14B. The device 1400 of FIG. 14A includes three reservoirs, 1405, 1406, and 1407, and the device 1400 of FIG. 14B includes four reservoirs, 1404, 1405, 1406, and 1407. For the device 1400 of FIG. 14A, reservoir 1405 houses a portion of the first fluid, reservoir 1406 houses a different portion of the first fluid, and reservoir 1407 houses continuous phase and is a collection reservoir. In the device 1400 of FIG. 14B, reservoir 1404 houses a portion of the first fluid, reservoir 1405 and reservoir 1406 house different portions of the first fluid, and reservoir 1407 houses continuous phase and is a collection reservoir. In both devices 1400, there are two droplet formation regions. For the device 1400 of FIG. 14A, the connections to the collection reservoir 1407 are from the reservoir 1406, and the distal ends of the channels 1401 from reservoir 1405 intersect the channels 1402 from reservoir 1406 upstream of the droplet formation region. The liquids from reservoir 1405 and reservoir 1406 combine in the channels 1402 from reservoir 1406, forming the first liquid that is dispersed into the continuous phase in the collection reservoir 1407 as droplets. In certain embodiments, the liquid in reservoir 1405 and/or reservoir 1406 includes a particle, such as a gel bead.

In the device 1400 of FIG. 14B, each of reservoir 1405 and reservoir 1406 are connected to the collection reservoir 1407. Reservoir 1404 has three channels 1401, two of which have distal ends that intersect each of the channels 1402, 1403 from reservoir 1404 and reservoir 1406, respectively, upstream of the droplet formation region. The third channel 1401 from reservoir 1404 splits into two separate distal ends, with one end intersecting the channel 1402 from reservoir 1405 and the other distal end intersecting the channel 1403 from reservoir 1406, both upstream of droplet formation regions. The liquid from reservoir 1404 combines with the liquids from reservoir 1405 and reservoir 1406 in the channels 1402 from reservoir 1405 and reservoir 1406, forming the first liquid that is dispersed into the continuous phase in the collection reservoir 1407 as droplets. In certain embodiments, the liquid in reservoir 1404, reservoir 1405, and/or reservoir 1406 includes a particle, such as a gel bead.

Example 15

Figure 15:
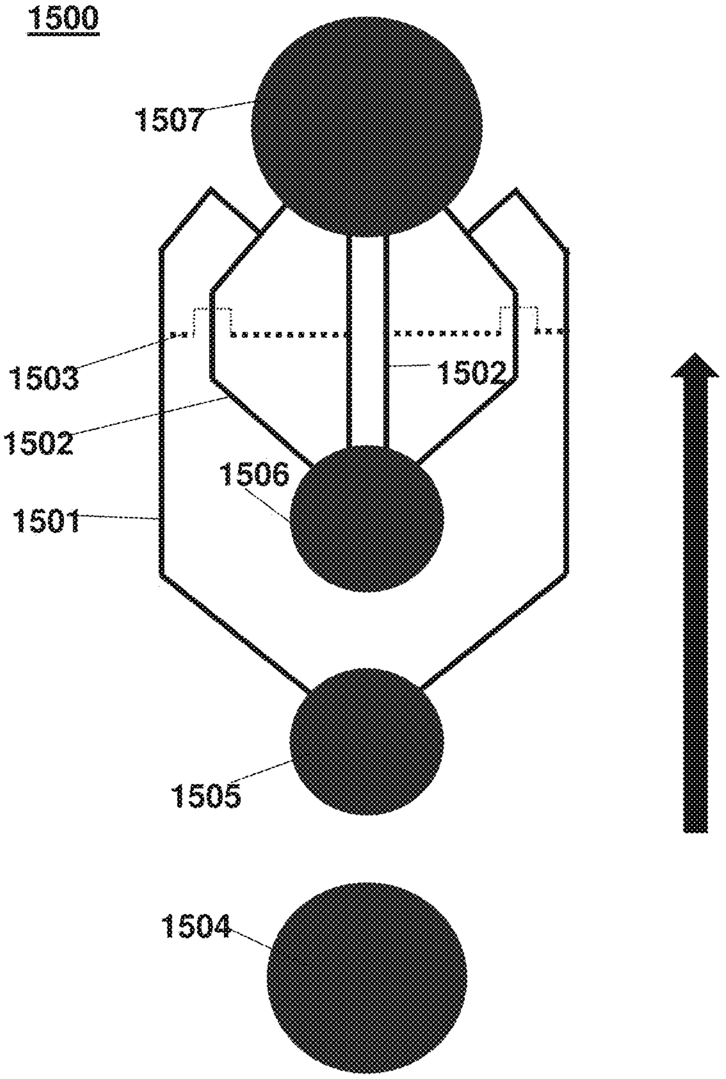
FIG. 15 is a view of a device according to the invention with four reservoirs.

An embodiment of a device according to the invention that has four droplet formation regions is shown in FIG. 15. The device 1500 of FIG. 15 includes four reservoirs, 1504, 1505, 1506, and 1507; the reservoir labeled 1504 is unused in this embodiment. In the device 1500 of FIG. 15, reservoir 1505 houses a portion of the first fluid, reservoir 1506 houses a different portion of the first fluid, and reservoir 1507 houses continuous phase and is a collection reservoir. Reservoir 1506 has four channels 1502 that connect to the collection reservoir 1507 at four droplet formation regions. The channels 1502 from originating at reservoir 1506 include two outer channels 1502 and two inner channels 1502. Reservoir 1505 has two channels 1501 that intersect the two outer channels 1502 from reservoir 1506 upstream of the droplet formation regions. Channels 1501 and the inner channels 1502 are connected by two channels 1503 that traverse, but do not intersect, the fluid paths of the two outer channels 1502. These connecting channels 1503 from channels 1501 pass over the outer channels 1502 and intersect the inner channels 1502 upstream of the droplet formation regions. The liquids from reservoir 1505 and reservoir 1506 combine in the channels 1502, forming the first liquid that is dispersed into the continuous phase in the collection reservoir 1507 as droplets. In certain embodiments, the liquid in reservoir 1505 and/or reservoir 1506 includes a particle, such as a gel bead.

Example 16

An embodiment of a device according to the invention that has a plurality of droplet formation regions is shown in FIGS. 16A-16B (FIG. 16B is a zoomed in view of FIG. 16A), with the droplet formation region including a shelf region 1620 and a step region 1608. This device 1600 includes two channels 1601, 1602 that meet at the shelf region 1620. As shown, after the two channels 1601, 1602 meet at the shelf region 1620, the combination of liquids is divided, in this example, by four shelf regions. In certain embodiments, the liquid with flow indicated by the black arrow includes a particle, such as a gel bead, and the liquid flow from the other channel, indicated by the white arrow, can move the particles into the shelf regions such that each particle can be introduced into a droplet.

Example 17

Figure 17A:
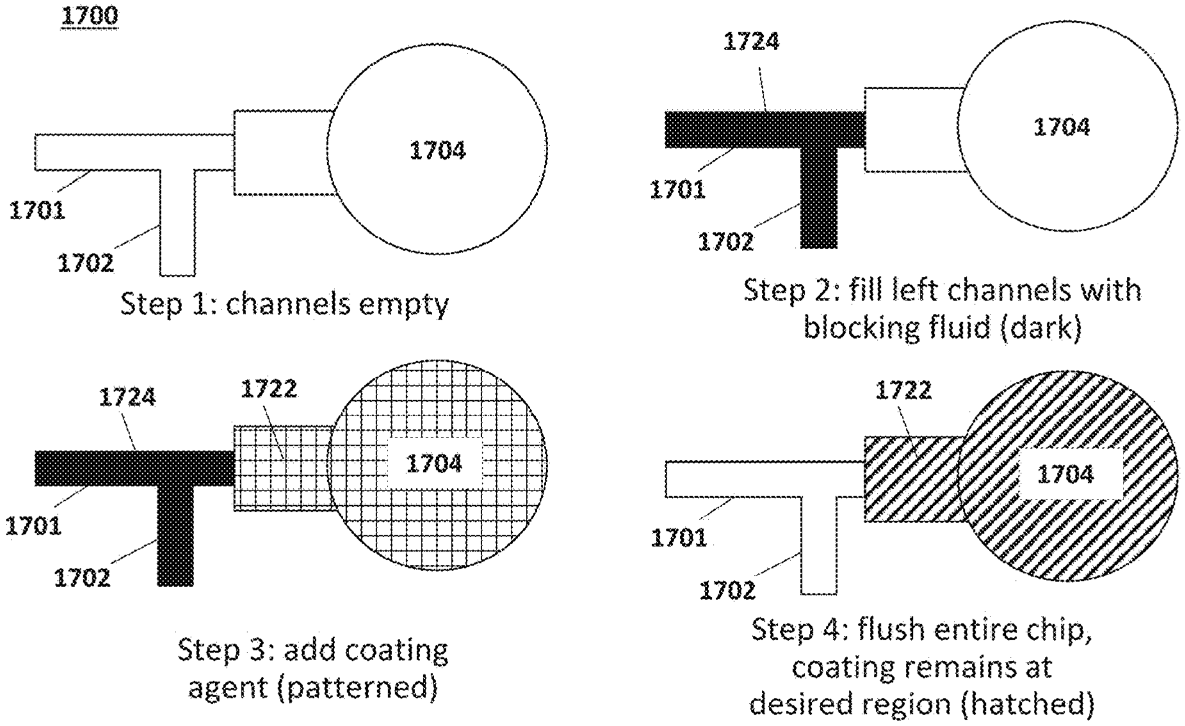
FIGS. 17A-17B are schematic representations of a method according to the invention for applying a differential coating to a surface of a device of the invention.
Figure 17B:
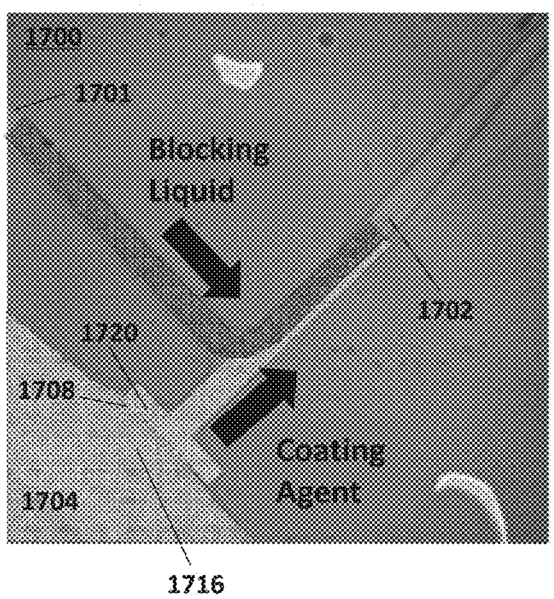

An embodiment of a method of modifying the surface of a device using a coating agent is shown in FIGS. 17A-17B. In this example, the surface of the droplet formation region of the device 1700, e.g., the rectangular area connected to the circular shaped collection reservoir 1704, is coated with a coating agent 1722 to modify its surface properties. To localize the coating agent to only the regions of interest, the first channel 1701 and second channel 1702 of the device 1700 are filled with a blocking liquid 1724 (Step 2 of FIG. 17A) such that the coating agent 1722 cannot contact the channels 1701, 1702. The device 1700 is then filled with the coating agent 1722 to fill the droplet formation region and the collection reservoir 1704 (Step 3 of FIG. 17A). After the coating process is complete, the device 1700 is flushed (Step 4 of FIG. 17A) to remove both the blocking liquid 1724 from the channels and the coating agent 1722 from the droplet formation region and the collection reservoir 1704. This leaves behind a layer of the coating agent 1722 only in the regions where it is desired. This is further exemplified in the micrograph of FIG. 17B, the blocking liquid (dark gray) fills the first channel 1701 and second channel 1702, preventing ingress of the coating agent 1722 (white) into either the first channel 1701 or the second channel 1702 while completely coating the droplet formation region and the collection reservoir 1704. In this example, the first channel 1701 is also acting as a feed channel for the blocking liquid 1724, shown by the arrow for flow direction in FIG. 17B.

Example 18

Figure 18A:
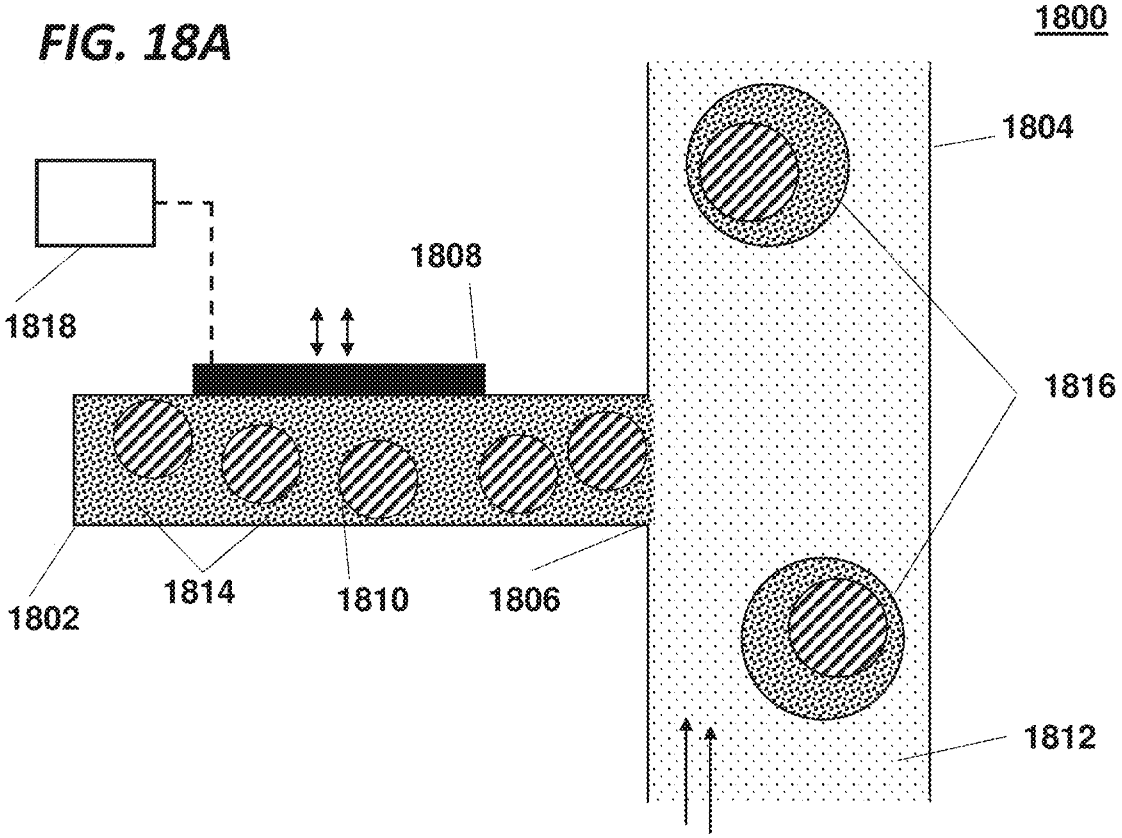
FIGS. 18A-18B are cross-sectional views of a microfluidic device including a piezoelectric element for droplet formation.
Figure 18B:
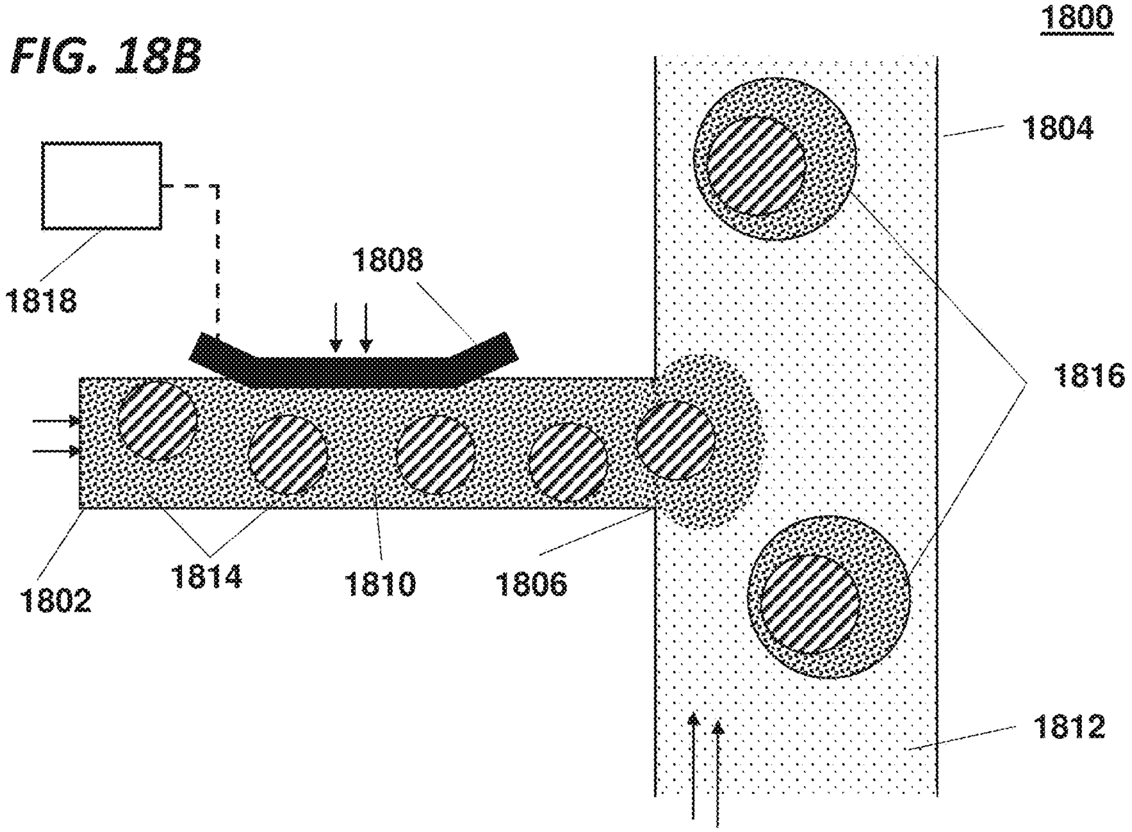

FIGS. 18A-18B show an embodiment of a device according to the invention that includes a piezoelectric element for droplet formation. A device 1800 includes a first channel 1802, a second channel 1804, and a piezoelectric element 1808. The first channel 1802 and the second channel 1804 are in fluid communication at a channel junction 1806. In some instances, the first channel 1802 and components thereof can correspond to the channel 102 in the device 100 in FIG. 1 and components thereof.

In this example, the first channel 1802 carries a first fluid 1810 (e.g., aqueous) and the second channel 1804 can carries second fluid 1812 (e.g., oil) that is immiscible with the first fluid 1810. The two fluids 1810, 1812 come in contact with one another at the junction 1806. In some instances, the first fluid 1810 in the first channel 1802 includes suspended particles 1814. The particles 1814 may be beads, biological particles, cells, cell beads, or any combination thereof (e.g., a combination of beads and cells or a combination of beads and cell beads, etc.). The piezoelectric element 1808 is operatively coupled to the first channel 1802 such that at least part of the first channel 1802 is capable of moving or deforming in response to movement of the piezoelectric element 1808. In some instances, the piezoelectric element 1808 is part of the first channel 1802, such as one or more walls of the first channel 1802. The piezoelectric element 1808 can be a piezoelectric plate. The piezoelectric element 1808 is responsive to electrical signals received from the controller 1818 and moves between at least a first state (as in FIG. 18A) and a second state (as in FIG. 18B). In the first state, the first fluid 1810 and the second fluid 1812 remain separated at or near the junction 1806 via an immiscible barrier. In the second state, the first fluid 1810 is directed towards the junction 1806 into the second fluid 1812 to create droplets 1816.

In some instances, the piezoelectric element 1808 is in the first state (shown in FIG. 18A) when no electrical charge, e.g., electric voltage, is applied. The first state can be an equilibrium state. When an electrical charge is applied to the piezoelectric element 1808, the piezoelectric element 1808 may bend backwards (not shown in FIG. 18A or 18B), pulling a part of the first channel 1802 outwards and drawing in more of the first fluid 1810 into the first channel 1802 such as from a reservoir of the first fluid 1810. When the electrical charge is altered, the piezoelectric element may bend in the other direction (e.g., inwards towards the contents of the channel 1802) (shown in FIG. 18B) pushing a part of the first channel 1802 inwards and propelling (e.g., at least partly via displacement) a volume of the first fluid 1810 into the second channel 1804, thereby generating a droplet of the first fluid 1810 in the second fluid 1812. After the droplet is propelled, the piezoelectric element 1808 may return to the first state (shown in FIG. 18A). The cycle can be repeated to generate more droplets. In some instances, each cycle may generate a plurality of droplets (e.g., a volume of the first fluid 1810 propelled breaks off as it enters the second fluid 1812 to form a plurality of discrete droplets). A plurality of droplets 1816 can be collected in the second channel 1804 for continued transportation to a different location (e.g., reservoir), direct harvesting, and/or storage.

Example 19

Figure 19:
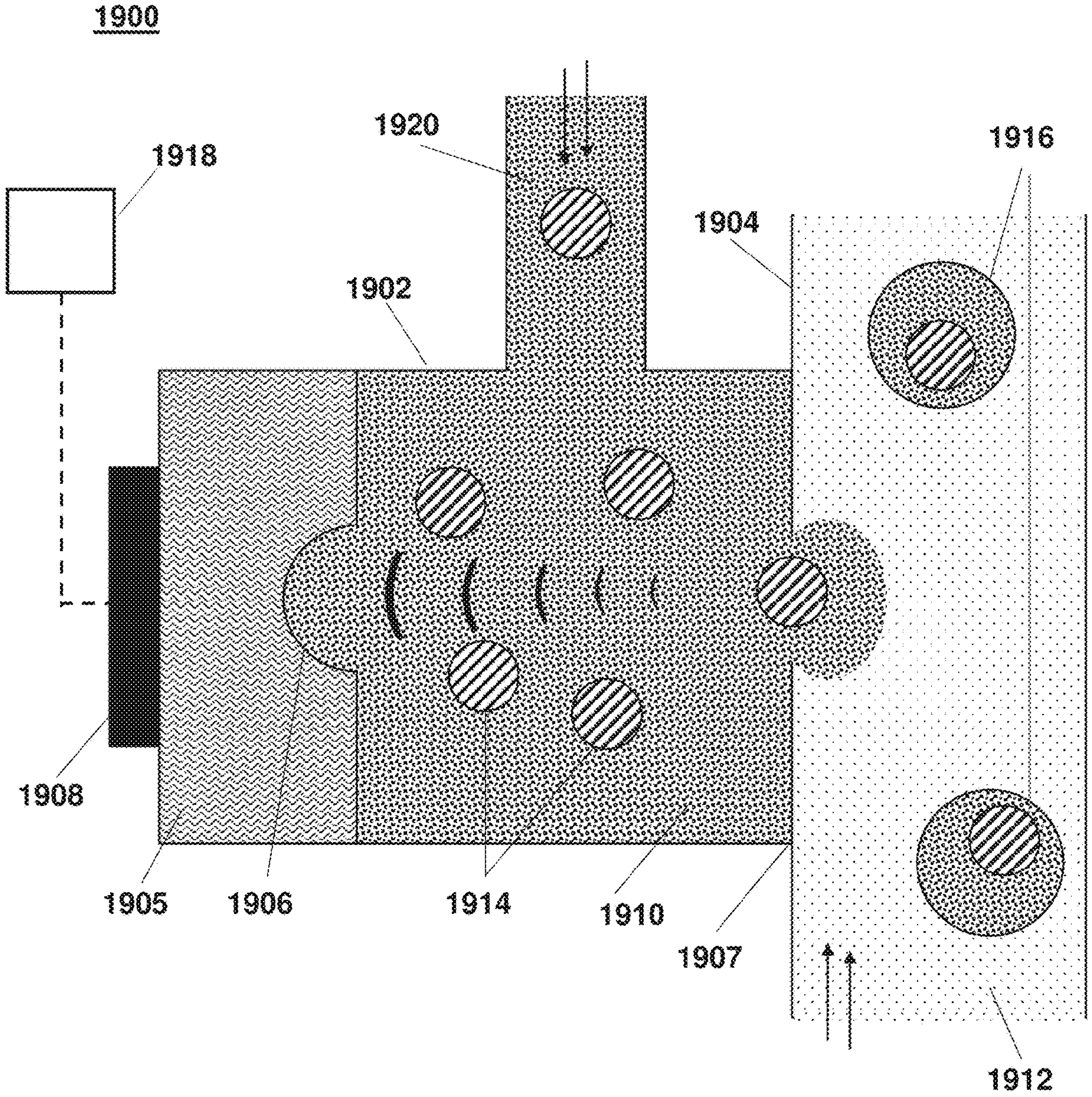
FIG. 19 is a scheme of a microfluidic device including a piezoelectric element for droplet formation.

FIG. 19 shows an embodiment of a device according to the invention that uses a piezoelectric, e.g., a piezoacoustic element, for droplet formation. A device 1900 includes a first channel 1902, a second channel 1904, a piezoelectric element 1908, and a buffer substrate 1905. The first channel 1902 and the second channel 1904 communicate at a channel junction 1907. In some instances, the first channel 1902 and components thereof can correspond to the channel 102 in the channel structure 100 in FIG. 1 and components thereof.

The first channel 1902 carries a first fluid 1910 (e.g., aqueous), and the second channel 1904 carries a second fluid 1912 (e.g., oil) that is immiscible with the first fluid 1910. In some instances, the first fluid 1910 in the first channel 1902 includes suspended particles 1914. In some instances, the particles 1914, suspended in the first fluid 1910, are provided to the first channel 1902 from a third channel 1920, which is in fluid communication with the first channel 1902. The particles 1914 may be beads, biological particles, cells, cell beads, or any combination thereof (e.g., a combination of beads and cells or a combination of beads and cell beads, etc.). The piezoelectric element 1908 is operatively coupled to a buffer substrate 1905 (e.g., glass). The buffer substrate 1905 includes an acoustic lens 1906. In some instances, the acoustic lens 1906 is a substantially spherical cavity, e.g., a partially spherical cavity, e.g., hemispherical. In other instances, the acoustic lens 1906 is a different shape and/or includes one or more other objects for focusing acoustic waves. The buffer substrate 1905 and/or the acoustic lens 1906 can be in contact with the first fluid 1910 in the first channel 1902. Alternatively, the piezoelectric element 1908 is operatively coupled to a part (e.g., wall) of the first channel 1902 without an intermediary buffer substrate. The piezoelectric element 1908 is in electrical communication with a controller 1918. The piezoelectric element 1908 is responsive to a pulse of electric voltage driven at a particular frequent transmitted by the controller 1918. In some instances, the piezoelectric element 1908 and its properties can correspond to the piezoelectric element 1808 and its properties in FIGS. 18A-18B.

Before electric voltage is applied, the first fluid 1910 and the second fluid 1912 are separated at or near the junction 1907 via an immiscible barrier. When the electric voltage is applied to the piezoelectric element 1908, it generates acoustic waves that propagate in the buffer substrate 1905, from the first end to the second end. The acoustic lens 1906 at the second end of the buffer substrate 1905 focuses the sound waves towards the immiscible interface between the two fluids 1910, 1912. The acoustic lens 1906 may be located such that the immiscible interface is located at the focal plane of the converging beam of the acoustic waves. The pressure of the acoustic waves may cause a volume of the first fluid 1910 to be propelled into the second fluid 1912, thereby generating a droplet of the first fluid 1910 in the second fluid 1912. In some instances, each propelling may generate a plurality of droplets (e.g., a volume of the first fluid 1910 propelled breaks off as it enters the second fluid 1912 to form a plurality of discrete droplets). After ejection of the droplet, the immiscible interface can return to its original state. Subsequent bursts of electric voltage to the piezoelectric element 1908 can be repeated to generate more droplets 1916. A plurality of droplets 1916 can be collected in the second channel 1904 for continued transportation to a different location (e.g., reservoir), direct harvesting, and/or storage.

Example 20

Figure 20:
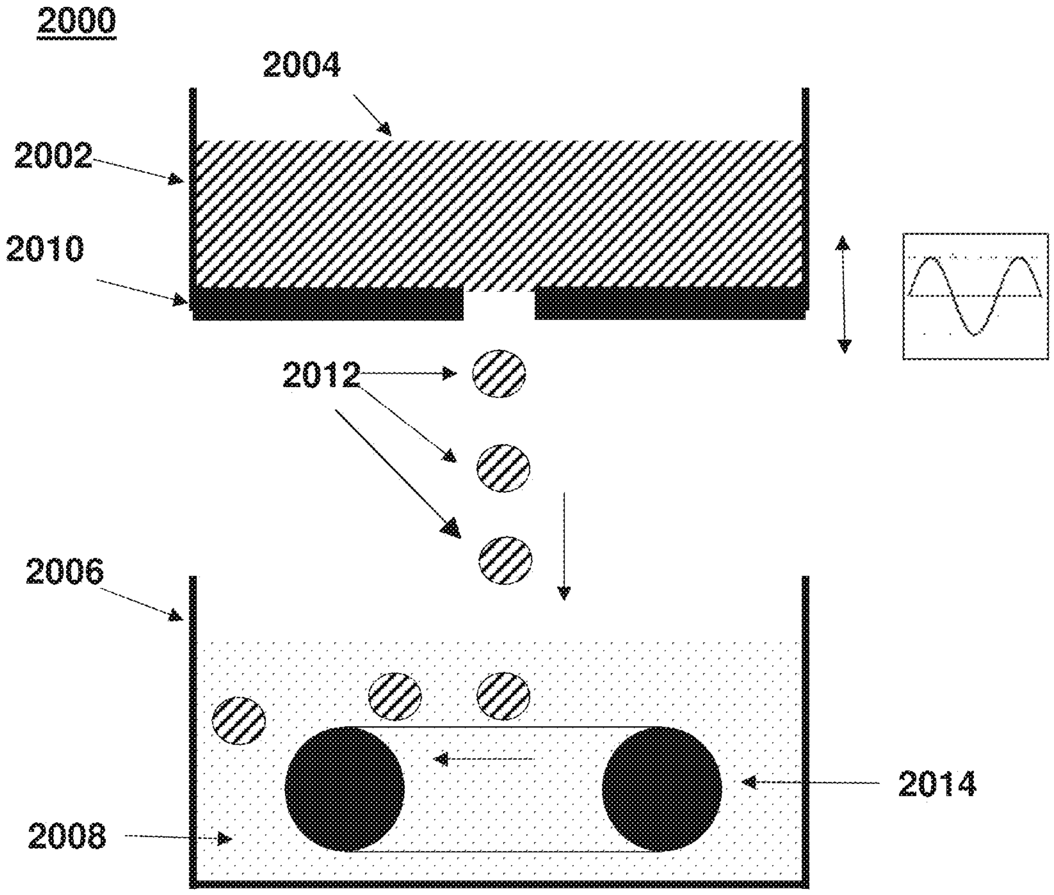
FIG. 20 is a scheme of a microfluidic device including a piezoelectric element for droplet formation. The droplets are collected in a circulating bath after formation.

FIG. 20 shows an embodiment of a device according to the invention that includes a piezoelectric element for droplet formation. The device 2000 includes a reservoir 2002 for holding first fluid 2004 and a collection reservoir 2006 for holding second fluid 2008, such as an oil. In one wall of the reservoir 2002 is a piezoelectric element 2010 operatively coupled to an aperture.

Upon actuation of the piezoelectric element 2010, the first fluid 2004 exits the aperture and forms a droplet 2012 that is collected in collection reservoir 2006. Collection reservoir 2006 includes a mechanism 2014 for circulating second fluid 2008 and moving formed droplets 2012 through the second fluid 2008. The signal applied to the piezoelectric element 2010 may be a sinusoidal signal as indicated in the inset photo.

Example 21

Figure 21:
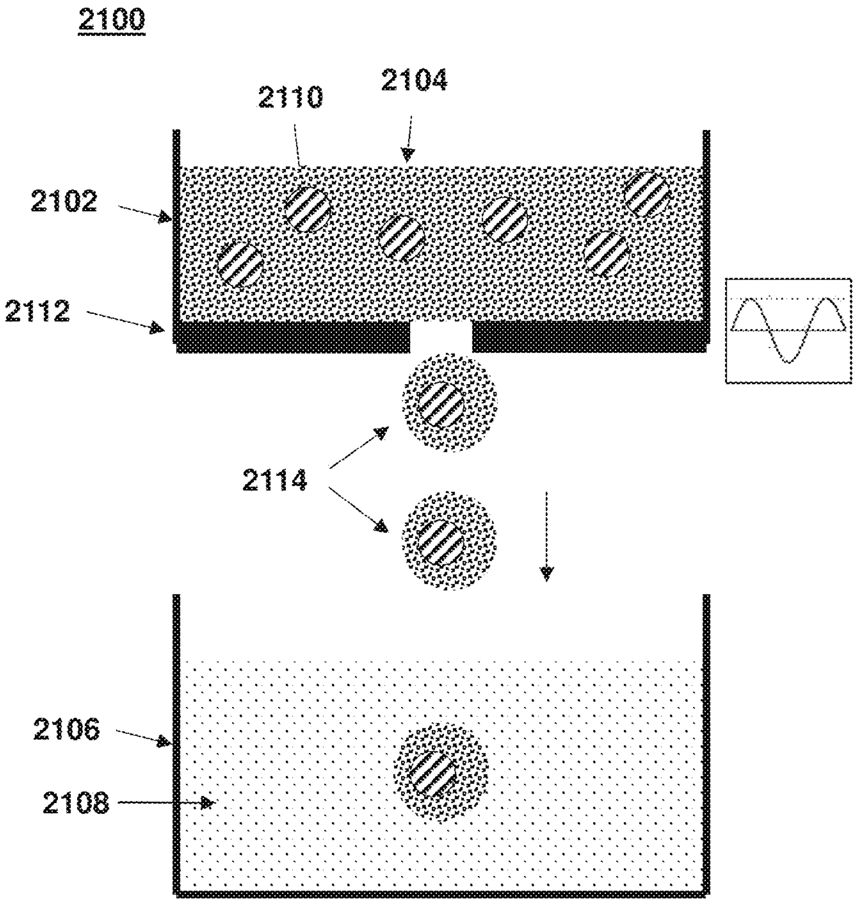
FIG. 21 is a scheme of a microfluidic device including a piezoelectric element for droplet formation including a particle. The droplets contain a particle and are collected in a bath after formation.

FIG. 21 shows an embodiment of a device according to the invention that includes a piezoelectric element for droplet formation. The device 2100 includes a reservoir 2102 for holding first fluid 2104 and a collection reservoir 2106 for holding second fluid 2108, such as an oil. The first fluid 2104 may contain particles 2110. In one wall of the reservoir 2102 is a piezoelectric element 2112 operatively couple to an aperture.

Upon operation of the piezoelectric element 2112 the first fluid 2104 and the particles 2110 exit the aperture and form a droplet 2114 containing the particle 2110. The droplet 2114 is collected in the second fluid 2108 held in the collection reservoir 2106. The second fluid 2108 may or may not be circulated. The signal applied to the piezoelectric element 2112 may be a sinusoidal signal as indicated in the inset photo.

Example 22

Figure 22:
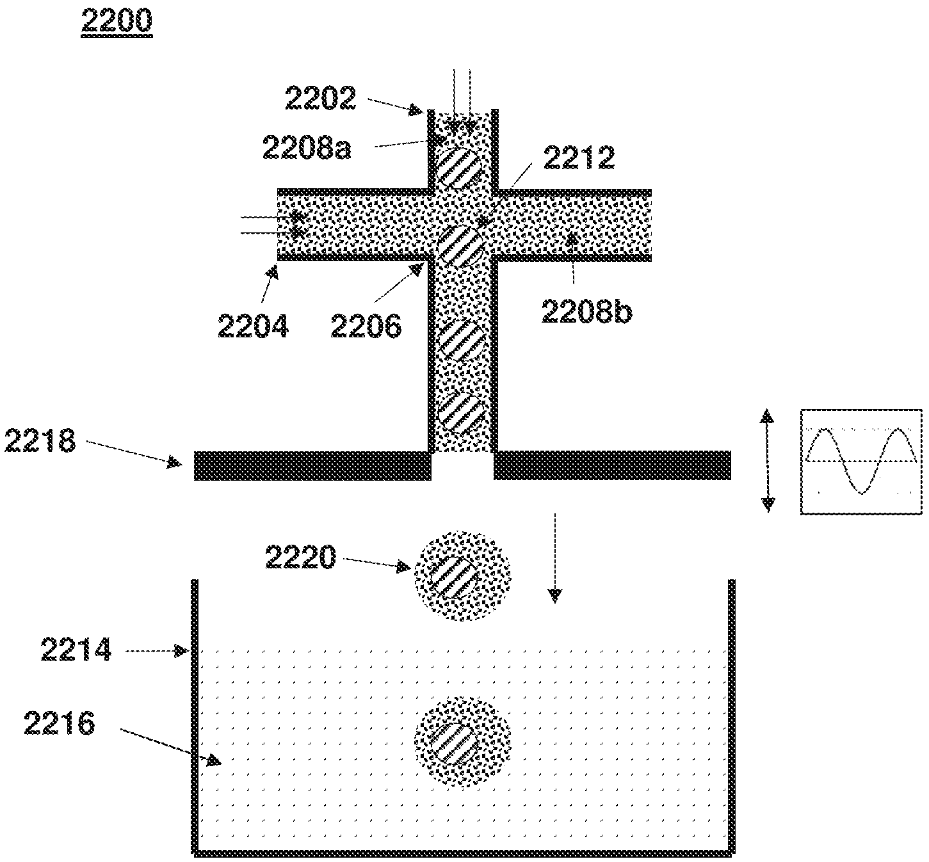
FIG. 22 is a scheme of a microfluidic device including a piezoelectric element for droplet formation. The droplets contain a particle and are collected in a bath after formation.

FIG. 22 shows an embodiment of a device according to the invention that includes a piezoelectric element for droplet formation. The device 2200 includes a first channel 2202 and a second channel 2204 that meet at junction 2206. The first channel 2202 carries a portion of first fluid 2208*a*, and the second channel 2204 carries another portion of first fluid 2208*b*. One of the portions of the first fluid 2208*a* or 2208*b* further includes a particle 2212. The device includes a collection reservoir 2214 for holding second fluid 2216, such as an oil. The distal end of the first channel includes a piezoelectric element 2218 operatively couple to an aperture.

The portion of first fluid 2208*a* flowing through the first channel 2202, e.g., carrying particles 2212, combines with the portion of the first fluid 2208*b* flowing through second channel 2204 to form the first fluid, and the first fluid continues to the distal end of the first channel 2202. Upon actuation of the piezoelectric element 2218 at the distal end of the first channel 2202, the first fluid and particles 2212 form a droplet 2220 containing a particle 2212. The droplet 2220 is collected in the second fluid 2216 in the collection reservoir 2214. The second fluid 2216 may or may not be circulated. The signal applied to the piezoelectric element 2218 may be a sinusoidal signal as indicated in the inset photo.

Example 23

FIGS. 23A-23C show an embodiment of a kit according to the invention. FIG. 23A shows a collection reservoir within a device for forming droplets including a lumen configured to accept a tube. FIG. 23B shows the same collection reservoir with the tube connected. The tube is in fluid communication with an external container (e.g., a centrifuge tube) that collects droplets. FIG. 23C shows droplets being transferred, by a displacement fluid (e.g., and immiscible fluid) from the collection reservoir through the tube into the external container. In this example, the tube is in fluid communication with the collection reservoir before the production of droplets. As the droplets are produced and enter the collection reservoir, they float directly into the tube (FIG. 23B). The droplets can then easily be transferred from the collection reservoir into an external container by a displacement liquid (e.g., an immiscible liquid) limiting the loss of any produced droplets.

Example 24

FIGS. 24A and 24B are vertical cross sections of an embodiment of the invention. FIG. 24A shows an empty collection reservoir with a lumen configured to accept a pipette tip. FIG. 24B shows a collection reservoir including a pipette tip inserted in the lumen. Droplets enter the collection device as they are formed.

Example 25

Figure 25A:
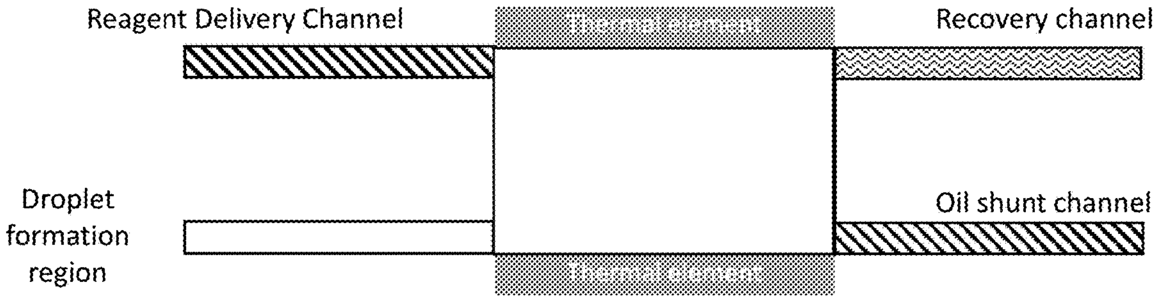
FIGS. 25A-25C are schemes of a collection reservoir in which an emulsion is thermally processed and then broken.
Figure 25B:
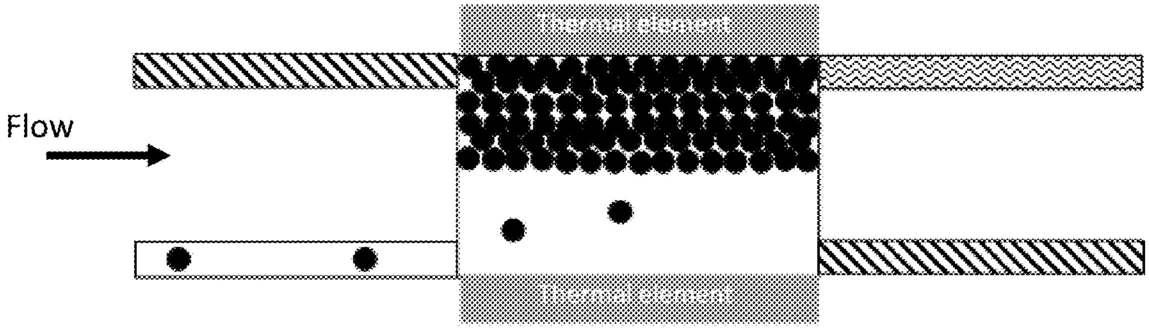
Figure 25C:
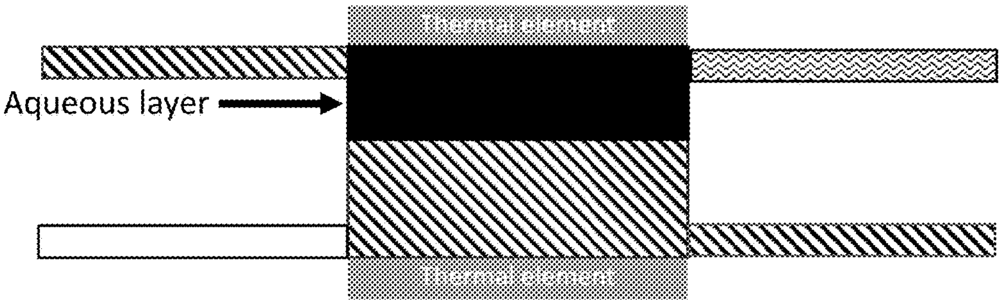

FIGS. 25A-25C show vertical cross sections of one embodiment of the invention. FIG. 25A shows a collection reservoir in fluid communication with a droplet formation region, the collection reservoir includes a top portion and a bottom portion. The collection reservoir is controllably in fluid communication with an oil shunt channel and two access channels, i.e., a reagent delivery channel, and a recovery channel. This embodiment includes two thermal elements disposed to alter the temperature of the collection reservoir. FIG. 25B shows the collection reservoir depicted in FIG. 25A filling with droplets that are produced in the droplet formation region. FIG. 25C shows the collection reservoir depicted in FIG. 25B after the emulsion has been broken. The reagent delivery channel and the recovery channel are not in fluid communication with the collection reservoir until after droplet formation has ceased. As the droplets flow into the collection reservoir, they fill the collection reservoir as they flow to the top portion. As droplets fill the collection reservoir, the oil shunt can be used to relieve the pressure from excess oil.

In this example, after the droplet collection reservoir has filled, the thermal elements alter the temperature of the collection reservoir to process a sample in a droplet. After the sample has been processed the emulsion can be broken, in this example, by delivering a break up agent through the reagent delivery channel. After the emulsion is broken, the samples can be recovered through the recovery channel for analysis.

Example 26

Figure 26:
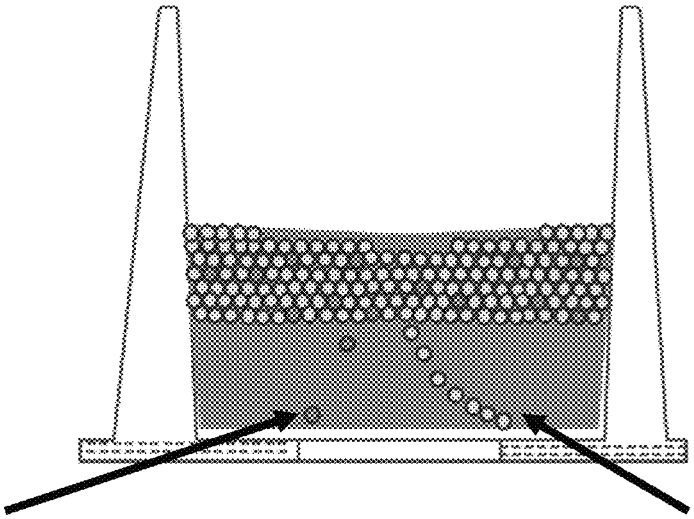
FIG. 26 is a scheme of a collection reservoir in fluid communication with a droplet formation region and a droplet or particle source. The droplet formation region and the droplet or particle source are configured to simultaneously provide droplets or particles to the collection reservoir. First droplets, provided by the droplet formation region, and second droplets or particles, provided by a droplet or particle source, are collected in the collection reservoir. The first droplets have a sample and the second droplets or particles do not. The rate at which the first droplets are provided to the collection reservoir is less than the rate at which the second droplets or particles are provided.

FIG. 26 shows a scheme of a collection reservoir in fluid communication with a droplet formation region and a droplet or particle source. The droplet formation region and the droplet or particle source are configured to simultaneously provide droplets or particles to the collection reservoir. The first droplets contain a sample and are provided by the droplet formation region, while the second droplets or particles do not contain a sample and are provided by the droplet or particle source. In this example, the rate at which the first droplets are provided to the collection reservoir is lower than the rate at which the second droplets or particles are provided. Due to the greater percentage of second droplets or particles, upon sample recovery, the chances that a droplet not collected for analysis does not contain a sample is greater.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

Other embodiments are in the claims.

What is claimed is:

1. A method of producing droplets, the method comprising steps (a) to (d) in the following order:

a) providing a device for producing droplets of a first liquid in a second liquid, the device comprising:

i) a first channel having a first depth, a first width, a first proximal end, and a first distal end;

ii) a droplet formation region in fluid communication with the first channel; and iii) a collection reservoir in fluid communication with the droplet formation region and configured to collect droplets formed in the droplet formation region, wherein the collection reservoir comprises a lumen configured to accept a collection device, and wherein a boundary of the lumen has an angle of between ±45 degrees from surface normal to the horizontal surface;

wherein the first channel and droplet formation region are configured to produce droplets of the first liquid in the second liquid;

b) inserting a collection device into the lumen;

c) producing the droplets; and d) passively collecting the droplets in the collection device.

2. The method of claim 1, wherein the collection device is a pipette tip and the droplets flow from the collection reservoir into the pipette tip or wherein the collection device comprises a tube having a proximal end and a distal end, wherein the proximal end is in fluid communication with the lumen and the distal end is in fluid communication with an external container and the collecting step (d) further comprises moving the droplets from the collection reservoir to the external container with a displacement fluid.

3. A method for producing droplets of a first liquid in a second liquid, the method comprising steps (a) to (d) in the following order:

a) providing a device comprising:

i) a first channel having a first depth, a first width, a first proximal end, and a first distal end;

ii) a droplet formation region in fluid communication with the first channel;

iii) a collection reservoir in fluid communication with the droplet formation region and configured to collect droplets formed in the droplet formation region, wherein the first channel and droplet formation region are configured to produce first droplets of the first liquid in the second liquid, wherein the first droplets comprise a sample; and iv) a droplet or particle source in fluid communication with the collection reservoir, wherein the droplet or particle source does not comprise the sample;

b) allowing the first liquid to flow from the first channel to the droplet formation region to produce the first droplets;

c) collecting the first droplets in the collection reservoir; and d) allowing the droplet or particle source to provide second droplets and/or particles to the collection reservoir, wherein each second droplet and/or particle does not comprise the sample, and wherein the particles are solid or semi-solid.

4. The method of claim 3, wherein the droplet formation region and the droplet or particle source simultaneously provide droplets or particles to the collection reservoir.

5. The method of claim 4, wherein the rate of droplets produced by the droplet formation region is less than the rate of particles or droplets provided by the droplet or particle source to the collection reservoir.

6. A method for processing a sample, the method comprising steps (a) to (d) in the following order:

a) providing a device for producing droplets of a first liquid in a second liquid, the device comprising:

(i) a first channel having a first depth, a first width, a first proximal end, and a first distal end;

(ii) a droplet formation region in fluid communication with the first channel;

(iii) a collection reservoir in fluid communication with the droplet formation region and configured to collect droplets formed in the droplet formation region, the collection reservoir having a top portion and a bottom portion;

(iv) an oil shunt channel controllably in fluid communication with the bottom portion or configured to be controllably in fluid communication with the bottom portion;

(v) one or more access channels configured to be controllably in fluid communication with the top portion of the collection reservoir; and (vi) one or more thermal elements disposed to alter the temperature of the collection reservoir, wherein the first channel and the droplet formation region are configured to produce droplets of the first liquid in the second liquid;

b) allowing the device to produce droplets of the sample to form an emulsion in the second liquid;

c) heating and/or cooling the emulsion thereby processing the sample; and d) breaking the emulsion inside the collection reservoir to produce a liquid layer from the droplets of the sample in the collection reservoir.

7. The method of claim 6, further comprising removing the liquid layer from the collection reservoir.

8. The method of claim 6, wherein the emulsion is broken by the introduction of a reagent.

9. The method of claim 8, wherein the reagent is introduced via a first of the one or more access channels.

10. The method of claim 1, wherein the collection device comprises a pipette tip or a tube having a proximal end and a distal end, wherein the proximal end is in fluid communication with the lumen and the distal end is in fluid communication with an external container.

11. The method of claim 1, wherein the device further comprises a second channel having a second depth, a second width, a second proximal end, and a second distal end, wherein the second channel intersects the first channel between the first proximal and first distal ends.

12. The method of claim 1, wherein the droplet formation region comprises a shelf having a third depth, a third width, at least one inlet, and at least one outlet, wherein the shelf is configured to allow the first liquid to expand in at least one dimension and a step having a fourth depth.

13. The method of claim 1, wherein the device further comprises a reservoir configured to be controllably in fluid communication with the collection reservoir.

14. The method of claim 13, wherein the reservoir comprises an immiscible displacement fluid.

15. The method of claim 6, wherein the device comprises two access channels.

* * * * *